United States Patent
Schwenker et al.

(10) Patent No.: US 12,521,884 B2
(45) Date of Patent: Jan. 13, 2026

(54) TECHNIQUES FOR MULTIPASS WELDING

(71) Applicant: Path Robotics, Inc., Columbus, OH (US)

(72) Inventors: Eric Schwenker, Columbus, OH (US); Dylan Desantis, Columbus, OH (US); Nima Ajam Gard, Columbus, OH (US); Paul Boulware, Columbus, OH (US); Travis Peterson, Columbus, OH (US)

(73) Assignee: Path Robotics, Inc., Columbus, OH (US)

( * ) Notice: Subject to any disclaimer, the term of this patent is extended or adjusted under 35 U.S.C. 154(b) by 0 days.

(21) Appl. No.: 18/101,750

(22) Filed: Jan. 26, 2023

(65) Prior Publication Data

US 2024/0042614 A1 Feb. 8, 2024

Related U.S. Application Data

(60) Provisional application No. 63/392,366, filed on Jul. 26, 2022.

(51) Int. Cl.
  B23K 1/14 (2006.01)
  B23K 31/12 (2006.01)
  (Continued)

(52) U.S. Cl.
  CPC ............ B25J 9/1687 (2013.01); B23K 31/12 (2013.01); B25J 9/163 (2013.01); B25J 9/1697 (2013.01); B25J 11/005 (2013.01); B23K 31/006 (2013.01)

(58) Field of Classification Search
  USPC ........................................................ 700/117
  See application file for complete search history.

(56) References Cited

U.S. PATENT DOCUMENTS 1,724,301 A  8/1929  Moriarty
3,532,807 A  10/1970  Wall, Jr. et al.
(Continued)

FOREIGN PATENT DOCUMENTS

CN  108555423 A  9/2018
CN  110064818     7/2019
(Continued)

OTHER PUBLICATIONS

Larkin et al., "Automatic program generation for welding robots from CAD" 2016 IEEE International Conference on Advanced Intelligent Mechatronics (AIM) (pp. 560-565). USA: IEEE (Jul. 2016) (Year: 2016).*

(Continued)

*Primary Examiner* — Emilio J Saavedra
(74) *Attorney, Agent, or Firm* — IPkey PLLC

(57) ABSTRACT

This disclosure provides systems, methods, and apparatuses, including computer programs encoded on computer storage media, that provide for welding techniques for manufacturing robots, such multipass welding techniques for welding robots. For example, the welding techniques may enable generation of weld instructions based on a welding fill plan. The instructions may be generated based on a bead model or a table that indicates a wire feed speed, a travel speed, or a voltage. As another example, the techniques may enable generation of weld instructions based on the one or more dimensions of a seam. As another example, the techniques may enable generation of a joint model of a cross-section of a seam to be welded. The joint model may be generated based on a combination of a plurality of feature components to generate the joint model of the seam. Other aspects and features are also claimed and described.

13 Claims, 18 Drawing Sheets

(51) Int. Cl.
  *B25J 9/16* (2006.01)
  *B25J 11/00* (2006.01)
  *B23K 31/00* (2006.01)

(56) References Cited

U.S. PATENT DOCUMENTS

| | | |
|---|---|---|
| 4,011,437 A | 3/1977 | Hohn |
| 4,021,840 A | 5/1977 | Ellsworth et al. |
| 4,148,061 A | 4/1979 | Lemelson et al. |
| 4,234,777 A | 11/1980 | Balfanz |
| 4,255,643 A | 3/1981 | Balfanz |
| 4,380,696 A | 4/1983 | Masaki |
| 4,412,121 A | 10/1983 | Kremers et al. |
| 4,482,968 A | 11/1984 | Inaba et al. |
| 4,492,847 A | 1/1985 | Masaki et al. |
| 4,495,588 A | 1/1985 | Nio et al. |
| 4,497,019 A | 1/1985 | Waber |
| 4,497,996 A | 2/1985 | Libby et al. |
| 4,515,521 A | 5/1985 | Takeo et al. |
| 4,553,077 A | 11/1985 | Brantmark et al. |
| 4,555,613 A | 11/1985 | Shulman |
| 4,561,050 A | 12/1985 | Iguchi et al. |
| 4,567,348 A | 1/1986 | Smith et al. |
| 4,568,816 A | 2/1986 | Casler, Jr. et al. |
| 4,575,304 A | 3/1986 | Nakagawa et al. |
| 4,578,554 A | 3/1986 | Coulter |
| 4,580,229 A | 4/1986 | Koyama et al. |
| 4,587,396 A | 5/1986 | Rubin |
| 4,590,577 A | 5/1986 | Nio et al. |
| 4,593,173 A | 6/1986 | Bromley et al. |
| 4,594,497 A | 6/1986 | Takahasi et al. |
| 4,595,989 A | 6/1986 | Yasukawa et al. |
| 4,613,942 A | 9/1986 | Chen |
| 4,616,121 A | 10/1986 | Clocksin et al. |
| 4,617,504 A | 10/1986 | Detriche |
| 4,642,752 A | 2/1987 | Debarbieri et al. |
| 4,652,803 A | 3/1987 | Kamejima et al. |
| 4,675,502 A | 6/1987 | Haefner et al. |
| 4,677,568 A | 6/1987 | Arbter |
| 4,685,862 A | 8/1987 | Nagai et al. |
| 4,724,301 A | 2/1988 | Shibata et al. |
| 4,725,965 A | 2/1988 | Keenan |
| 4,744,039 A | 5/1988 | Suzuki et al. |
| 4,745,856 A | 5/1988 | Putnam et al. |
| 4,757,180 A | 7/1988 | Kainz et al. |
| 4,804,860 A | 2/1989 | Ross et al. |
| 4,812,614 A | 3/1989 | Wang et al. |
| 4,833,383 A | 5/1989 | Skarr et al. |
| 4,833,624 A | 5/1989 | Kuwahara et al. |
| 4,837,487 A | 6/1989 | Kurakake et al. |
| 4,845,992 A | 7/1989 | Dean |
| 4,899,095 A | 2/1990 | Kishi et al. |
| 4,906,907 A | 3/1990 | Tsuchihashi et al. |
| 4,907,169 A | 3/1990 | Lovoi |
| 4,924,063 A | 5/1990 | Buchel et al. |
| 4,945,493 A | 7/1990 | Huang et al. |
| 4,969,108 A | 11/1990 | Webb et al. |
| 4,973,216 A | 11/1990 | Domm |
| 5,001,324 A | 3/1991 | Aiello et al. |
| 5,006,999 A | 4/1991 | Kuno et al. |
| 5,053,976 A | 10/1991 | Nose et al. |
| 5,083,073 A | 1/1992 | Kato |
| 5,096,353 A | 3/1992 | Tesh et al. |
| 5,154,717 A | 10/1992 | Matsen, III et al. |
| 5,159,745 A | 11/1992 | Kato |
| 5,219,264 A | 6/1993 | McClure et al. |
| 5,245,409 A | 9/1993 | Tobar |
| 5,288,991 A | 2/1994 | King et al. |
| 5,300,869 A | 4/1994 | Skaar et al. |
| 5,326,469 A | 7/1994 | Watanabe |
| 5,379,721 A | 1/1995 | Dessing et al. |
| 5,457,773 A | 10/1995 | Jeon |
| 5,465,037 A | 11/1995 | Huissoon et al. |
| 5,479,078 A | 12/1995 | Karakama et al. |
| 5,511,007 A | 4/1996 | Nihei et al. |
| 5,532,924 A | 7/1996 | Hara et al. |
| 5,570,458 A | 10/1996 | Umeno et al. |
| 5,572,102 A | 11/1996 | Goodfellow et al. |
| 5,598,345 A | 1/1997 | Tokura et al. |
| 5,600,760 A | 2/1997 | Pryor |
| 5,602,967 A | 2/1997 | Pryor |
| 5,608,847 A | 3/1997 | Pryor |
| 5,612,785 A | 3/1997 | Boillot et al. |
| 5,624,588 A | 4/1997 | Terawaki et al. |
| 5,828,566 A | 10/1998 | Pryor |
| 5,906,761 A | 5/1999 | Gilliland et al. |
| 5,925,268 A | 7/1999 | Britnell |
| 5,956,417 A | 9/1999 | Pryor |
| 5,959,425 A | 9/1999 | Bieman et al. |
| 5,961,858 A | 10/1999 | Britnell |
| 6,035,695 A | 3/2000 | Kim |
| 6,044,308 A | 3/2000 | Huissoon |
| 6,049,059 A | 4/2000 | Kim |
| 6,084,203 A | 7/2000 | Bonigen |
| 6,155,475 A * | 12/2000 | Ekelof ............... B23K 9/1274 228/103 |
| 6,163,946 A | 12/2000 | Pryor |
| 6,167,607 B1 | 1/2001 | Pryor |
| 6,304,050 B1 | 10/2001 | Skaar et al. |
| 6,429,404 B1 | 8/2002 | Tokura et al. |
| 6,430,474 B1 | 8/2002 | DiStasio et al. |
| 6,804,580 B1 | 10/2004 | Stoddard et al. |
| 6,909,066 B2 | 6/2005 | Zheng et al. |
| 7,130,718 B2 | 10/2006 | Gunnarsson et al. |
| 7,151,848 B1 | 12/2006 | Watanabe et al. |
| 7,734,358 B2 | 6/2010 | Watanabe et al. |
| 7,805,219 B2 | 9/2010 | Ishikawa et al. |
| 7,813,830 B2 | 10/2010 | Summers et al. |
| 7,818,091 B2 | 10/2010 | Kazi et al. |
| 7,946,439 B1 | 5/2011 | Toscano et al. |
| 8,494,678 B2 | 7/2013 | Quandt et al. |
| 8,525,070 B2 | 9/2013 | Tanaka et al. |
| 8,538,125 B2 | 9/2013 | Linnenkohl et al. |
| 8,644,984 B2 | 2/2014 | Nagatsuka et al. |
| 9,067,321 B2 | 6/2015 | Landsnes |
| 9,221,117 B2 | 12/2015 | Conrardy et al. |
| 9,221,137 B2 | 12/2015 | Otts |
| 9,666,160 B2 | 5/2017 | Patel et al. |
| 9,685,099 B2 | 6/2017 | Boulware et al. |
| 9,724,787 B2 | 8/2017 | Becker et al. |
| 9,773,429 B2 | 9/2017 | Boulware et al. |
| 9,779,635 B2 | 10/2017 | Zboray et al. |
| 9,799,635 B2 | 10/2017 | Kuriki et al. |
| 9,802,277 B2 | 10/2017 | Beatty et al. |
| 9,821,415 B2 | 11/2017 | Rajagopalan et al. |
| 9,836,987 B2 | 12/2017 | Postlethwaite et al. |
| 9,937,577 B2 | 4/2018 | Daniel et al. |
| 9,975,196 B2 | 5/2018 | Zhang et al. |
| 9,977,242 B2 | 5/2018 | Patel et al. |
| 9,993,891 B2 | 6/2018 | Wiryadinata |
| 10,040,141 B2 | 8/2018 | Rajagopalan et al. |
| 10,083,627 B2 | 9/2018 | Daniel et al. |
| 10,191,470 B2 | 1/2019 | Inoue |
| 10,197,987 B2 | 2/2019 | Battles et al. |
| 10,198,962 B2 | 2/2019 | Postlethwaite et al. |
| 10,201,868 B2 | 2/2019 | Dunahoo et al. |
| 10,551,179 B2 | 2/2020 | Lonsberry et al. |
| 11,034,024 B2 | 6/2021 | Saez et al. |
| 11,067,965 B2 | 7/2021 | Spieker et al. |
| 11,179,793 B2 | 11/2021 | Atherton et al. |
| 11,407,110 B2 | 8/2022 | Lonsberry et al. |
| 11,759,952 B2 | 9/2023 | Lonsberry et al. |
| 2001/0004718 A1 | 6/2001 | Gilliland et al. |
| 2004/0105519 A1 | 6/2004 | Yamada et al. |
| 2005/0023261 A1* | 2/2005 | Zheng ............... B23K 9/1274 219/125.11 |
| 2006/0047363 A1 | 3/2006 | Farrelly et al. |
| 2006/0049153 A1 | 3/2006 | Cahoon et al. |
| 2008/0125893 A1 | 5/2008 | Tilove et al. |
| 2009/0075274 A1 | 3/2009 | Slepnev et al. |
| 2009/0139968 A1 | 6/2009 | Hesse et al. |
| 2010/0114338 A1 | 5/2010 | Bandyopadhyay et al. |
| 2010/0152870 A1 | 6/2010 | Wanner et al. |
| 2010/0206938 A1 | 8/2010 | Quandt et al. |

(56) References Cited

U.S. PATENT DOCUMENTS

| | | |
|---|---|---|
| 2010/0274390 A1 | 10/2010 | Bernd |
| 2011/0141251 A1 | 6/2011 | Marks et al. |
| 2011/0297666 A1 | 12/2011 | Ihle et al. |
| 2012/0096702 A1 | 4/2012 | Kinglsey et al. |
| 2012/0267349 A1 | 10/2012 | Bemdl et al. |
| 2013/0119040 A1 | 5/2013 | Suraba et al. |
| 2013/0123801 A1 | 5/2013 | Umasathan et al. |
| 2013/0259376 A1 | 10/2013 | Louban |
| 2014/0088577 A1 | 3/2014 | Anastassiou et al. |
| 2014/0100694 A1 | 4/2014 | Rueckl et al. |
| 2014/0365009 A1 | 12/2014 | Wettels |
| 2015/0122781 A1 | 5/2015 | Albrecht |
| 2015/0127162 A1 | 5/2015 | Takefumi |
| 2016/0096269 A1 | 4/2016 | Atohira et al. |
| 2016/0125592 A1 | 5/2016 | Becker et al. |
| 2016/0125593 A1 | 5/2016 | Becker et al. |
| 2016/0193681 A1* | 7/2016 | Pesme .................. B23K 9/1274 219/136 |
| 2016/0224012 A1 | 8/2016 | Hunt |
| 2016/0257000 A1 | 9/2016 | Guerin et al. |
| 2016/0257070 A1 | 9/2016 | Boydston et al. |
| 2016/0267636 A1 | 9/2016 | Duplaix et al. |
| 2016/0267806 A1 | 9/2016 | Hsu et al. |
| 2017/0072507 A1 | 3/2017 | Legault |
| 2017/0132807 A1 | 5/2017 | Shivaram et al. |
| 2017/0232615 A1 | 8/2017 | Hammock |
| 2017/0266758 A1 | 9/2017 | Fukui et al. |
| 2017/0364076 A1 | 12/2017 | Keshmiri et al. |
| 2017/0368649 A1 | 12/2017 | Marrocco et al. |
| 2018/0043471 A1 | 2/2018 | Aoki et al. |
| 2018/0065204 A1 | 3/2018 | Burrows |
| 2018/0117701 A1* | 5/2018 | Ge ........................ B23K 9/1272 |
| 2018/0147662 A1 | 5/2018 | Furuya |
| 2018/0266961 A1 | 9/2018 | Narayanan et al. |
| 2018/0266967 A1 | 9/2018 | Ohno et al. |
| 2018/0304550 A1 | 10/2018 | Atherton et al. |
| 2018/0322623 A1 | 11/2018 | Memo et al. |
| 2018/0341730 A1 | 11/2018 | Atherton et al. |
| 2019/0076949 A1 | 3/2019 | Atherton et al. |
| 2019/0108639 A1 | 4/2019 | Tchapmi et al. |
| 2019/0193180 A1 | 6/2019 | Troyer et al. |
| 2019/0240759 A1 | 8/2019 | Ennsbrunner et al. |
| 2019/0375101 A1* | 12/2019 | Miyata .................. B23K 31/02 |
| 2020/0021780 A1 | 1/2020 | Jeong et al. |
| 2020/0030984 A1 | 1/2020 | Suzuki et al. |
| 2020/0114449 A1* | 4/2020 | Chang .................. B25J 9/1697 |
| 2020/0130089 A1 | 4/2020 | Ivkovich et al. |
| 2020/0164521 A1 | 5/2020 | Li |
| 2020/0180062 A1 | 6/2020 | Suzuki et al. |
| 2020/0223064 A1 | 7/2020 | Alexander |
| 2020/0262079 A1 | 8/2020 | Saez et al. |
| 2020/0269340 A1 | 8/2020 | Tang et al. |
| 2020/0316779 A1 | 10/2020 | Truebenbach et al. |
| 2020/0409376 A1 | 12/2020 | Afrouzi et al. |
| 2021/0012678 A1* | 1/2021 | Torrecilla .................. G09B 9/00 |
| 2021/0046569 A1 | 2/2021 | Singh et al. |
| 2021/0158724 A1* | 5/2021 | Becker .................. B23K 9/0953 |
| 2021/0318673 A1 | 10/2021 | Kitchen et al. |
| 2021/0402500 A1 | 12/2021 | Gilad et al. |
| 2022/0016776 A1 | 1/2022 | Lonsberry et al. |
| 2022/0226922 A1 | 7/2022 | Albrecht et al. |
| 2022/0250183 A1 | 8/2022 | Knoener |
| 2022/0258267 A1 | 8/2022 | Becker |
| 2022/0266453 A1 | 8/2022 | Lonsberry et al. |
| 2022/0305593 A1 | 9/2022 | Lonsberry et al. |
| 2022/0324110 A1 | 10/2022 | Lonsberry et al. |
| 2022/0355407 A1* | 11/2022 | Fujii ...................... B23K 9/042 |
| 2022/0402147 A1 | 12/2022 | Martin et al. |
| 2022/0410402 A1 | 12/2022 | Lonsberry et al. |
| 2023/0093558 A1 | 3/2023 | Takeya et al. |
| 2023/0123712 A1 | 4/2023 | Lonsberry et al. |
| 2023/0173676 A1 | 6/2023 | Lonsberry et al. |
| 2023/0259099 A1* | 8/2023 | Huang .................... G06N 3/09 |
| 2023/0260138 A1 | 8/2023 | Becker et al. |
| 2023/0278224 A1 | 9/2023 | Bunker et al. |
| 2023/0330764 A1 | 10/2023 | Ott et al. |
| 2024/0025041 A1 | 1/2024 | Lonsberry et al. |

FOREIGN PATENT DOCUMENTS

| | | | | |
|---|---|---|---|---|
| CN | 110153534 A | * | 8/2019 | ............ B23K 37/02 |
| CN | 110270997 A | * | 9/2019 | |
| CN | 110883466 A | | 3/2020 | |
| CN | 113352317 A | * | 9/2021 | |
| EP | 3812105 | | 4/2021 | |
| JP | 2010269336 | | 12/2010 | |
| JP | 2015140171 | | 8/2015 | |
| JP | 223604 | | 12/2015 | |
| JP | 2015223604 | | 12/2015 | |
| JP | 2017196653 | | 11/2017 | |
| WO | WO 1994/003303 | | 2/1994 | |
| WO | WO 2004/096481 | | 11/2004 | |
| WO | WO 2016/013171 | | 6/2017 | |
| WO | WO 2017/115015 | | 7/2017 | |
| WO | WO 2018/173655 | | 9/2018 | |
| WO | WO 2019/153090 | | 8/2019 | |

OTHER PUBLICATIONS

Horvath et al., "Bead geometry modeling on uneven base metal surface by fuzzy systems for multi-pass welding" Expert Systems With Applications 186 (2021) 115356, 24 Pgs., (Year: 2021).*

Bingul et al, "A real-time prediction model of electrode extension for GMAW", IEEE/ASME Transaction on Mechatronics, vol. 11, No. 1,pp. 47-4, 2006.

Boulware, "A methodology for the robust procedure development of fillet welds", The Ohio State University Knowledge Bank, 2006.

Chandrasekaran, "Predication of bead geometry in gas metal arc welding by statistical regression analysis", University of Waterloo, 2019.

Devaraj et al., "Grey-based Taguchi multiobjective optimization and artificial intelligence-based prediction of dissimilar gas metal arc welding process performance", Metals, vol. 11, 1858, 2021.

Ding et al., A multi-bead overlapping model for robotic wire and arc additive manufacturing (WAAM), Robotics and Computer-Integrated Manufacturing, vol. 31, pp. 101-110, 20115.

Ding, et al., "Bead modelling and implementation of adaptive MAT path in wire and arc additive manufacturing", Robotics and Computer-Integrated Manufacturing, vol. 39, pp. 32-42, 2016.

Hao et al., "Effects of tilt angle between laser nozzle and substrate on bead morphology in multi-axis laser cladding", Journal of manufacturing processes, vol. 43, pp. 311-322, 2019.

Harwig, "A wise method for assessing arc welding performance and quality", Welding Journal, pp. 35-39, 2000.

Harwig, "Arc behaviour and metal transfer of the vp-gmaw process", School of Industrial and Manufacturing Science, 2003.

He et al., "Dynamic modeling of weld bead geometry features in thick plate GMAW based on machine vision and learning", Sensors, vol. 20, 7104, 2020.

Hu et al., "Molten pool behaviors and forming appearance of robotic GMAW on complex surface with various welding positions", Journal of Manufacturing Processes, vol. 64, pp. 1359-1376, 2021.

Hu et al., "Multi-bead overlapping model with varying cross-section profile for robotic GMAW-based additive manufacturing", Journal of Intelligent Manufacturing, 2019.

Kesse et al., "Development of an artificial intelligence powered TIG welding algorithm for the prediction of bead geometry for TIG welding processes using hybrid deep learning", Metals, vol. 10, 451, 2020.

Kiran et al., "Arc interaction and molten pool behavior in the three wire submerged arc welding process", International Journal of Heat and Mass Transfer, vol. 87, pp. 327-340, 2015.

Kolahan et al., "A new approach for predicting and optimizing weld bead geometry in GMAW", World Academy of Science, Engineering and Technology, vol. 59, pp. 138-141, 2009.

Li et al., "Enhanced beads overlapping model for wire and arc additive manufacturing of multi-layer multi-bead metallic parts", Journal of Materials Processing Technology, 2017.

(56) References Cited

OTHER PUBLICATIONS

Li et al., "GMAW-based additive manufacturing of inclined multi-layer multi-bead parts with flat-position deposition", *Journal of Materials Processing Tech*, vol. 262, pp. 359-371, 2018.
Lv et al., "Levenberg-marquardt backpropagation training of multilayer neural networks for state estimation of a safety critical cyber-physical system".
Martinez et al., "Two gas metal arc welding process dataset of arc parameters and input parameters", *Data in Brief*, vol. 35, 106790, 2021.
Mollayi et al., "Application of multiple kernel support vector regression for weld bead geometry prediction in robotic GMAW Process", *International Journal of Electrical and Computer Engineering*, vol. 8, No. pp. 2310-2318, 2018.
Murray, "Selecting parameters for GMAW using dimensional analysis", *Welding Research*, pp. 152s-131s, 2002.
Nguen et al., "Multi-bead overlapping models for tool path generation in wire-arc additive manufacturing processes", *Procedia Manufacturing*, vol. 47, pp. 1123-1128, 2020.
Rao et al., "Effect of process parameters and mathematical model for the prediction of bead geometry in pulsed GMA welding", *The International Journal of Advanced Manufacturing Technology*, vol. 45, pp. 496-05, 2009.
Ravichandran et al., "Parameter optimization of gas metal arc welding process on AISI: 430Stainless steel using meta heuristic optimization techniques", *Department of Mechatronics Engineering*.
Sheng et al., "A new adaptive trust region algorithm for optimization problems", *Acta Mathematica Scientia*, vol. 38b, No. 2., pp. 479-496, 2018.
Suryakumar et al., "Weld bead modeling and process optimization in hybrid layered manufacturing", *Computer-Aided Design*, vol. 43, pp. 331-344, 211.
Thao, et al., "Interaction model for predicting bead geometry for lab joint in GMA welding process", *Computational Materials Science and Surface Engineering*, vol. 1, issue. 4., pp. 237-244, 2009.
Xiong et al., "Modeling of bead section profile and overlapping beads with experimental validation for robotic GMAW-based rapid manufacturing", *Robotics and Computer-Integrated Manufacturing*, vol. 29, pp. 417-423, 2013.
Munro, "An empirical model for overlapping bead geometry during laser consolidation", *Defence Research and Development Canada*, 2019. (resubmission).
International Search Report mailed on Nov. 11, 2023, issued in the corresponding International Application No. PCT/US2023/071059, filed on Jul. 26, 2023; 5 pages.
Written Opinion of the International Searching Authority mailed on Nov. 11, 2023, issued in the corresponding International Application No. PCT/US2023/071059, filed on Jul. 26, 2023; 7 pages.
International Patent Application No. PCT/US2022/017741 International Search Report and Written Opinion, dated Jul. 25, 2022. (23 pages).
International Patent Application No. PCT/US2022/017741 Invitation to Pay Additional Fees and, Where Applicable, Protest Fee, dated May 23, 2022. (2 pages).
International Patent Application No. PCT/US2022/017744 International Search Report and Written Opinion, dated Jun. 14, 2022. (13 pages).
International Search Report and Written Opinion for International Application No. PCT/IB2022/061107, mailed Nov. 17, 2022, 19 pages.
International Search Report and Written Opinion issued in corresponding PCT Application No. PCT/US2023/019063, mailed Sep. 12, 2023.
Invitation to Pay Additional Fees and, Where Applicable, Protest Fee and Partial International Search Report issued in International Patent Application No. PCT/US2023/019063, dated Jul. 18, 2023, 11 pages.
Jing et al., "Rgb-d sensor-based auto path generation method for arc welding robot", 2016 Chinese Control and Decision Conference (CCDC), IEEE, 2016.
Liu et al., "Motion navigation for arc welding robots based on feature mapping in a simulation environment", Robotics and Computer-Integrated Manufacturing, 26(2); pp. 137-144, 2010.
Lynch, K.M. et al., "Robot Control", Modern Robotics: Mechanics, Planning, and Control, Cambridge University Press, 2017, 403-460.
Moos et al., "Resistance Spot Welding Process Simulation for Variational Analysis on Compliant Assemblies", Journal of Manufacturing Systems, Dec. 16, 2014, pp. 44-71.
Natarajan, S. et al., "Aiding Grasp Synthesis for Novel Objects Using Heuristic-Based and Data-Driven Active Vision Methods", Frontiers in Robotics and AI, 8:696587, 2021.

* cited by examiner

TECHNIQUES FOR MULTIPASS WELDING

CROSS-REFERENCE TO RELATED APPLICATIONS

This application claims the benefit of U.S. Provisional Patent Application No. 63/392,366, entitled, "AUTONOMOUS MULTIPASS WELDING," filed on Jul. 26, 2022, which is expressly incorporated by reference herein in its entirety.

TECHNICAL FIELD

Aspects of the present disclosure relate generally to the field of manufacturing robots, and more particularly, but not by way of limitation, to welding techniques for manufacturing robots, such as multipass welding techniques for welding robots.

INTRODUCTION

Conventional robots are generally operable to perform one or more manufacturing operations including, but not limited to, painting, assembling, welding, brazing, or bonding operations to bond or adhere together separated objects, surfaces, seams, empty gaps, or spaces. For example, a robot, such as a manufacturing robot having one or more electrical or mechanical components, may be configured to accomplish a manufacturing task (e.g., welding), to produce a manufacturing output, such as a welded part. To illustrate, the robot (e.g., software, programs, methods, or algorithms) may use a kinematic model of the robot to generate the trajectories that the robot is to follow to accomplish the manufacturing task. The trajectories are determined for use in driving or moving a portion, such as a weld head or a weld tip, of the robot to one or more specific points, positions, or poses.

Robotic manufacturing faces several challenges due to the complexity of the robots used to accomplish manufacturing tasks, variations or tolerances of parts to be welded, or a combination thereof. For example, a weld plan may be generated to weld two parts, such as a first part and a second part that define a seam to be welded. Typically, the weld plan is generated based on a computer aided design (CAD) model and involves human input and decision making. The human involvement in the generation of the weld plan introduces subjective criteria to the weld plan that is based on an individual's experience. Such subjective criteria is difficult to quantify and weld plans generated by two different people to weld the same two parts can vary greatly. Additionally, a weld plan generated based on human involvement often has to be individually programmed and results in a static weld plan that is performed to manufacture multiple copies of the same product. Further, the CAD model may include or indicate tolerances or ranges associated with one or more acceptable dimensions for the parts to be welded, and therefore the seam to be welded. The weld plan is typically determined based on a single set of dimensions for the part. Accordingly, when the parts (and the seam) to be welded have a different set of dimensions that are still within an acceptable range of dimensions per the CAD model, the weld plan that was generated for the single set of dimensions may not produce an acceptable result when performed on the parts having the different set of dimensions. For example, in a multipass welding operation, the weld plan may be performed on the parts having the different set of dimensions may introduce an error in a first pass as compared to a predicted or desired weld, and the error may propagate or increase with each subsequent pass.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure is related to apparatuses, systems, and methods that provide for generation of a welding plan or instructions for a welding robot associated with a manufacturing process performed in a manufacturing robot environment. For example, the weld plan or the instructions may be associated with a multipass welding operation, such as a multipass welding operation performed by a welding robot, to enable welding two or more components together along one or more seams in multiple passes. To illustrate, a method, such as a computer-implemented method, may include identifying a seam that is defined by multiple parts and is configured to receive a weld material to form a weld (e.g., a joint) that joins the multiple parts. The seam may be identified based on a Computer Aided Design (CAD) model of the parts, a scanned representation of the parts, or a combination thereof.

In some implementations, a sensor may capture image data from various locations and vantage points within a workspace. A set of candidate seams associated with one or more parts may be produced and may indicate locations and orientations of those candidate seams. A pixel-wise classification and/or point-wise classification technique may be performed using a neural network to classify and identify each pixel and/or point as a part, a candidate seam on or associated with the part or at an interface between multiple parts, or a fixture. Structures identified as being non-part structures and non-candidate seam structures are segmented out. After the set of candidate seams is produced, a determination may be made whether the candidate seams are actually seams and suitable for laying a weld.

Based on identification of the seam, multiple waypoints represent the seam. In some implementations, each waypoint may be associated with a cross-section of the seam. For example, the cross-section of the seam may be associated with or used to generate a joint template (e.g., a joint model) of the seam. The joint model may represent a topology of the seam, one or more features, one or more feature relationships, a feature tolerance, one or more characteristics of the multiple parts, or a combination thereof. In some implementations, the joint model may be generated based on a plurality of feature components. For example, a joint library may store the plurality of features components. Each feature component may include a feature, such as a structural feature. Multiple feature components of the plurality of feature components may be combined to generate the joint model. Based on features of the multiple feature components, one or more features relationships may be generated that indicate relationships between the features.

In some implementations, a welding fill plan may be generated that includes or indicates multiple passes for laying weld material associated with the seam. For example, a welding profile may be generated for a waypoint, and the welding fill plan may be generated based on one or more welding profiles of one or more way points. The weld fill plan may include an ordered sequencing of weld beads within a cross-section associated the at least one waypoint of the plurality of the waypoints.

In some implementations, to generate a welding profile, a number of bead layers may be determined based on a bead layer height, such as a bead layer height indicated by a user, based on annotated data associated with the CAD model, determined by implicit welding criteria and solved for via an optimization technique, or a combination thereof. Additionally, or alternatively, a number of weld beads to be included in a bead layer may be determined. In some implementations, one or more welding parameters for each bead of a welding profile of a waypoint. For example, the one or more welding parameters may include or indicate a weld wire size used to form the weld bead, an area or volume of the weld bead, or a combination thereof. Additionally, or alternatively, the one or more welding parameters may include a wire feed speed, a travel speed, or a combination thereof. In some implementations, to determine at least one weld parameter of the one or more welding parameters, a table may be accessed that, based on the weld wire size or the area or volume of the weld bead, indicates a wire feed speed, a travel speed, or a combination thereof. In some other implementations, a trained model, such a neural network model, a physics-based model, or a combination thereof, may additionally or alternatively be used to determine the at least one weld parameter. To illustrate, the trained model may determine the at least one weld parameter based on the weld wire size or the area or volume of the weld bead, indicates a wire feed speed, a travel speed, or a combination thereof, as illustrative, non-limiting examples.

In some other implementations, the weld profile may be determined based on one or more candidate beads populated in a joint model. For example, one or more candidate beads may be placed in the joint model based on one or more features of the joint model. Additionally, or alternatively, one or more candidate beads may be placed in the joint template based on a surface included in the joint template, a cover profile of a weld, an unfilled space, or a combination thereof. The weld profile may be generated based on the one or more candidate beads (e.g., a size property, a spatial property, etc.), one or more constraints of the weld, one or more robotic parameters, a bead model, or a combination thereof. In some implementations, the welding profile may be determined based on a height or a volume of the weld to be formed. For example, the weld profile may be generated to include multiple layers of equal or individually optimized height, equal volume or area, or a combination thereof. One or more weld parameters, such as wire feed speed (WFS), travel speed (TS), or a voltage may be determined based on one or more spatial characteristics (e.g., an area, width, etc. of a weld bead or a layer), a wire size, or a combination thereof. Additionally, or alternatively, a bead model may be used to estimate a distribution of a bead that is laid during a pass of the multiple passes.

In some implementations, a weld fill plan is generated based on one or more weld profiles. The weld fill plan may include or indicate a number of layers, a number of beads in each layer, a bead size, a weld size, a cover profile, a cost of material, an average bead size, a minimum bead size, a maximum bead size, a distance of a bead from a structural point, one or more cross-sections, a void in material (e.g., gap), an access of support weld material (e.g., tack), or a combination thereof. In some implementations, the weld fill plan may be validated based on one or more operating characteristics of the welding robot. To illustrate, the one or more operating characteristics of the welding robot may define may be define what the welding robot can or cannot do to form a weld. In some implementations, the one or more operating characteristics may include or correspond to a torch collision model and kinematics, and validating the weld fill plan based on the one or more operating characteristics may confirm whether or not the weld fill plan can be executed by the welding robot. Welding robot instruction may be generated based on the weld fill plan and transmitted to the welding robot.

Particular implementations of the subject matter described in this disclosure may be implemented to realize one or more of the following potential advantages or benefits. In some aspects, the present disclosure provides techniques for generating instructions for a welding robot. The instructions may include or indicate multipass operations to be performed by the welding robot. The multipass operations may be determined using a bead model that estimates or predicts a profile of weld material that is laid for a portion of a weld of a seam. Additionally, or alternatively, as described herein, generation of the instructions for the multipass operations may improve a quality of a manufacturing output, improve efficiency of a robot or a robotic system, reduce wasted time and materials, or a combination thereof.

In one aspect of the disclosure, a computer-implemented method of generating instructions for a welding robot includes identifying a seam to be welded, the seam defined based on a first part and a second part. The computer-implemented method also includes, for at least one waypoint of a plurality of waypoints along a length of the seam, determining a number layers and a number of weld beads for a cross-section, at the at least one waypoint, of a joint to fill the seam. The computer-implemented method further includes generating, based on the cross-section at the at least one waypoint and based on a bead model, a welding fill plan for the seam. The computer-implemented method also includes generating instructions, based on the welding fill plan, for the welding robot to perform one or more weld passes.

In an additional aspect of the disclosure, a computer-implemented method of generating instructions for a welding robot includes determining one or more joint feature components based on a seam to be welded, the seam defined based on a first part and a second part. The computer-implemented method also includes determining a weld fill plan for the seam, the weld fill plan including one or more weld beads. Each weld bead of the one or more weld beads including one or more properties determined based on the one or more joint feature components. The computer-implemented method further includes generating one or more welding command properties based on the one or more joint feature components, the one or more properties of the one or more weld beads, or a combination thereof.

In an additional aspect of the disclosure, a computer-implemented method of generating instructions for a welding robot includes identifying a seam to be welded via multiple welding passes, the seam defined based on a first part and a second part. The computer-implemented method also includes identifying a welding volume associated with the seam. The computer-implemented method further includes, for at least one waypoint of a plurality of waypoints associated with the seam, generating a welding profile associated with a cross-section of the weld volume at the at least one waypoint. The computer-implemented method also includes generating, based on the welding profile, instructions for the welding robot to perform the multiple weld passes to apply a weld material in the weld volume.

In an additional aspect of the disclosure, a computer-implemented method of generating instructions for a welding robot includes receiving a welding fill plan for a seam to be welded via multiple welding passes, the seam defined based on a first part and a second part. The computer-implemented method also includes identifying, based on scan data received from one or more sensors, a welding volume associated with the seam. The computer-implemented method further includes generating instructions for the welding robot to perform the multiple weld passes to apply a weld material in the weld volume. The instructions are generated based on a comparison performed using the welding fill plan and the identified welding volume.

In an additional aspect of the disclosure, a computer-implemented method of generating instructions for a welding robot includes identifying a seam to be welded, the seam defined based on a first part and a second part. The computer-implemented method also includes generating a plurality of waypoints along a length of the seam. The computer-implemented method further includes generating, based on a plurality of feature components, a joint model of a cross-section of the seam for at least one waypoint of the plurality of waypoints.

In an additional aspect of the disclosure, a computer-implemented method of generating instructions for a welding robot includes identifying a seam to be welded, the seam defined based on a first part and a second part. The computer-implemented method also includes generating a plurality of waypoints along a length of the seam. The computer-implemented method further includes, for at least one waypoint of the plurality of waypoints, generating a welding profile associated with a cross-section of the seam at the at least one waypoint, the welding profile indicates an ordered sequence of weld beads to be formed. The computer-implemented method also includes generating instructions, based on the welding profile, for the welding robot to perform multiple weld passes to form the weld beads.

In an additional aspect of the disclosure, a computer-implemented method of generating instructions for a welding robot includes identifying the position of a seam on parts to be joined together via multiple welding passes. The identification of the seam is based on a Computer Aided Design (CAD) model of the parts and/or a scanned representation of the parts. The parts may include a first part and a second part separate from the first part. Additionally, or alternatively, the first part and the second part are positioned such that the first part and the second part form the seam along which the first and second parts are to be welded. In some instances, the scanned representation may be generated using one or more images captured by sensors communicatively coupled to the welding robot. The computer-implemented method further includes identifying a welding volume around the seam, where the welding volume is to include/receive the multiple weld passes. Each weld pass forms a weld layer at least partially inside the identified weld volume. The computer-implemented method also generates instructions for the welding robot to perform the multiple weld passes.

In an additional aspect of the disclosure, a computer-implemented method of generating instructions for a welding robot is performed by a controller. The method includes identifying a position of a seam on parts that are to be joined together via welding. The identification of the seam is based on a Computer Aided Design (CAD) model of the parts and/or a scanned representation of the parts. The parts may include a first part and a second part separate from the first part. Additionally, or alternatively, the first part and the second part are positioned such that the first part and the second part form the seam along which the first and second parts are to be welded. In some instances, the scanned representation may be generated using one or more images captured by sensors communicatively coupled to the welding robot. The computer-implemented method further includes generating a plurality of waypoints to represent the seam, or identifying a welding volume around the seam. The welding volume is configured to include/receive multiple weld layers that are configured to join the first and second parts together. The computer-implemented method for a welding robot also includes generating a welding profile for the identified welding volume. To generate the welding profile, the method may further include generating a weld fill plan for at least one of the plurality of the waypoints. The weld fill plan may include an ordered sequencing of weld beads within a cross-section associated the at least one waypoint of the plurality of the waypoints. The computer implemented method may include generating instructions for the welding robot to weld according to the weld fill plan.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Figure 1:
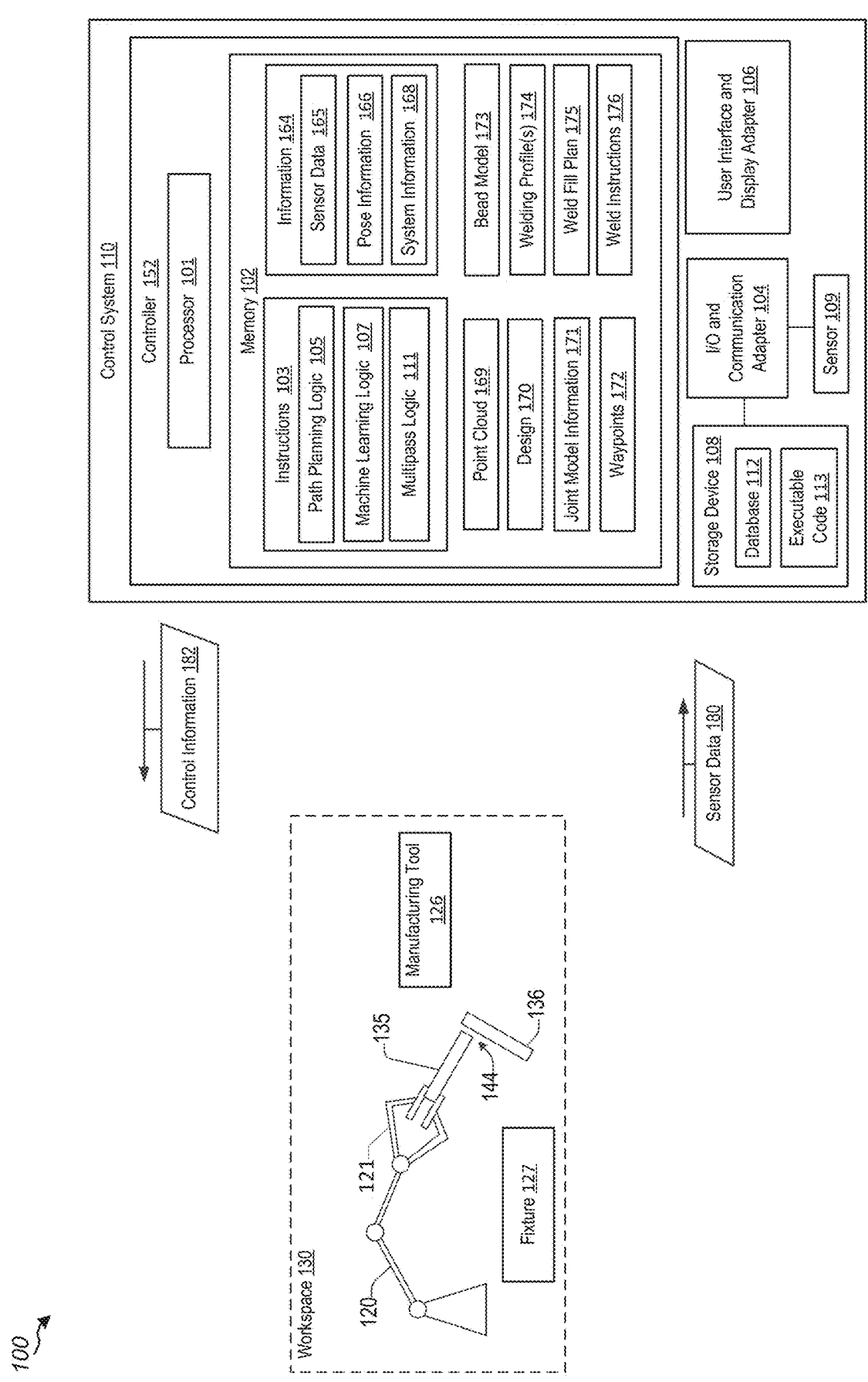
FIG. 1 is a block diagram illustrating a system configured to enable multipass welding in a robotic manufacturing environment according to one or more aspects.

FIG. 1 illustrates a system 100 configured to enable multipass welding in a robotic manufacturing environment according to one or more aspects. In some implementations, system 100 may include a processor-based system, an assembly robot system, or a combination thereof. System 100 of FIG. 1 is configured to enable multipass welding for one or more robots (e.g., manufacturing robots) functioning in a semi-autonomous or autonomous manufacturing environment. In some implementations, system 100 supports or is configured to generating instructions for a welding robot to perform multipass welding operations.

A manufacturing environment or robot, such as a semi-autonomous or autonomous welding environment or a semi-autonomous or autonomous welding robot, may include one or more sensors to scan some a part(s), one or more algorithms in the form of software that is configured to recognize a seam to be welded, and one or more algorithms in the form of software to program motion of a robot, the control of an operator, and any other devices such a motorized fixtures, in order to weld the identified seams correctly or as desired without collision. Additionally, or alternatively, the semi-autonomous or autonomous manufacturing environment or robot may also include one or more sensors to scan a part(s), one or more algorithms in the form of software that recognize, localize, or register a given model of the part(s) where the seams are detected using one or more sensors or have already been denoted in some way perhaps in the given model itself, and one or more algorithms in the form of software to program the motion of the robot(s), the control of the operator, and any other devices such a motorized fixtures, in order to weld the seams correctly or as desired without collision. It is noted that a semi-autonomous or autonomous welding robot may have these abilities in part, and where some user given or selected parameters may be required, or user (e.g., operator) involvement may be needed in other ways.

System 100 includes a control system 110, a robot 120 (e.g., a manufacturing robot), and a manufacturing workspace 130 (also referred to herein as a "workspace 130"). In some implementations, system 100 may include or correspond to an assembly robot system. System 100 may be configured to couple one or more parts, such as a first part 135 (e.g., a first part) and a second part 136 (e.g., a second part). For example, first part 135 and second part 136 may be designed to form a seam 144 between first part 135 and second part 136. Each of first part 135 and second part 136 may be any part, component, subcomponent, combination of parts or components, or the like and without limitation.

The terms "position" and "orientation" are spelled out as separate entities in the disclosure above. However, the term "position" when used in context of a part means "a particular way in which a part is placed or arranged." The term "position" when used in context of a seam means "a particular way in which a seam on the part is positioned or oriented." As such, the position of the part/seam may inherently account for the orientation of the part/seam. As such, "position" can include "orientation." For example, position can include the relative physical position or direction (e.g., angle) of a part or candidate seam.

Robot 120, also referred to herein as "robot 120", may be configured to perform a manufacturing operation, such as a welding operation, on one or more parts, such as first part 135 and second part 136. In some implementations, robot 120 can be a robot having multiple degrees of freedom in that it may be a six-axis robot with an arm having an attachment point. Robot 120 may include one or more components, such as a motor, a servo, hydraulics, or a combination thereof, as illustrative, non-limiting examples.

In some implementations, the attachment point may attach a weld head (e.g., a manufacturing tool) to robot 120.

Robot 120 may include any suitable tool 121, such as a manufacturing tool. Robot 120 (e.g., a weld head of robot 120) may be configured to move within the workspace 130 according to a path plan and/or weld plan received from control system 110 or a controller 152. Robot 120 is further configured to perform one or more suitable manufacturing processes (e.g., welding operations) on one or more parts (e.g., 135, 136) in accordance with the received instructions, such as control information 182. In some examples, robot 120 can be a six-axis robot with a welding arm. In some implementations, Robot 120 can be any suitable robotic welding equipment, such as YASKAWA® robotic arms, ABB® IRB robots, KUKA® robots, and/or the like Robot 120, in addition to the attached tool 121, can be configured to perform arc welding, resistance welding, spot welding, tungsten inert gas (TIG) welding, metal active gas (MAG) welding, metal inert gas (MIG) welding, laser welding, plasma welding, a combination thereof, and/or the like, as illustrative, non-limiting examples. Robot 120 may be responsible for moving, rotating, translating, feeding, and/or positioning the welding head, sensor(s), part(s), and/or a combination thereof. In some implementations, a welding head can be mounted on, coupled to, or otherwise attached to robot 120.

In some implementations, robot 120 may be coupled to or include one or more tools. For example, based on the functionality the robot performs, the robot arm can be coupled to a tool configured to enable (e.g., perform at least a part of) the functionality. To illustrate, a tool, such as tool 121, may be coupled to an end of robot 120. In some implementations, robot 120 may be coupled to or include multiple tools, such as a manufacturing tool (e.g., a welding tool), a sensor, a picker or holder tool, or a combination thereof. In some implementations, robot 120 may be configured to operate with another device, such as another robot device, as described further herein.

Tool 121 may include one or more tools. For example, tool 121 may include a manufacturing tool (e.g., a welding tool), a sensor (e.g., 109), a picker tool or a holder tool, or a combination thereof. As shown, tool 121 is the picker tool or the holder tool that is configured to be selectively coupled to a first set of one or more objects, such as a first set of one or more objects that include first part 135. In some implementations, the picker tool or the holder tool may include or correspond to a gripper, a clamp, a magnet, or a vacuum, as illustrative, non-limiting examples. For example, tool 121 may include a three-finger gripper, such as one manufactured by OnRobot®.

In some implementations, robot 120, tool 121, or a combination thereof, may be configured to change (e.g., adjust or manipulate) a pose of first part 135 while first part 135 is coupled to tool 121. For example a configuration of robot 120 may be modified to change the pose of first part 135. Additionally, or alternatively, tool 121 may be adjusted (e.g., rotated or tilted) with respect to robot 120 to change the pose of first part 135.

A manufacturing tool 126 may be included in system 100 and configured to perform one or more manufacturing tasks or operations. The one or more manufacturing tasks or operations may include welding, brazing, soldering, riveting, cutting, drilling, or the like, as illustrative, non-limiting examples. In some implementations, manufacturing tool 126 is a welding tool configured to couple two or more objects together. For example, the weld tool may be configured to weld two or more objects together, such as welding first part 135 to the second part 136. To illustrate, the weld tool may be configured to lay a weld metal along a seam formed between first part 135 and second part 136. Additionally, or alternatively, the weld tool may be configured to fuse first part 135 and second part 136 together, such as fusing the seam formed between first part 135 and second part 136 to couple first part 135 and second part 136 together. In some implementations, manufacturing tool 126 may be configured to perform the one or more manufacturing tasks or operations responsive to a manufacturing instruction, such as a weld instruction. Although shown as being separate from robot 120, in other implementations, manufacturing tool 126 may be coupled to robot 120 or to another robot.

Workspace 130 may also be referred to as a manufacturing workspace. Workspace 130 may be or define an area or enclosure within which a robot arm(s), such as robot 120, operates on one or more parts based on or in conjunction with information from one or more sensors. In some implementations, workspace 130 can be any suitable welding area designed with appropriate safety measures for welding. For example, workspace 130 can be a welding area located in a workshop, job site, manufacturing plant, fabrication shop, and/or the like. In some implementations, at least a portion of system 100 is positioned with workspace 130. For example, workspace 130 may be an area or space within which one or more robot devices (e.g., a robot arm(s)) is configured to operate on one or more objects (or parts). The one or more objects may be positioned on, coupled to, stored at, or otherwise supported by one or more platforms, containers, bins, racks, holders, or positioners. One or more objects (e.g., 135 or 136) may be held, positioned, and/or manipulated in workspace 130 using fixtures and/or clamps (collectively referred to as "fixtures" or fixture 127). In some examples, workspace 130 may include one or more sensors, fixture 127, and robot 120 that is configured to perform welding-type processes, such as welding, brazing, and bonding on one or more parts to be welded (e.g., a part having a seam).

Fixture 127 may be configured to hold, position, and/or manipulate one or more parts (135, 136). In some implementations, fixture 127 may include or correspond to tool 121 or manufacturing tool 126. Fixture may include a clamp, a platform, a positioner, or other types of fixture, as illustrate, non-limiting examples. In some examples, fixture 127 is adjustable, either manually by a user or automatically by a motor. For example, fixture 127 may dynamically adjust its position, orientation, or other physical configuration prior to or during a welding process.

Control system 110 is configured to operate and control a robot 120 to perform manufacturing functions in workspace 130. For instance, control system 110 can operate and/or control robot 120 (e.g., a welding robot) to perform welding operations on one or more parts. Although described herein with reference to a welding environment, the manufacturing environment may include one or more of any of a variety of environments, such as assembling, painting, packaging, and/or the like. In some implementations, workspace 130 may include one or more parts (e.g., 135 or 136) to be welded. The one or more parts may be formed of one or more different parts. For example, the one or more parts may include a first part (e.g., 135) and a second part (e.g., 136), and the first and second parts form a seam (e.g., 144) at their interface. In some implementations, the first and second parts may be held together using tack welds. In other implementations, the first and second parts may not be welded and robot 120 just performs tack welding on the seam of the first and second parts so as to lightly bond the parts together. Additionally, or alternatively, following the formation of the tack welds, robot 120 may weld additional portions of the seam to tightly bond the parts together. In some implementations, robot 120 may perform a multipass welding operation to lay weld material in seam 144 to form a joint.

In some implementations, control system 110 may be implemented externally with respect to robot 120. For example, control system 110 may include a server system, a personal computer system, a notebook computer system, a tablet system, or a smartphone system, to provide control of robot 120, such as a semi-autonomous or autonomous welding robot. Although control system 110 is shown as being separate from robot 120, a portion or an entirety of control system 110 may be implemented internally to robot 120. For example, the portion of control system 110 internal to robot 120 may be as included as a robot control unit, an electronic control unit, or an on-board computer, and may be configured to provide control of robot 120, such as a semi-autonomous or autonomous welding robot.

Control system 110 implemented internally or externally with respect to robot 120 may collectively be referred to herein as "robot controller 110". Robot controllers 110 may be included in or be coupled to a seam identification system, a trajectory planning system, a weld simulation system, another system relevant to the semi-autonomous or autonomous welding robots, or a combination thereof. It is noted that one or more a seam identification system, a trajectory planning system, a weld simulation system, or another system relevant to the semi-autonomous or autonomous welding robots may be implemented independently or externally of control system 110.

Control system 110 may include one or more components. For example, control system 110 may include a controller 152, one or more input/output (I/O) and communication adapters 104 (hereinafter referred to collectively as "I/O and communication adapter 104"), one or more user interface and/or display adapters 106 (hereinafter referred to collectively as "user interface and display adapter 106"), a storage device 108, and one or more sensors 109 (hereinafter referred to ss "sensor 109"). The controller 152 may include a processor 101 and a memory 102. Although processor 101 and memory 102 are both described as being included in controller 152, in other implementations, processor 101, memory 102, or both may be external to controller 152, such that each of processor 101 or memory 102 may be one or more separate components.

Controller 152 may be any suitable machine that is specifically and specially configured (e.g., programmed) to perform one or more operations attributed herein to controller 152, or, more generally, to system 100. In some implementations, controller 152 is not a general-purpose computer and is specially programmed or hardware-configured to perform the one or more operations attributed herein to controller 152, or, more generally, to system 100. Additionally, or alternatively, the controller 308 is or includes an application-specific integrated circuit (ASIC), a central processing unit (CPU), a field programmable gate array (FPGA), or a combination thereof. In some implementations, controller 152 includes a memory, such as memory 102, storing executable code, which, when executed by controller 152, causes controller 152 to perform one or more of the actions attributed herein to controller 152, or, more generally, to system 100. Controller 152 is not limited to the specific examples described herein.

In some implementations, controller 152 is configured to control sensor(s) 109 and robot 120 within workspace 130. Additionally, or alternatively, controller 152 is configured to control fixture(s) 127 within workspace 130. For example, controller 152 may control robot 120 to perform welding operations and to move within workspace 130 according to a path planning and/or weld planning techniques. Controller 152 may also manipulate fixture(s) 127, such as a positioner (e.g., platform, clamps, etc.), to rotate, translate, or otherwise move one or more parts within workspace 130. Additionally, or alternatively, controller 152 may control sensor (s) 109 to move within workspace 130 and/or to capture images (e.g., 2D or 3D), audio data, and/or EM data.

In some implementations, controller 152 may also be configured to control other aspects of system 100. For example, controller 152 may further interact with user interface (UI) and display adapter 106. To illustrate, controller 152 may provide a graphical interface on UI and display adapter 106 by which a user may interact with system 100 and provide inputs to system 100 and by which controller 152 may interact with the user, such as by providing and/or receiving various types of information to and/or from a user (e.g., identified seams that are candidates for welding, possible paths during path planning, welding parameter options or selections, etc.). UI and display adapter 106 may be any type of interface, including a touchscreen interface, a voice-activated interface, a keypad interface, a combination thereof, etc.

In some implementations, control system 110 may include a bus (not shown). The bus may be configured to couple, electrically or communicatively, one or more components of control system 110. For example, the bus may couple controller 152, processor 101, memory 102, I/O and communication adapter 104, and user interface and display adapter 106. Additionally, or alternatively, the bus may couple one or more components or portions of controller 152, processor 101, memory 102, I/O and communication adapter 104, and user interface and display adapter 106.

Processor 101 may include a central processing unit (CPU), which may also be referred to herein as a processing unit. Processor 101 may include a general purpose CPU, such as a processor from the CORE family of processors available from Intel Corporation, a processor from the ATHLON family of processors available from Advanced Micro Devices, Inc., a processor from the POWERPC family of processors available from the AIM Alliance, etc. However, the present disclosure is not restricted by the architecture of processor 101 as long as processor 101 supports one or more operations as described herein. For example, processor 101 may include one or more special purpose processors, such as an application specific integrated circuit (ASIC), a graphics processing unit (GPU), a field programmable gate array (FPGA), etc.

Memory 102 may include a storage device, such as random access memory (RAM) (e.g., SRAM, DRAM, SDRAM, etc.), ROM (e.g., PROM, EPROM, EEPROM, etc.), one or more HDDs, flash memory devices, SSDs, other devices configured to store data in a persistent or non-persistent state, or a combination of different memory devices. Memory 102 is configured to store user and system data and programs, such as may include some or all of the aforementioned program code for performing functions of the machine learning logic-based adjustment techniques and data associated therewith.

Memory 102 includes or is configured to store instructions 103 and information 164. Memory 102 may also store other information or data, such as a design 170, joint model information 171, one or more waypoints 172, a bead model, a cross-sectional weld profile 174, a weld fill plan 175, and weld instructions 176. In one or more aspects, memory 102 may store the instructions 103, such as executable code, that, when executed by the processor 101, cause processor 101 to perform operations according to one or more aspects of the present disclosure, as described herein. In some implementations, instructions 103 (e.g., the executable code) is a single, self-contained, program. In other implementations, the instructions (e.g., the executable code) is a program having one or more function calls to other executable code which may be stored in storage or elsewhere. The one or more functions attributed to execution of the executable code may be implemented by hardware. For example, multiple processors may be used to perform one or more discrete tasks of the executable code.

Instructions 103 may include path planning logic 105, machine learning logic 107, and multipass logic 111. Additionally, or alternatively, instructions 103 may include other logic, such as registration logic as described further herein at least with reference to FIG. 7. Although shown as separate logical blocks, path planning logic 105, machine learning logic 107, and/or multipass logic 111 may be part of memory 102 and may include the program code (and data associated therewith) for performing functions of path planning machine learning, and multipass operations, respectively. For example, path planning logic 105 is configured to generating a path for robot 120 along a seam, including but not limited to, optimizing movements of robot 120 to complete a weld. Additionally, or alternatively although shown as separate logical blocks, path planning logic 105, machine learning logic 107, and multipass logic 111 may be combined. Further, other logic (e.g., registration logic) may be included or combined with, path planning logic 105, machine learning logic 107, and multipass logic 111.

As an illustrate, non-limiting example, path planning logic 105 may be configured for graph-matching or graph-search approaches to generate a path or trajectory conforming to an identified seam. In the case of welding, the task of welding with a weld head coupled to a robotic arm may be specified in 5 degrees of freedom. The hardware capability of the system (robotic arm's 5 degrees of freedom) exceeds 5 degrees of freedom. In some implementations, path planning logic 105 may perform a search using more than 5 degrees of freedom, such as when considering collision avoidance. There are multiple ways to work around this redundancy, first being to constrain the over-actuated system by specifying the task in a higher dimension, or utilize the redundancy and explore multiple options. Conventionally, path planning has been generally posed as a graph search problem. It may be considered over-actuated planning, and in some implementations, the redundant degree(s) of freedom can be discretized and each sample can be treated as a unique node in building a graph. The structure of the resulting graph may allow for fast graph search algorithms. Each point on the seam can be considered as a layer in the graph, similar to the rungs of a ladder. The nature of the path planning problem is such that the robot must always transition between these rungs in the forward direction. This is the first aspect of the problem that makes graph search simpler. Path planning logic 105 generates multiple joint space solutions for each point on the seam. All the solutions for a given point belong to the same layer. There is no point for a robot to transition between different solutions of the same rung, hence, in the graph, these nodes are not connected. This adds further restrictions on the structure of the graph.

Figure 3:
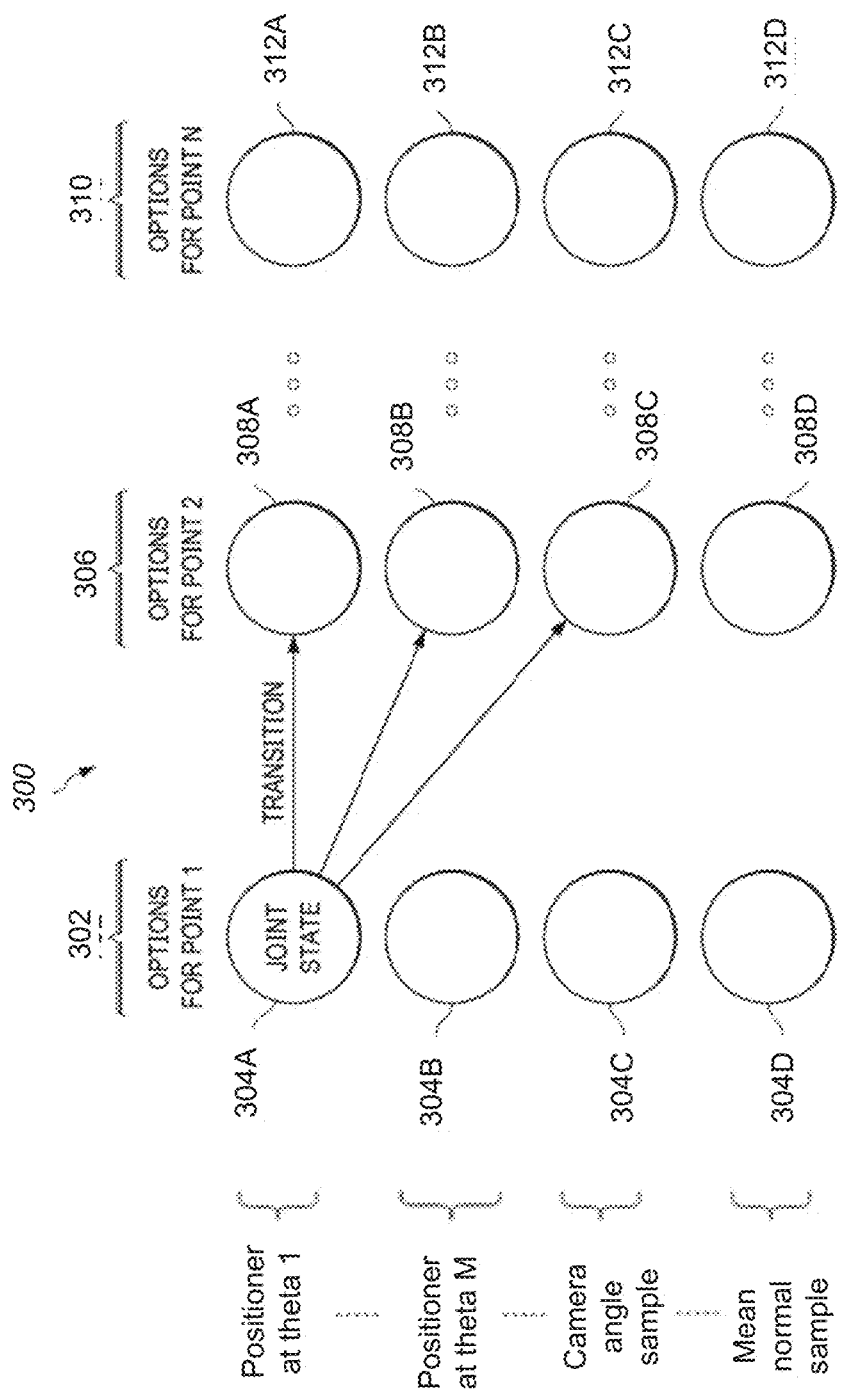
FIG. 3 is a schematic diagram of a graph-search technique according to one or more aspects.

Referring to FIG. 3, FIG. 3 is a schematic diagram 300 of a graph-search technique according to one or more aspects. In some implementations, schematic diagram represents a graph-search technique by which the path plan for robot 120 may be determined (e.g., controller 152). For example, the graph-search technique may be performed using path planning logic 105.

In some implementations, each circle in the diagram 300 represents a different state of robot 120, such as a configuration of joints (of robot 120) that satisfies welding requirements, as illustrative, non-limiting examples. Each arrow is a path that the robot can take to travel along the seam. To illustrate, each circle may be a specific location of robot 120 (e.g., the location of a weld head of robot 120 in 3D space) within workspace 130 and a different configuration of an arm of robot 120, as well as a position or configuration of a fixture supporting the part, such as a positioner, clamp, etc. Each column 302, 306, and 310 represents a different point, such as a waypoint, along a seam to be welded. Thus, for the seam point corresponding to column 302, robot 120 may be in any one of states 304A-304D. Similarly, for the seam point corresponding to column 306, robot 120 may be in any one of states 308A-308D. Likewise, for the seam point corresponding to column 310, robot 120 may be in any one of states 312A-312D. If, for example, robot 120 is in state 304A when at the seam point corresponding to column 302, robot 120 may then transition to any of the states 308A-308D for the next seam point corresponding to the column 306. Similarly, upon entering a state 308A-308D, robot 120 may subsequently transition to any of the states 312A-312D for the next seam point corresponding to the column 310, and so on. In some examples, entering a particular state may preclude entering other states. For example, entering state 304A may permit the possibility of subsequently entering states 308A-308C, but not 308D, whereas entering state 304B may permit the possibility of subsequently entering states 308C and 308D, but not states 308A-308B. The scope of this disclosure is not limited to any particular number of seam points or any particular number of robot states.

In some examples, to determine a path plan for robot 120 using the graph-search technique (e.g., according to the technique depicted in diagram 300), controller 152, such as path planning logic 105, may determine the shortest path from a state 304A-304D to a state corresponding to a seam point N (e.g., a state 312A-312D). By assigning a cost to each state and each transition between states, an objective function can be designed by a user or controller 152. The controller 152 finds the path that results in the least possible cost value for the objective function. Due to the freedom of having multiple starts and endpoints to choose from, graph search methods like Dijkstra's algorithm or A* may be implemented. In some examples, a brute force method may be useful to determine a suitable path plan. The brute force technique would entail control system 110 (e.g., controller 152 or processor 101) computing all possible paths (e.g., through the diagram 300) and choosing the shortest one (e.g., by minimizing or maximizing the objective function). Simply put, the brute force method would compute all the possible paths through this graph and choose the shortest one. The complexity of the brute force method may be O(E), where E is the number of edges in the graph. Assuming N points in a seam with M options per point. Between any two layers, there are M*M edges. Hence, considering all layers, there are N*M*M edges. The time complexity is $O(NM^2)$, or O(E).

Controller 152, such as path planning logic 105, may determine whether the state at each seam point is feasible, meaning at least in part that controller 152 may determine whether implementing the chain of states along the sequence of seam points of the seam will cause any collisions between robot 120 and structures in workspace 130, or even with parts of robot 120 itself. To this end, the concept of realizing different states at different points of a seam may alternatively be expressed in the context of a seam that has multiple waypoints, such as waypoints 172.

In some implementations, controller 152 may discretize an identified seam into a sequence of waypoints. A waypoint may constrain an orientation of the weld head connected to the robot 120 in three (spatial/translational) degrees of freedom. Typically, constraints in orientation of the weld head of the robot 120 are provided in one or two rotational degrees of freedom about each waypoint, for the purpose of producing some desired weld of some quality; the constraints are typically relative to the surface normal vectors emanating from the waypoints and the path of the weld seam. For example, the position of the weld head can be constrained in x-, y-, and z-axes, as well as about one or two rotational axes perpendicular to an axis of the weld wire or tip of the welder, all relative to the waypoint and some nominal coordinate system attached to it. These constraints, in some examples, may be bounds or acceptable ranges for the angles. Those skilled in the art will recognize that the ideal or desired weld angle may vary based on part or seam geometry, the direction of gravity relative to the seam, and other factors. In some examples, controller 152 may constrain in a first position or a second position to ensure that the seam is perpendicular to gravity for one or more reasons (such as to find a balance between welding and path planning for optimization purposes). The position of the weld head can therefore be held (constrained) by each waypoint at any suitable orientation relative to the seam. Typically, the weld head will be unconstrained about a rotational axis ($\theta$) coaxial with an axis of the weld head. For instance, each waypoint can define a position of the weld head of the welding robot 120 such that at each waypoint, the weld head is in a fixed position and orientation relative to the weld seam. In some implementations, the waypoints are discretized finely enough to make the movement of the weld head substantially continuous.

In some implementations, controller 152 may divide each waypoint into multiple nodes. Each node can represent a possible orientation of the weld head at that waypoint. As an illustrative, non-limiting example, the weld head can be unconstrained about a rotational axis coaxial with the axis of the weld head such that the weld head can rotate (e.g., 360 degrees) along a rotational axis $\theta$ at each waypoint. Each waypoint can be divided into 20 nodes, such that each node of each waypoint represents the weld head at 18 degree of rotation increments. For instance, a first waypoint-node pair can represent rotation of the weld head at 0 degrees, a second waypoint-node pair can represent rotation of the weld head at from 18 degrees, a third waypoint-node pair can represent rotation of the weld head at 36 degrees, etc. Each waypoint can be divided into 2, 10, 20, 60, 120, 360, or any suitable number of nodes. The subdivision of nodes can represent the division of orientations in more than 1 degree of freedom. For example, the orientation of the welder tip about the waypoint can be defined by 3 angles. A weld path can be defined by linking each waypoint-node pair. Thus, the distance between waypoints and the offset between adjacent waypoint nodes can represent an amount of translation and rotation of the weld head as the weld head moves between node-waypoint pairs.

Controller 152, such as path planning logic 105, can evaluate each waypoint-node pair for feasibility of welding. For instance, if a waypoint is divided into 20 nodes, controller 152 can evaluate whether the first waypoint-node pair representing the weld head held at 0 degrees would be feasible. Stated differently, controller 152 can evaluate whether robot 120 would collide or interfere with a part (135, 136), fixture 127, or the welding robot itself, if placed at the position and orientation defined by that waypoint-node pair. In a similar manner, controller 152 can evaluate whether the second waypoint-node pair, third waypoint-node pair, etc., would be feasible. Controller 152 can evaluate each waypoint similarly. In this way, all feasible nodes of all waypoints can be determined.

In some examples, a collision analysis as described herein may be performed by comparing a 3D model of workspace 130 and a 3D model of robot 120 to determine whether the two models overlap, and optionally, some or all of the triangles overlap. The 3D model of workspace, the 3D model of robot 120, or both, may be stored at memory 102, or storage device 108, as illustrative, non-limiting examples. If the two models overlap, controller 152 may determine that a collision is likely. If the two models do not overlap, controller 152 may determine that a collision is unlikely. More specifically, in some examples, controller 152 may compare the models for each of a set of waypoint-node pairs (such as the waypoint node pairs described above) and determine that the two models overlap for a subset, or even possibly all, of the waypoint-node pairs. For the subset of waypoint-node pairs with respect to which model intersection is identified, controller 152 may omit the waypoint-node pairs in that subset from the planned path and may identify alternatives to those waypoint-node pairs. Controller 152 may repeat this process as needed until a collision-free path has been planned. Controller 152 may use a flexible collision library (FCL), which includes various techniques for efficient collision detection and proximity computations, as a tool in the collision avoidance analysis. The FCL may be stored at memory 102 or storage device 108, as illustrative, non-limiting examples. The FCL is useful to perform multiple proximity queries on different model representations, and it may be used to perform probabilistic collision identification between point clouds. Additional or alternative resources may be used in conjunction with or in lieu of the FCL.

Controller 152 can generate one or more feasible simulate (or evaluate, both terms used interchangeably herein) weld paths should they physically be feasible. A weld path can be a path that the welding robot (e.g., 120) takes to weld a seam. In some examples, the weld path may include all the waypoints of a seam. Alternatively, the weld path may include some but not all the waypoints of the seam. The weld path can include the motion of robot 120 and the weld head as the weld head moves between each waypoint-node pair. Once a feasible path between node waypoint pairs is identified, a feasible node-waypoint pair for the next sequential waypoint can be identified should it exist. Those skilled in the art will recognize that many search trees or other strategies may be employed to evaluate the space of feasible node-waypoint pairs. Additionally, or alternatively, as discussed herein, a cost parameter can be assigned or calculated for movement from each node-waypoint pair to a subsequent node-waypoint pair. The cost parameter can be associated with a time to move, an amount of movement (e.g., including rotation) between node-waypoint pairs, and/or a simulated/expected weld quality produced by the weld head during the movement.

In instances in which no nodes are feasible for welding for one or more waypoints and/or no feasible path exists to move between a previous waypoint-node pair and any of the waypoint-node pairs of a particular waypoint, controller 152, such as path planning logic 105, can determine alternative welding parameters such that at least some additional waypoint-node pairs become feasible for welding. For example, if controller 152 determines that none of the waypoint-node pairs for a first waypoint are feasible, thereby making the first waypoint unweldable, controller 152 can determine an alternative welding parameters, such as an alternative weld angle so that at least some waypoint-node pairs for the first waypoint become weldable. For example, controller 152 can remove or relax the constraints on rotation about the x and/or y axis. Similarly stated, controller 152 can allow the weld angle to vary in one or two additional rotational (angular) dimensions. For example, controller 152 can divide a waypoint that is unweldable into two- or three-dimensional nodes. Each node can then be evaluated for welding feasibility of the welding robot and weld held in various weld angles and rotational states. The additional rotation about the x- and/or y-axes or other degrees of freedom may make the waypoints accessible to the weld head such that the weld head does not encounter any collision. In some implementations, controller 152—in instances in which no nodes are feasible for welding for one or more waypoints and/or no feasible path exists to move between a previous waypoint-node pair and any of the waypoint-node pairs of a particular waypoint—can use the degrees of freedom in determining feasible paths between a previous waypoint-node pair and any of the waypoint-node pairs of a particular waypoint.

Based on the generated weld paths, controller 152 can optimize the weld path for welding. As used herein, Optimal and optimize do not refer to determining an absolute best weld path, but generally refers to techniques by which weld time can be decreased and/or weld quality improved relative to less efficient weld paths. To illustrate, controller 152 can determine a cost function that seeks local and/or global minima for the motion of robot 120. Typically, the optimal weld path minimizes weld head rotation, as weld head rotation can increase the time to weld a seam and/or decrease weld quality. Accordingly, optimizing the weld path can include determining a weld path through a maximum number of waypoints with a minimum amount of rotation.

In evaluating the feasibility of welding at each of the divided nodes or node waypoint pairs, controller 152 may perform multiple computations. In some examples, each of the multiple computations may be mutually exclusive from one another. In some examples, the first computation may include kinematic feasibility computation, which computes for whether the arm of robot 120 of the welding robot being employed can mechanically reach (or exist) at the state defined by the node or node-waypoint pair. In some examples, in addition to the first computation, a second computation—which may be mutually exclusive to the first computation—may also be performed by controller 152. The second computation may include determining whether the arm of robot 120 will encounter a collision (e.g., collide with workspace 130 or a structure in workspace 130) when accessing the portion of the seam (e.g., the node or node-waypoint pair in question).

Controller 152, such as path planning logic 105, may perform the first computation before performing the second computation. In some examples, the second computation may be performed only if the result of the first computation is positive (e.g., if it is determined that the arm of robot 120 can mechanically reach (or exist) at the state defined by the node or node-waypoint pair). In some examples, the second computation may not be performed if the result of the first computation is negative (e.g., if it is determined that the arm of robot 120 cannot mechanically reach (or exist) at the state defined by the node or node-waypoint pair).

The kinematic feasibility may correlate with the type of robotic arm employed. In some implementations, welding robot 120 includes a six-axis robotic welding arm with a spherical wrist. The six-axis robotic arm can have 6 degrees of freedom—three degrees of freedom in X-, Y-, Z-cartesian coordinates and three additional degrees of freedom because of the wrist-like nature of robot 120. For example, the wrist-like nature of robot 120 results in a fourth degree of freedom in wrist-up/-down manner (e.g., wrist moving in +y and −y direction), a fifth degree of freedom in wrist-side manner (e.g., wrist moving in −x and +x direction), and sixth degree of freedom in rotation. In some examples, the welding torch is attached to the wrist portion of robot 120.

Figure 4:
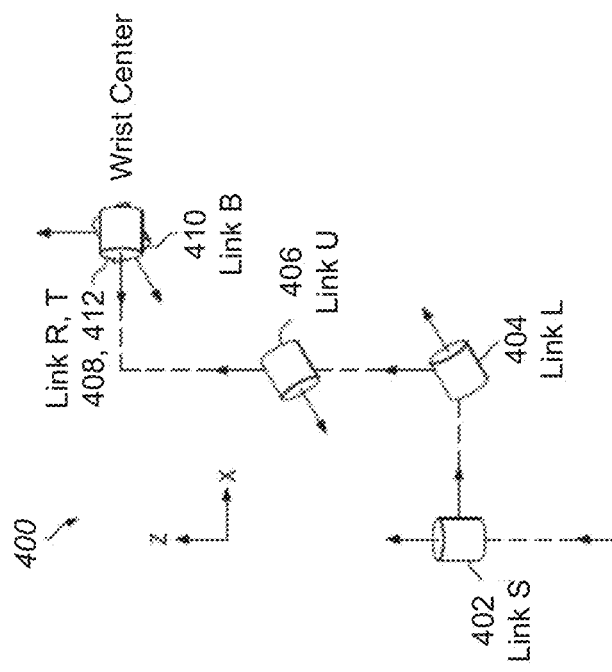
FIG. 4 is a diagram of a representation of a robotic arm according to one or more aspects.

To determine whether the arm of robot 120 being employed can mechanically reach (or exist) at the state defined by the node or node-waypoint pair—e.g., to perform the first computation—robot 120 may be mathematically modeled. An example of a representation 400 of a robotic arm according to one or more aspects is shown with reference to FIG. 4. In some examples, controller 152, such as path planning logic 105, may solve for the first three joint variables based on a wrist position and solve for the other three joint variables based on wrist orientation. It is noted that a torch (e.g., a weld head) is attached rigidly on the wrist. Accordingly, the transformation between torch tip and wrist is assumed to be fixed. Referring to FIG. 4, representation 400 of the robotic arm includes a base, a wrist center, and links B 410, L 404, R 408, S 402, T 412, and U 406, which may be considered as joint variables. To find the first three joint variables (e.g., variables S, L, U at 402, 404, 406, respectively), the geometric approach (e.g., law of cosine) may be employed.

After the first three joint variables (i.e., S, L, U) are computed successfully, controller 152 may then solve for the last three joint variables (i.e., R, B, T at 408, 410, 412, respectively) by, for example, considering wrist orientation as a Z-Y-Z Euler angle. Controller 152 may consider some offsets in robot 120. These offsets may need to be considered and accounted for because of inconsistencies in the unified robot description format (URDF) file. For example, in some examples, values (e.g., a joint's X axis) of the position of a joint (e.g., actual joint of robot 120) may not be consistent with the value noted in its URDF file. Such offset values may be provided to controller 152 in a table, such as a data stored at memory 102 or storage device 108. Controller 152, in some examples, may consider these offset values while mathematically modeling robot 120. In some examples, after robot 120 is mathematically modeled, controller 152 may determine whether the arm of robot 120 can mechanically reach (or exist) at the states defined by the node or node-waypoint pair.

As noted above, controller 152 can evaluate whether robot 120 would collide or interfere with one or more parts (135, 136), fixture 127, or anything else in workspace 130, including robot 120 itself, if placed at the position and orientation defined by that waypoint-node pair. Once controller 152 determines the states in which the robotic arm can exist, controller 152 may perform the foregoing evaluation (e.g., regarding whether the robot would collide something in its environment) using the second computation.

Referring back to FIG. 1, machine learning logic 107 is configured to learn from and adapt to a result based on one or more welding operations performed by robot 120. During or based on operation of system 100, a machine learning logic (e.g., machine learning logic 107) is provided with sensor data 180 associated with at least a portion of a weld formed by robot 120. For example, sensor data 180 may indicate one or more spatial characteristics of a weld. In some implementations, the portion of the weld may include or correspond to one or more passes of a multipass welding operation.

In some implementations, machine learning logic 107 is configured to update a model, such as bead model 173 or a welding model, based on sensor data 180. For example, bead model 173 may be configured to predict a profile of a bead and the welding model may be configured to generate one or more weld instructions (e.g., 176) to achieve the profile of the bead or a weld fill plan (e.g., 175). Controller 152 may generate a first set of weld instructions based on bead model 173, the welding model, or a combination thereof. After execution of the first set of weld instructions by robot 120, controller 152 may receive feedback information (e.g., sensor data 180). Machine learning logic 107 may update bead model 173 or the welding model based on the feedback. Updating bead model 173 or the welding model may involve minimizing an error function that describes the difference between a predicted shape and the shape that is observed after execution. For example, machine learning logic 107 may formulate the error as an L2 norm.

Multipass logic 111 is configured to determine a weld fill plan that includes multiple weld passes for a seam. For example, controller 152 may execute multipass logic 111 to generate one or more welding profiles (e.g., 174), a weld fill plan (e.g., 175), one or more weld instructions (e.g., 176), or a combination thereof, as described further herein.

Information 164 may include or indicate sensor data 165, pose information 166, or system information 168. Sensor data 165 may include or correspond to the sensor data 180 received by controller 152. Pose information 166 may include or correspond to a pose of first part 135, second part 136, or a combination thereof. System information 168 may include information associated with one or more devices (e.g., robot 120, tool 121, manufacturing tool 126, or sensor 109). To illustrate, system information 168 may include ID information, a communication address, one or more parameters, or a combination thereof, as illustrative, non-limiting examples. Additionally, or alternatively, system information 168 may include or indicate a location 159 (e.g., of seam 144), a path plan, a motion plan, a work angle, a tip position, or other information associated with movement of robot 120, a voltage, a current, a feed rate, or other information associated with a weld operation, or a combination thereof.

Design 170 may include or indicate a CAD model of one or more parts. In some implementations, the CAD model may be annotated with or indicate one or more weld parameters, a geometry or shape of a weld, dimensions, tolerances, or a combination thereof. Joint model information 171 may include or indicate a plurality of feature components. The plurality of features components may indicate or be combined to indicate a joint model. In some implementations, each feature component of the plurality of feature components includes a feature point, a feature point vector, a tolerance, or a combination thereof. One or more waypoints 172 may include, indicate, or correspond to a location along seam 144.

Bead model 173 is configured to model an interaction of a bead weld placed on a surface. For example, bead model 173 may indicate a resulting bead profile or cross-sectional area of a bead weld placed on the surface. In some implementations, bead model is a first order model that models formation of a bead weld based on an energy source and change of a shape or profile (e.g., an exposed bead cap) of the bead weld.

In some implementations, bead model 173 may be configured to indicate or relate energy sources or sinks associated with a bead that push and pull on an exposed bead cap. Bead model 173 may relate a radius of influence on each energy source or sink has on one or more points of the exposed bead cap. Bead model 173 may also include a weighting face that can be applied to its normal based on equating the influence of each energy source and sink. It is noted that movement along its normal can emulate how area of a bead weld can be redistributed along a surface.

Bead model 173 may also link an end of the expanded bead cap to the surface—e.g., a toe contact angle. To model the toe contact angle, bead model 173 may account for or factor surface tension, torch angle, aspect ratio, or a combination thereof. The surface tension may be associated with pressure on a bead (on a plate) due to gravity. The torch angle may represent a work angle and, therefore, an arc distribution. The closer the torch is to the surface, the greater the temperature of the weld pool which decreases surface tension in a direction of the torch and increases a wetting effect. The aspect ratio may represent an effect that voltage can have on the arc cone angle causing wetting to be more or less pronounced. Bead model 173 may use a first order system model to control the convergence of the bad cap into the wetted toe point.

In some implementations, bead model 173 models energy sources using equations:

$$r_p = p - o_i$$

$$u_r = \frac{r_p}{\|r_p\|}$$

$$\alpha_p = |N_p \cdot u_r|$$

$$A_p^i = \frac{A_i}{|A_i| \times A_p}$$

$$f_o(x) = \frac{1}{\sigma\sqrt{2\pi}} e^{(-x^2/2\sigma^2)}$$

$$E_p^i = f_o(\|r_p\|)\alpha_p A_p^i$$

$$E_p^g = \beta_g N_p \cdot g$$

$$w_p = \sum_i E_p^i (1 + E_p^g)$$

$$J(\beta) = A_{bead} - A * (\beta w)$$

$$\min_{\beta \in B} J(\beta) = 0$$

and models the toe contact angle based on equations:

$$r_{toe} = p_{toe} - p$$

$$r_{com} = p_{toe} - o_{com}$$

$$\delta_{AR}(w_{bead}, h_{bead}) = w_{bead} C_{AR}\left(1 - e^{AR_{nominal} - \frac{w_{bead}}{h_{bead}}}\right)$$

$$\delta_{WA}(d_{CTWD}, h_{bead}, u_{torch}, r_{toe}) = d_{CTWD} C_{WA}\left(1 - e^{\frac{-\beta_{WA}}{h_{bead} + \|r_{toe}\|} r_{toe} \cdot u_{torch}}\right)$$

$$\delta_{ST}(h_{bead}, g, r_{com}) = h_{bead} C_{ST} \|g\| \left(1 - e^{\frac{\beta_{ST}}{h_{bead} + \|r_{com}\|} r_{com} \cdot g}\right)$$

$$x = [h_{bead}, w_{bead}, d_{CTWD}, g, u_{torch}, r_{toe}, r_{com}]$$

-continued $$\delta_{wetting}(x) = \delta_{AR} + \delta_{WA} + \delta_{ST}$$

$$\forall x \in [0, 1]$$

$$\beta_1 \in [0, \infty)$$

$$\beta_2 \in (0, \infty)$$

$$r_{toe}^j = p_{toe} - p_i$$

$$\alpha_i(x) = e^{1-(1+\beta_i)\left(\beta_2 \frac{s(x)}{max(s)}+1\right)}$$

$$p_i'(x) = p_i + \alpha_i(x) r_{toe}^j$$

where p is a 2D point along a bead segment, $A_p$ is the area of a closest internal source at p, $N_p$ is the normal of the bead cap at p, $o_i$ is the center of mass of the ith energy source, $A_i$ is the area of the ith energy source, σ is a radius of the influence for each energy source, $A_{bead}$ is a parameterized area of the bead model, $w_{bead}$ is a parameterized width of the bead model, $h_{bead}$ is a parameterized height of the bead model, g is a unit vector of gravity in the local reference frame, A* is the functional representing the area distribution algorithm, β is a scalar constant value, C is a scalar constant value, AR is the aspect ratio of a bead (w/h), $u_{torch}$ is the unit vector of the work angle originating from the bead origin, $d_{CTWD}$ is a magnitude of the contact tip to work distance, and s(x) is the arc length of the bead cap segment.

In some implementations, bead model 173 may take the shape of a parameterized curvature model. The parameterization of bead model 173 may help maintain a core shape that can be adjusted to properly model various characteristics under different conditions. Additionally, a beam may be modeled or altered based on one or more interaction models such that a shape profile of the bead can be created with increased accuracy and stability. In some implementations, data may be collected from various testing and experiments to be analyzed and annotated for essential geometric measurements. These measurements may be used in a regression model to associate a bead width and a bead height or aspect ratio, as well as the area with a set of welding parameters.

Cross-sectional weld profile 174 (also referred to herein as "weld profile 174") may include or indicate a cross-section of seam 144, such as a cross-section of seam 144 that includes weld material. Weld profile 174 may correspond to a waypoint of one or more waypoints 172. In some implementations, weld profile may include or indicate a joint model, one or more weld beads or weld be locations, or a combination thereof. Weld fill plan 175 indicates one or more fill parameters, one or more weld bead parameters (e.g., one or more weld bead profiles), or a combination thereof. The one or more fill parameters may include or indicate a number of beads, a sequence of beads, a number of layers, a fill area, a cover profile shape, a weld size, or a combination thereof, as illustrative, non-limiting examples. The one or more weld bead parameters may include or indicate a bead size (e.g., a height, width, or distribution, a bead spatial property (e.g., a bead origin or a bead orientation), or a combination thereof, as illustrative, non-limiting examples. Additionally, or alternatively, weld fill plan 175 may include or indicate one or more welding parameters for forming one or more weld beads. The one or more welding parameters may include or indicate a wire feed speed, a travel speed, a travel angle, a work angle (e.g., torch angle), a weld mode (e.g., a waveform), a welding technique (e.g., TIG or MIG), a voltage or current, a contact tip to work distance (CTWD) offset, a weave or motion parameter (e.g., a weave type, a weave amplitude characteristic, a weave frequency characteristic, or a phase lag), a wire property (a wire diameter or a wire type—composition/material), a gas mixture, a heat input, or a combination thereof, as illustrative, non-limiting examples.

Weld fill plan 175 may be generated based on one or more weld profiles 174, one or more bead models 173, one or more contextual variables, or a combination thereof. The one or more contextual variables may be associated with or correspond to a joint model. In some implementations, the one or more contextual variables include or indicate gravity, surface tension, gaps, tacks, surface features, joint features, part material properties or dimensions, or a combination thereof. Weld instructions 176 may include or indicate one or more operations to be performed by robot 120. Weld instructions 176 may be generated based on one or more weld profiles 174, weld fill plan 175, or a combination thereof.

In some implementations, controller 152 is configured to optimize weld fill plan 175 including its beads/welding commands (e.g., 176) based on context specific welding styles in the form of rules formed from application specific requests/needs. Additionally, or alternatively, controller 152 may be configured to determine weld fill plan 175 accounting for or based on additional capabilities including motion capabilities (weaves), additional welding strategies (such as welding tacks), or a combination thereof.

Communications adapter 104 is configured to couple control system 110 to a network (e.g., a cellular communication network, a LAN, WAN, the Internet, etc.). Communications adapter 104 of embodiments may, for example, comprise a WiFi network adaptor, a Bluetooth interface, a cellular communication interface, a mesh network interface (e.g., ZigBee, Z-Wave, etc.), a network interface card (NIC), and/or the like. User interface adapter and display adapter 106 of the illustrated embodiment may be utilized to facilitate user interaction with control system 110. For example, user interface and display adapter 106 may couple one or more user input devices (e.g., keyboard, pointing device, touch pad, microphone, etc.) to control system 110 for facilitating user input when desired (e.g., when gathering information regarding one or more weld parameters).

In some implementations, I/O and communication adapter 104 may also couple sensor(s) 109 (e.g., global sensor, local sensor, etc.) to processor 101 and memory 102, such as for use with respect to the system detecting and otherwise determining seam location. I/O and communication adapter 104 may additionally or alternatively provide coupling of various other devices, such as a printer (e.g., dot matrix printer, laser printer, inkjet printer, thermal printer, etc.), to facilitate desired functionality (e.g., allow the system to print paper copies of information such as planned trajectories, results of learning operations, and/or other information and documents).

User interface and display adapter 106 may be configured to couple one or more user output devices (e.g., flat panel display, touch screen, heads-up display, holographic projector, etc.) to control system 110 for facilitating user output (e.g., simulation of a weld) when desired. It should be appreciated that various ones of the foregoing functional aspects of control system 110 may be included or omitted, as desired or determined to be appropriate, depending upon the specific implementation of a particular instance of system 100.

User interface and display adapter 106 is configured to be coupled to storage device 108, sensor 109, another device, or a combination thereof. Storage device 108 may include one or more of a hard drive, optical drive, solid state drive, or one or more databases. Storage device 108 may be configured to be coupled to controller 152, processor 101, or memory 102, such as to exchange program code for performing or techniques described here, at least with reference to instructions 103. Storage device 108 may include a random access memory (RAM), a memory buffer, a hard drive, an erasable programmable read-only memory (EPROM), an electrically erasable read-only memory (EEPROM), a read-only memory (ROM), Flash memory, and the like. Storage device 108 may include or correspond to memory 102.

In some implementations, storage device 108 includes a database 112 and executable code 113. Controller 152 may interact with database 112, for example, by storing data to database 112 and/or retrieving data from database 112. Although described as database 112 being in storage device 108, in other implementations, database 112 may be stored on a cloud-based platform. Database 112 may store any information useful to the system 100 in performing welding operations. For example, database 112 may store a CAD model (e.g., 1708) of one or more parts (e.g., 135, 136). Additionally, or alternatively, database 112 may store an annotated version of a CAD model of one or more parts (e.g., 135, 136). Database 112 may also store a point cloud of the one or more parts generated using the CAD model (also herein referred to as CAD model point cloud). Similarly, welding instructions (e.g., 176) for one or more parts that are generated based on 3D representations of the one or more parts and/or on user input provided regarding one or more parts (e.g., regarding which seams of the part 114 to weld, welding parameters, etc.) may be stored in database 112.

In some implementations, executable code 113 may when executed, causes controller 152 to perform one or more actions attributed herein to controller 152, or, more generally, to the system 100. Executable code 113 may include a single, self-contained, program. Additionally, or alternatively executable code 113 may be a program having one or more function calls to other executable code which may be stored in storage device 108 or elsewhere, such as cloud storage or memory 102, as illustrative, non-limiting examples. In some examples, one or more functions attributed to execution of executable code 113 may be implemented by hardware. For instance, multiple processors may be useful to perform one or more discrete tasks of the executable code 113.

Sensor 109 may include an image sensor, such as a camera, a scanner, a laser scanner, a camera with in-built laser sensor, or a combination thereof. In examples, sensor 109 is an image sensor that is configured to capture visual information (e.g., images) about workspace 130. For example, sensor 109 may be configured to capture images of the one or more parts (135, 136) or fixture 127. In some implementations, sensor 109 may include a Light Detection and Ranging (LiDAR) sensor, an audio sensor, electromagnetic sensor, or a combination thereof. The audio sensor, such as a Sound Navigation and Ranging (SONAR) device, may be configured to emit and/or capture sound. The electromagnetic sensor, such as a Radio Detection and Ranging (RADAR) device, may be configured to emit and/or capture electromagnetic (EM) waves. Through visual, audio, electromagnetic, and/or other sensing technologies, sensor 109 may collect information about physical structures in workspace 130. Additionally, or alternatively, sensor 109 is configured to collect static information (e.g., stationary structures in workspace 130), dynamic information (e.g., moving structures in workspace 130), or a combination thereof.

Sensor 109 may be configured to capture data (e.g., image data) of workspace 130 from various positions and angles. In some implementations, sensor 109 may be mounted onto robot 120 or otherwise be integral to workspace 130. For example, one or more sensors (e.g., 109) may be positioned on robot 120 (e.g., on a weld head of robot 120) and may be configured to collect image data as robot 120 moves about workspace 130. Because robot 120 is mobile with multiple degrees of freedom and therefore in multiple dimensions, the one or more sensors positioned on robot 120 may capture images from a variety of vantage points. Additionally, or alternatively, the one or more sensors may be positioned on an arm (e.g., on a weld head attached to the arm) of robot 120. In another example, sensor 109 may be positioned on a movable, non-welding robot arm (which may be different from robot 120). In yet another example, at least one sensor 109 may be positioned on the arm of robot 120 and another sensor 109 may be positioned on a movable equipment in workspace 130. In yet another example, at least one sensor 109 may be positioned on the arm of robot 120 and another sensors 109 may be positioned on a movable, non-welding robot arm. In some implementations, sensor 109 may be mounted on another robot (not shown in FIG. 1) positioned within workspace 130. For example, a robot may be operable to move (e.g., rotational or translational motion) such that sensor 109 can capture image data of workspace 130, the one or more parts (e.g., 135 or 136), and/or fixture 127 from various angles. In some implementations, sensors 109 may be stationary while physical structures to be imaged are moved about or within workspace 130. For instance, a part (e.g., 135 or 136) to be imaged may be positioned on fixture 127, such as a positioner, and the positioner and/or the part may rotate, translate (e.g., in x-, y-, and/or z-directions), or otherwise move within workspace 130 while a stationary sensor 109 (e.g., either the one coupled to robot 120 or the one decoupled from robot 120) captures multiple images of various facets of the part.

In some implementations, sensor 109 may collect or generate information, such as images or image data, about one or more physical structures in workspace 130. In some instances, sensor 109 may be configured to image or monitor a weld laid by robot 120, before, during, or after weld deposition. Stated another way, the information may include or correspond to a geometric configuration of a seam, the weld laid by robot 120, or a combination thereof. The geometric configuration may include 3D point cloud information, mesh, image of a slice of the weld, point cloud of the slice of the weld, or a combination thereof, as illustrative, non-limiting examples. Sensor 109 may provide the information to another component or device, such as control system 110, controller 152, or processor 101. The other component or device may generate a 3D representation of the physical structures in workspace 130 based on the information (e.g., image data).

Sensor 109 can be communicatively coupled to another device, such as processor 101, controller 152, or control system 110, which can be operable to process data from sensor 109 to assemble two-dimensional data, data from sensor 109 at various positions relative to the one or more parts, or data from sensor 109 as the sensors move relative to the parts for further processing. Control system 110, such as controller 152 or processor 101, can generate the point cloud by overlapping and/or stitching images to reconstruct and generate three-dimensional image data. The three-dimensional image data can be collated to generate the point cloud with associated image data for at least some points in the point cloud. Control system 110 may be configured to operate and control robot 120. In some instances, control parameters for robot 120 can be determined or informed by data from the point cloud.

In some implementations, controller 152 is configured to receive information, such as images or image data, audio data, EM data, or a combination thereof, from sensor 109. Controller 152 may generate a 3D representation, such as a point cloud, of one or more structures associated with the received information. For example, the one or more structures may be depicted in the images. A point cloud can be a set of points each of which represents a location in 3D space of a point on a surface of a part (e.g., 135 or 136) and/or fixture 127. Examples of points are described further herein at least with reference to FIGS. 5 and 6. In some examples, one or more images (e.g., image data captured by sensor 109 at a particular orientation relative to a part) may be overlapped and/or stitched together by controller 152 to reconstruct and generate 3D image data of workspace 130. The 3D image data can be collated to generate the point cloud with associated image data for at least some points in the point cloud.

In some implementations, the 3D image data can be collated by controller 152 in a manner such that the point cloud generated from the data can have six degrees of freedom. For instance, each point in the point cloud may represent an infinitesimally small position in 3D space. As described above, sensor 109 can capture multiple images of the point from various angles. These multiple images can be collated by controller 152 to determine an average image pixel for each point. The averaged image pixel can be attached to the point. For example, if sensor 109 is a color camera having red, green, and blue channels, then the six degrees of freedom can be {x-position, y-position, z-position, red-intensity, green-intensity, and blue-intensity}. Alternatively, if sensor 109 is a black and white camera with black and white channels, then four degrees of freedom may be generated.

In some implementations, to generate 3D representations of workspace 130, sensor 109 may capture images of physical structures in workspace 130 from a variety of angles. For example, although a single 2D image of fixture 127 or a part (e.g., 135 or 136) may be inadequate to generate a 3D representation of that component, and, similarly, a set of multiple images of fixture 127 or the part from a single angle, view, or plane may be inadequate to generate a 3D representation of that component, multiple images captured from multiple angles in a variety of positions within workspace 130 may be adequate to generate a 3D representation of a component, such as fixture 127 or a part. This is because capturing images in multiple orientations provides spatial information about a component in three dimensions, similar in concept to the manner in which plan drawings of a component that include frontal, profile, and top-down views of the component provide all information necessary to generate a 3D representation of that component. Accordingly, in examples, sensor 109 is configured to move about workspace 130 so as to capture information adequate to generate 3D representations of structures within workspace 130.

In some implementations, multiple sensors (e.g., 109) are stationary but are present in adequate numbers and in adequately varied locations around workspace 130 such that adequate information is captured by the sensors to generate the aforementioned 3D representations. In examples where sensor 109 is mobile, any suitable structure may be useful to facilitate such movement about workspace 130. For example, sensor 109 may be positioned on a motorized track system. The track system itself may be stationary while sensor 109 is configured to move about workspace 130 on the track system. In some other implementations, sensor 190 is mobile on the track system and the track system itself is mobile around workspace 130. In other implementations, one or more mirrors are arranged within workspace 130 in conjunction with sensor 109, which may pivot, swivel, rotate, or translate about and/or along points or axes such that sensor 109 is configured to capture images from initial vantage points when in a first configuration and, when in a second configuration, capture images from other vantage points using the mirrors. In yet other implementations, sensor 109 may be suspended on arms that may be configured to pivot, swivel, rotate, or translate about and/or along points or axes, and sensor 109 may be configured to capture images from a variety of vantage points as these arms extend through their full ranges of motion.

Figure 5:
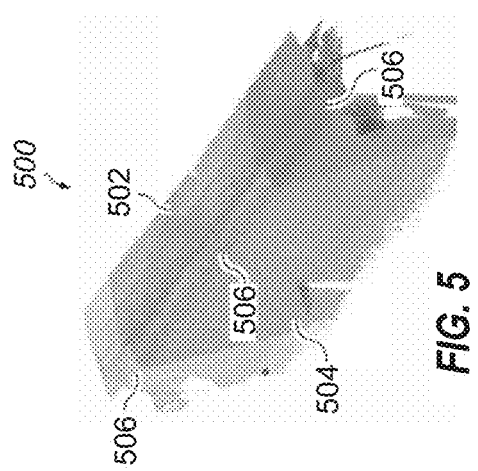
FIG. 5 is a diagram of an example of a point cloud of parts having a weldable seam according to one or more aspects.

Referring to FIG. 5, FIG. 5 is an illustrative point cloud 500 of parts having a weldable seam according to one or more aspects. Point cloud 500 represents a first part 502 and a second part 504. First part 502 and second part 504 may include or correspond to first part 135 and second part 136, respectively. First part 502 and second part 504 may be positioned to define a seam 506. Seam 506 may include or correspond to seam 144. First part 502 and second part 504 may be configured to be welded together along seam 506. In some implementations, first part 502 and second part 504 may be welded together based on a multipass welding operation performed by robot 120.

Figure 6:
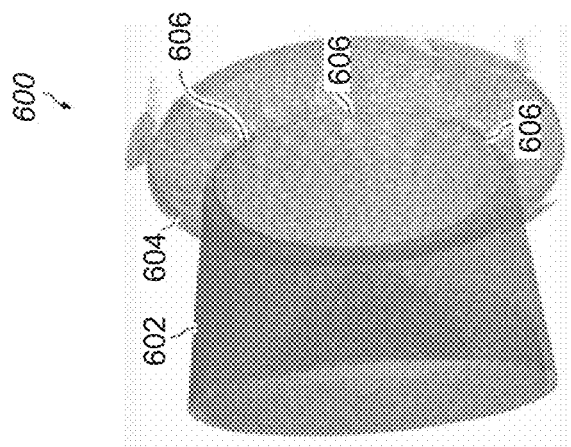
FIG. 6 is a diagram of an example of a point cloud of parts having a weldable seam according to one or more aspects.

Referring to FIG. 6, FIG. 6 is an illustrative point cloud 600 of parts having a weldable seam according to one or more aspects. Point cloud 600 represents a first part 602 and a second part 604. First part 602 and second part 604 may include or correspond to first part 135 and second part 136, respectively. First part 602 and second part 604 may be positioned to define a seam 606. Seam 606 may include or correspond to seam 144. First part 602 and second part 604 may be configured to be welded together along seam 606. In some implementations, first part 602 and second part 604 may be welded together based on a multipass welding operation performed by robot 120.

Referring to FIG. 1, controller 152 configured may be configured to generate the 3D point cloud 500 or 600 based on images captured by sensor 109. Controller 152 may then use the point cloud 500 or 600, image data, or a combination thereof, to identify and locate a seam, such as the seam 506 or 606, to plan a welding path along the seam 506 or 606, and to lay a weld material along seam 506 or 606 according to the path plan and using robot 120. In some implementations, controller 152 may execute instructions 103 (e.g., path planning logic 105, machine learning logic 107, or multipass logic 111), executable code 113, or a combination thereof, to perform one or more operations, such as seam identification, path planning, model training or updating, or a combination thereof.

In some implementations, controller 152 may be configured to use a neural network to perform a pixel-wise classification and/or point-wise classification to identify and classify structures within workspace 130. For example, the pixel-wise classification may use images captured by or based on the images captured by sensor 109 and the point-wise classification may use one or more point clouds. To illustrate, controller 152, upon execution of instructions 103 or executable code 113, may use a neural network to perform the pixel-wise classification and/or the point-wise classification to identify and classify structures within workspace 130. For example, controller 152 may perform the pixel-wise classification and/or the point-wise classification to identify one or more imaged structures within workspace 130 as a part (e.g., 135 or 136), as a seam on the part or at an interface between multiple parts (referred to herein collectively as a candidate seam), as fixture 127, as robot 120, etc.

In some implementations, controller 152 may identify and classify pixels and/or points based on a neural network (e.g., a U-net model) trained using appropriate training data. For example, the neural network can be trained on image data, point cloud data, spatial information data, or a combination thereof. In some implementations, the point cloud and/or the image data may include information captured from various vantage points within workspace 130 and the neural network can be operable to classify fixture (e.g., 127) or a candidate seam on the part 114 from multiple angles and/or viewpoints. In some examples, the neural network can be trained to operate on a set of points directly (e.g., the neural network includes a dynamic graph convolutional neural network) and the neural network may be implemented to analyze unorganized points on the point cloud. In some examples, a first neural network can be trained on point cloud data to perform the point-wise classification and a second neural network can be trained on image data to perform the pixel-wise classification. The first neural network and the second neural network can individually identify one or more candidate seams and localize the one or more candidate seams. The output from the first neural network and the second neural network can be combined as a final output to determine the location and orientation of the one or more candidate seams on a part 114.

In some examples, if pixel-wise classification is performed, one or more results can be projected onto 3D point cloud data and/or a meshed version of the point cloud data, thereby providing information on a location of fixture 127 in workspace 130. If the input data is image data (e.g., color images), spatial information such as depth information may be included along with color data in order to perform pixel-wise segmentation. In some examples, pixel-wise classification can be performed to identify a candidate seam and localize the candidate seam relative to a part (e.g., 135 or 136).

In some implementations, controller 152 may identify and classify pixels and/or points as specific structures within workspace 130. For example, controller may identify and classify pixels or points as fixtures 127, a part (e.g., 135 or 136), a candidate seam of the part, etc. Portions of the image and/or point cloud data classified as non-part and non-candidate seam structures, such as fixture 127, may be segmented out (e.g., redacted or otherwise removed) from the data, thereby isolating data identified and classified as corresponding to the part and/or the candidate seam associated with the part. In some examples, after identifying the candidate seam and segmenting the non-part and non-candidate seam data (or, optionally, prior to such segmentation), the neural network can be configured to analyze each candidate seam to determine a type of seam. For example, the neural network can be configured to determine whether the candidate seam is a butt joint, a corner joint, an edge joint, a lap joint, a tee joint, or the like. The model (e.g., a U-net model) may classify the type of seam based on data captured from multiple vantage points within workspace 130.

If pixel-wise classification is performed using image data, controller 152 may project the pixels of interest (e.g., pixels representing one or more parts and one or more candidate seams associated with the one or more parts onto a 3D space to generate a set of 3D points representing the parts and the candidate seams. Additionally, or alternatively, if point-wise classification is performed using point cloud data, the points of interest may already exist in 3D space in the point cloud. In either case, from the perspective of controller 152, the 3D points may be an unordered set of points and at least some of the 3D points may be clumped or clustered together. To eliminate such noise and generate a continuous and contiguous subset of points to represent a candidate seam, a Manifold Blurring and Mean Shift (MBMS) technique or similar techniques may be applied. Such techniques may condense the points and eliminate noise. Subsequently, controller 152 may apply a clustering method to break down one or more candidate seams into individual candidate seams. Stated another way, instead of having several subsets of points representing multiple candidate seams, clustering can break down each subset of points into individual candidate seams. Following clustering, controller 152 may fit a spline to each individual subset of points. Accordingly, each individual subset of points can be an individual candidate seam.

In some implementations, controller 152 receives image data captured by sensor 109 from various locations and vantage points within workspace 130. Controller 152 may produce a set of candidate seams associated with one or more parts (e.g., 135 or 136) that indicate locations and orientations of those candidate seams. For example, controller 152 performs a pixel-wise classification and/or point-wise classification technique using a neural network to classify and identify each pixel and/or point as a part (e.g., 135 or 136), a candidate seam on or associated with the part or at an interface between multiple parts, fixture 127, etc. Structures identified as being non-part structures and non-candidate seam structures are segmented out, and controller 152 may perform additional processing on the remaining points (e.g., to mitigate noise). After the set of candidate seams is produced, controller 152 may determine whether the candidate seams are actually seams and may optionally perform additional processing using a priori information, such as CAD models of the parts and seams. The resulting data is suitable for use by controller 152 to plan a path for laying weld along the identified seams.

In some implementations, an identified candidate seams may not be seams (e.g., the identified candidate seam may be false positives). To determine whether the identified candidate seam is an actual seams, controller 152 may determine a confidence value based on information from sensor 109. For example, controller 152 may use the images captured by sensor 109 from various vantage points inside workspace 130 to determine the confidence value. The confidence value represents a likelihood of whether or not the candidate seam determined from the corresponding vantage point is an actual seam. Controller 152 may then compare the confidence values for the different vantage points and eliminate candidate seams that are unlikely to be actual seams. For example, controller 152 may determine a mean, median, maximum, or any other suitable summary statistic of the candidate values associated with a specific candidate seam. Generally, a candidate seam that corresponds to an actual seam will have consistently high (e.g., greater than or equal to a threshold) confidence values across the various vantage points used to capture that candidate seam. If the summary statistic of the confidence values for a candidate seam is greater than or equal to a threshold value, controller 152 can designate the candidate seam as an actual seam. Conversely, if the summary statistic of the confidence values for a candidate seam is less than a threshold value, the candidate seam can be designated as a false positive that is not eligible for welding.

After identifying a candidate seam that is an actual seam, controller 152 may perform additional processing referred to herein as registration. An illustrative example of registration is described further herein at least with reference to FIG. 7. In some implementations, controller may perform registration using a priori information, such as a CAD model (or a point cloud version of the CAD model). For example, there may exist a difference between seam dimensions associated with a part (e.g., 135 or 136) and seam dimensions in the CAD model. In some implementations, the CAD model (or a copy of the CAD model) may be deformed (e.g., updated) to account for any such differences. It is noted that the updated CAD model may be used to perform path planning. Accordingly, controller 152 may compare a first seam (e.g., a candidate seam on a part that has been verified as an actual seam) to a second seam (e.g., a seam annotated on the CAD model corresponding to the first seam) to determine differences between the first and second seams. In some implementations, the seam annotated on the CAD model may have been annotated by an operator/user. The first seam and the second seam can be in nearly the same location, in instances in which the CAD model and/or controller 152 accurately predicts the location of the candidate seam. Alternatively, the first seam and the second seam can partially overlap, in instances in which the CAD model and/or controller 152 is partially accurate. Controller 152 may perform a comparison of the first seam and the second seam. This comparison of the first seam and the second seam can be based in part on shape and relative location in space of both the seams. Should the first seam and the second seam be relatively similar in shape and be proximal to each other, the second seam can be identified as being the same as the first seam. In this way, controller 152 can account for the topography of the surfaces on the part that are not accurately represented in the CAD models. In this manner, controller 152 can identify candidate seams and can sub-select or refine or update candidate seams relative to the part using a CAD model of the part. Each candidate seam can be a set of updated points that represents the position and orientation of the candidate seam relative to the part.

Figure 7:
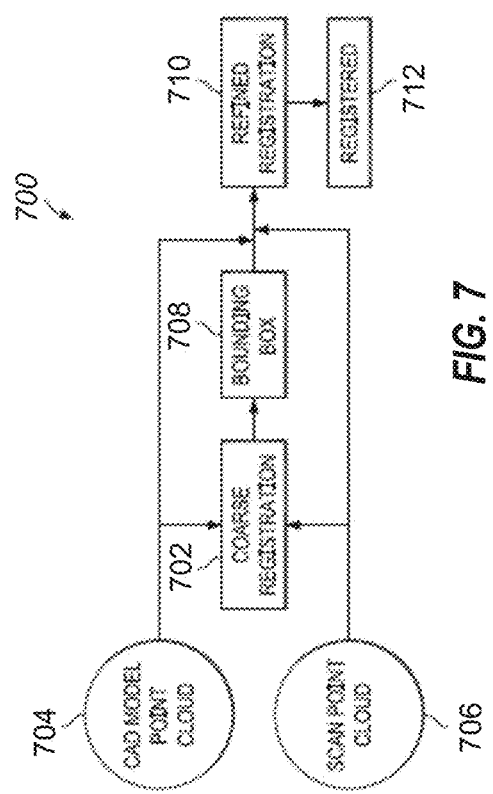
FIG. 7 is a block diagram illustrating a registration process flow according to one or more aspects.

Referring to FIG. 7, FIG. 7 is a block diagram illustrating a registration process flow 700 according to one or more aspects. Some or all steps of the registration process flow 700 may be performed by controller 152. For example, controller 152 may instructions 103 or executable code 113 to perform at least a portion or an entirety of registration process flow 700.

Controller 152 may perform a coarse registration 702 using a point cloud 704 of a CAD model and a scan point cloud 706 formed using images captured by sensor 109. Point cloud 704 of the CAD model and scan point cloud may include or correspond to point cloud 169. The CAD model may include or correspond to design 170. The CAD model point cloud 704 and the scan point cloud 706 may be sampled such that their points have a uniform or approximately uniform dispersion, so that they both have equal or approximately equal point density, or a combination thereof.

In some implementations, controller 152 downsamples point clouds 704, 706 by uniformly selecting points in the clouds at random to keep and discarding the remaining, non-selected points. For example, controller 152 may use a Poisson Disk Sampling (PDS) down sampling algorithm to downsample point cloud 704 or 706. Controller 152 may provide, as an input to the PDS algorithm, the boundaries of point cloud 704 or 706, a minimum distance between samples, a limit of samples to choose before they are rejected, or a combination thereof.

In some implementations, a delta network may be used to deform one model to another model during coarse registration 702. The delta network may be a Siamese network that takes a source model and target model and encodes them into latent vectors. Controller 152 may use the latent vectors to predict per-point deformations that morph or update one model to another. It is noted that the delta network may not require a training dataset. Given the CAD model and scan point clouds 704, 706, controller 152 in the context of a Delta network spends one or more epochs learning the degree of dissimilarity or similarity between the two. During these epochs, the Delta network may learn one or more features that are subsequently useful for registration. In some implementations, the Delta network may use skip connections to learn deformation and, in other implementations, skip connections may not be used. In some cases, CAD models include surfaces that are not present in 3D point cloud generated using the captured images (e.g., scans). In such cases, the Delta network moves all points corresponding to the missing surfaces from the CAD model point cloud 704 to some points in the scan point cloud 706 (and update the scan point cloud 706). Accordingly, during registration, controller 152 (e.g., the Delta network) may use learned features and transform (or update) the original CAD model, or it may use the learned features and transform the deformed CAD model.

In some implementations, the delta network may include an encoder network such as a dynamic graph convolutional neural network (DGCNN). After the point clouds are encoded into features, a concatenated vector composed of both CAD and scan embedding may be formed. After implementing a pooling operation (e.g., max pooling), a decoder may be applied to the resultant vector. In some examples, the decoder may include five convolutional layers with certain filters (e.g., 256, 256, 512, 1024, N×3 filters). The resulting output may be concatenated with CAD model and scan embeddings, max pooled, and subsequently provided once more to the decoder. The final results may include per-point transformations.

Irrelevant data and noise in the data (e.g., the output of the coarse registration 702) may impact registration of the parts 114. For at least this reason, it is desirable to remove as much of the irrelevant data and noise as possible. To illustrate, a bounding box 708 may be used to remove this irrelevant data and noise (e.g., fixture 127) in order to limit the area upon which registration is performed. Stated another way, data inside the bounding box is retained, but all the data, 3D or otherwise, from outside the bounding box is discarded. The aforementioned bounding box may be any shape that can enclose or encapsulate the CAD model itself (e.g., either partially or completely). For instance, the bounding box may be an inflated or scaled-up version of the CAD model. The data outside the bounding box may be removed from the final registration or may still be included but weighted to mitigate its impact.

During refined registration 710, controller 152 passes the output of the bounding box 708 as patches through a set of convolutional layers in a neural network that was trained as an autoencoder. More specifically, the data may be passed through the encoder section of the autoencoder, and the decoder section of the autoencoder may not be used. The input data may be the XYZ locations of the points of the patch in the shape, for instance (128, 3). The output may be a vector of length 1024, for example, and this vector is useful for the per-point features.

A set of corresponding points that best support the rigid transformation between the CAD point cloud and scan point cloud models should be determined during registration. Corresponding candidates may be stored (e.g., in database 112) as a matrix in which each element stores the confidence or the probability of a match between two points:

$$P = \begin{bmatrix} p_{00} & p_{01} & \cdots & p_{0n} \\ \cdot & \cdot & \cdots & \cdot \\ \cdot & \cdot & \cdots & \cdot \\ \cdot & \cdot & \cdots & \cdot \\ \cdot & \cdot & \cdots & \cdot \\ p_{m0} & p_{m1} & \cdots & p_{mn} \end{bmatrix}_{[m_{source} \cdot n_{target}]}$$

Controller 152 may use a variety of techniques to find corresponding points based on this matrix. For example, the techniques may include hard correspondence, soft correspondence, product manifold filter, graph clique, covariance, etc. After completion of the refined registration 710, the registration process 700 is completed at 712.

In some implementations, the actual location of a seam may differ from the seam location as determined by controller 152 using sensor imaging (e.g., using scan point clouds) and/or as determined by a CAD model (e.g., using CAD model point clouds). In such cases, a scanning procedure (also sometimes referred herein as pre-scan) may be implemented to correct the determined seam location to more closely or exactly match the actual seam location, such as a location on a part (e.g., 135 or 136). In the scanning procedure, sensor 109 that is positioned on robot 120 (referred to herein as an on-board sensor) is configured to perform a scan of the seam, such as seam 144. In some instances, this scan may be performed using an initial motion and/or path plan generated by controller 152 based on the CAD model, the scan, or a combination thereof. For example, sensor 109 may scan any or all areas of workspace 130. During the initial motion and/or path plan, sensor 109 may capture observational images and/or data. The observational images and/or data may be processed by controller 152 to generate seam point cloud data. Controller 152 may use the seam point cloud data when processing the point cloud(s) 704 and/or 706 to correct the seam location. Controller 152 may also use seam point cloud data in correcting path and motion planning.

In some examples, the registration techniques described with reference to registration process flow 700 may be useful to compare and match a seam identified by the on-board sensor 109 with a seam determined using a sensor other than the onboard sensor 109. By matching the seams in this manner, robot 120 (and, more specifically, the head of robot 120) is positioned relative to the actual seam as desired.

In some examples, the pre-scan trajectory of robot 120 may be identical to that planned for welding along a seam. In some such examples, the motion taken for robot 120 during pre-scan may be generated separately so as to limit the probability or curtail the instance of collision, to better visualize the seam or key geometry with the onboard sensor (e.g., 109), or to scan geometry around the seam in question. In some such implementations, the precan trajectory is determined based on the CAD model, a multipass weld plan, or a combination thereof.

In some examples, the pre-scan technique may include scanning more than a particular seam or seams, and rather may also include scanning of other geometry of one or more parts (e.g., 135 or 136). The scan data may be useful for more accurate application of any or all of the techniques described herein (e.g., registration techniques) to find, locate, detect a seam and ensure the head of robot 120 will be placed and moved along the seam as desired.

In some examples, the scanning technique (e.g., scanning the actual seam using sensors/cameras mounted on the weld arm/weld head) may be useful to identify gap variability information about a seam rather than position and orientation information about the seam. For example, the scan images captured by sensor 109 on robot 120 during a scanning procedure may be used to identify variability in one or more gaps and adjust a welding trajectory or path plan to account for such gaps. For example, 3D points, 2D image pixels, or a combination thereof, may be useful to locate a variable gap between one or more parts to be welded. To illustrate, a gap between parts to be welded together may be located, identified and measured to determine a size of the gap. In tack weld finding or general weld finding, former welds or material deposits in gaps between parts to be welded may be identified using 3D points and/or 2D image pixels. Any or all such techniques may be useful to optimize welding, including path planning. In some instances, the variability in gaps may be identified within the 3D point cloud generated using the images captured by sensor 109. In yet other instances, the variability in gaps may be identified based on or using a scanning technique (e.g., scanning the actual seam using sensors/cameras mounted on the weld arm/weld head) performed while performing a welding operation on the task. In any one of the instances, controller 152 may be configured to adapt one or more welding instructions dynamically (e.g., welding voltage) based on the determined location and size of the gap. For example, the dynamically adjusted welding instructions for the welding robots can result in precise welding of seam at variable gaps. Adjusting welding instructions may include adjusting a welder voltage, a welder current, a duration of an electrical pulse, a shape of an electrical pulse, a material feed rate, or a combination thereof.

In some implementations, user interface and display adapter 106 can provide the user with an option to view candidate seams. For example, user interface and display adapter 106 may provide a graphical representation of a part and/or candidate seams on the part. Additionally, or alternatively, user interface and display adapter 106 may group or present the candidate seam based on the type of seam. To illustrate, controller 152 can identify the type of seam which can be presented to a user via user interface and display adapter 106. For instance, candidate seams identified as lap joints can be grouped under a label "lap joints" and can be presented to the user via user interface and display adapter 106 under the label "lap joints." Similarly, candidate seams identified as edge joints can be grouped under a label "edge joints" and can be presented to the user via user interface and display adapter 106 under the label "edge joints."

User interface and display adapter 106 can further provide the user with an option to select a candidate seam to be welded by robot 120. For example, each candidate seam on a part can be presented as a selectable option (e.g., a press button) on user interface and display adapter 106. When the user selects a specific candidate seam, the selection can be sent to controller 152. Controller 152 can generate instructions for robot 120 to perform welding operations on that specific candidate seam.

In some examples, the user can be provided with an option to update welding parameters. For example, user interface and display adapter 106 can provide the user with a list of different welding parameters. The user can select a specific parameter to be updated. Changes to the selected parameter can be made using a drop-down menu, via text input, etc. This update can be transmitted to controller 152 so that controller 152 can update the instructions for robot 120.

In examples for which the system 100 is not provided with a priori information (e.g., a CAD model) of a part (e.g., 135 or 136), sensor 109 can scan the part. A representation of the part can be presented to the user via user interface and display adapter 106. This representation of the part can be a point cloud and/or a mesh of the point cloud that includes projected 3D data of the scanned image of the part obtained from sensor 109. The user can annotate one or more seams that are to be welded in the representation via user interface and display adapter 106. Alternatively, controller 152 can identify candidate seams in the representation of the part and can be presented to the user via user interface and display adapter 106. The user can select seams that are to be welded from the candidate seams. User interface and display adapter 106 can annotate the representation based on the user's selection. In some implementations, the annotated representation can be saved in database 112.

After one or more seams on the part have been identified, controller 152 may plan a path for robot 120 for a subsequent welding process. In some examples, graph-matching and/or graph-search techniques may be useful to plan a path for robot 120. A particular seam identified as described above may include multiple points, and the path planning technique entails determining a different state of robot 120 for each such point along a given seam. A state of robot 120 may include, for example, a position of robot 120 within workspace 130 and a specific configuration of the arm of robot 120 in any number of degrees of freedom that may apply. For instance, for robot 120 that has an arm having six degrees of freedom, a state for robot 120 would include not only the location of robot 120 in workspace 130 (e.g., the location of the weld head of robot 120 in three-dimensional, x-y-z space), but it would also include a specific substate for each of the robot arm's six degrees of freedom. Furthermore, when robot 120 transitions from a first state to a second state, it may change its location within workspace 130, and in such a case, robot 120 necessarily would traverse a specific path within workspace 130 (e.g., along a seam being welded). Thus, specifying a series of states of robot 120 necessarily entails specifying the path along which robot 120 will travel within workspace 130. Controller 152 may perform the pre-scan technique or a variation thereof after path planning is complete, and controller 152 may use the information captured during the pre-scan technique to make any of a variety of suitable adjustments (e.g., adjustment of the X-Y-Z axes or coordinate system used to perform the actual welding along the seam).

In some implementations, controller 152 may be configured to determine one or more dimensions of a seam (e.g., 144). For example, controller 152 may determine the one or more dimensions of the seam based on sensor data 180 from sensor 109. The one or more dimension may include a depth of the seam, a width of the seam, a length of the seam, or a combination thereof. Additionally, or alternatively, controller 152 may determine how the one or more dimensions vary along a length of the seam. In some implementations, controller 152 may determine gap variability information, such as the one or more dimensions of the seam, how the one or more dimensions of the seam vary over a length of the seam, or a combination thereof. Controller 152 may determine control information 182 based on the gap variability information. For example, controller may generate or update control information 182, such as movement of robot 120 or one or more welding parameters, based on the gap variability information. In some implementations, to generate or update the control information, controller 152 may compare the gap variability information with design 170, waypoints 172, weld profile 174, weld fill plan 175, weld instructions 176, or a combination thereof.

In some implementations, robot 120 may be configured to autonomously weld over seam 144 having one or more varying dimensions, such as a varying widths. As such, in addition to identifying position and orientation information about seam 144, one or more scanning techniques described herein (e.g., scanning the actual seam using sensors/cameras mounted on the weld arm/weld head, or scanning the part from sensors/cameras positioned somewhere in the workspace and identifying the seam) may be implemented to identify gap variability information about the seam. Identifying the gap variability information may include determining a gap width along the length of the seam or determining the gap profile along the length of the seam (e.g., how the gap along the seam varies). Based on the determined gap variability information, controller 152 may generate or update waypoints 172 (e.g., waypoint information) or trajectory information associated with waypoints 172. Updating trajectory information associated with waypoints 172 may include generating or updating, based on the gap variability information, control information 182, such as the welding parameter and the motion parameters of robot 120 at each waypoint. For example, at each waypoint where a dimension is greater than or equal to an average gap dimension of seam 144 or a tolerance of seam 144, the welding and/or motion parameters of robot 120 may be generated/updated (e.g., the voltage/current may be increased) to fuse/deposit more or less metal at the waypoint.

In some implementations, identification of the variable gap information may include or correspond to determining the seam position and orientation, such as seam position information, seam orientation information, or a combination thereof. After determining the seam position or orientation, controller 152 may detect one or more edges that form or define the seam. For example, controller 152 may use an edge detection technique, such as Canny detection, Kovalevsky detection, another first-order approach, or a second-order approach, to detect the one or more edges. In some implementations, controller 152 may use a supervised or self-supervised neural network to detect the one or more edges. The detected edges may be used to determine a variability in the gap (e.g., one or more dimensions) along the length of the seam. In some instances, the variability in gaps may be identified within or based on the 3D point cloud generated using the images captured by sensor 109. In some other instances, the variability in gaps may be identified using a scanning technique (e.g., scanning the actual seam using sensors/cameras mounted on the weld arm/weld head) performed while performing a welding operation on the seam.

In some implementations, the variable gap information determined using one or more variable gap identification techniques may be used to optimize one or more operations associated with welding of the seam, including path planning. For example, controller 152 may be configured to generate or adapt the welding instructions and/or motion parameters dynamically (e.g., welding voltage) based on the width/size of the gap. For example, the dynamically adjusted welding instructions for robot 120 can result in precise welding of the seam at variable gaps. Adjusting the welding instructions, such as weld instruction 176, may include adjusting a welder voltage, a welder current, a duration of an electrical pulse, a shape of an electrical pulse, a material feed rate, or a combination thereof. Additionally, or alternatively, adjusting motion parameters may include adjusting motion of weld head to include different weaving patterns, such as convex weave, concave weave, etc. to weld a seam having the variable gap.

In some implementations, controller 152 may instruct or control sensor 109 to generate information associated with seam 144. For example, controller 152 may instruct or control sensor 109 to capture one or more images associated with seam 144. Controller 152 may receive the information associated with seam 144 and may process the information. For example, controller 152 may use a neural network to perform a segmentation operation that remove non-seam information from the information. In some implementations, controller 152 may process the information based on design 170, such as a CAD model. The design 170 may include annotated data.

In some implementations, controller 152 may identify seam 144 based on the information. Additionally, or alternatively, controller may localize seam 144 based on the information. To illustrate, controller 152 may perform seam recognition to identify pixel locations in multiple images and my triangulate the pixels corresponding to seam 144 that fit within an epipolar constraint. In some implementations, controller 152 may determine one or more offsets of the information (from sensor 109) as compared to design 170.

In some implementations, controller 152 is configured to generate weld instructions 176 for welding along seam 114. For example, welding instructions 176 may be associated with welding that is performed in a single pass, i.e., a single pass of welding is performed along seam 144, or welding that is performed in multiple passes. In some implementations, controller 152 may be configured to enable multipass welding, which is a welding technique robot 120 uses to make multiple passes over seam 144. For example, controller 152 may be configured for Multi-Pass Adaptive Fill (MPAF), which is a framework for determining an optimal number of weld passes and the subsequent weld parameters to fill a weld joint. The weld joint can have volumetric variation and the weld parameters will adapt to produce the appropriate level of fill.

To enable multipass welding at robot 120, controller 152 may identify seam 144 to be welded and one or more characteristics of seam 144. For example, controller 152 may identify seam 144 based on design 170, the scan data, or a combination thereof. The one or more characteristics of seam 144 may include a height of seam 144, a width of seam 144, a length of seam 144, a volume of seam 144. Additionally, or alternatively, the one or more characteristics of seam 144 may be associated with a weld joint to be formed in seam 144. For example, the one or more characteristics may include a height of the weld joint, a first leg length (S1) of the weld joint, a second leg length (S2) of the weld joint, a capping surface profile of the weld joint, a joint type, or a combination thereof.

To enable multipass welding at robot 120, controller 152 may also determine a fill plan and, optionally, optimize the fill plan. In some implementations, the fill plan may indicate a number of weld layers to fill out the weld joint, a number of target beads to be deposited to fill out the weld joint, one or more target bead profiles, or a combination thereof. The fill plan may be optimized to determine a minimum number of layers, a minimum number of target beads, or a combination thereof. Controller 152 may also generate the fill plan. Generation of the fill plan may include determining or indicating one or more welding parameters for each pass (e.g., each bead) of the fill plan. In some implementations, the one or more welding parameters for a pass may indicate a value of the one or more welding parameters at each of multiple waypoints 172 associated with seam 144. After the fill plan is generated, controller 152 may generate welding instructions 176 based on the fill plan. Additionally, or alternatively, controller 152 may generate control information 182 based on welding instructions 176. Controller 152 may transmit weld instructions 176, control information 182, or a combination thereof to robot 120.

In some implementations, to enable multipass welding, controller 152 may receive or generate sensor data 180, seam pose information, seam feature information, one or more transformation, joint geometry information, or a combination thereof. Sensor data 180 (or information 164) may include a mesh from a scan performed by sensor 109. The seam pose information may include or correspond to point cloud 169 or information 164 (e.g., sensor data 165 or pose information 166). In some implementations, the seam pose information may include information based on a registration, such as a registration process described at least with reference to FIG. 7. In some implementations, the registration process may be a deformed registration process that includes identifying an expected position and expected orientation of a candidate seam on a part (e.g., 135 or 136) to be welded based on design 170 (e.g., a Computer Aided Design (CAD) model of the part). The deformed registration process may also include scanning workspace 130 containing the part to produce point cloud 169 or can point cloud 706 (e.g., a representation of the part), and identifying the candidate seam on the part based on the representation of the part and the expected position and expected orientation of the candidate seam.

The seam feature information may include or indicate one or more seam features determined based on a seam segmentation process. The seam segmentation process may include converting annotated features (of design 170) into a series of waypoints 172 and normal information. For example, the seam segmentation process may use a mesh of a part as an input and output a set of waypoint and surface normal information that represents a feature in an appropriate way for planning. In some implementations, the seam feature information may include or indicate an S1 direction (e.g., a vector at a waypoint that indicates a first surface tangent), an S2 direction (e.g., a vector at the waypoint that indicates a second surface tangent), a travel direction (e.g., of a weld head and that is normal to a plane associated with a weld profile that passes through the waypoint, such as a slice mesh at the waypoint), as illustrative, non-limiting examples. Additionally, or alternatively, the seam information may be used or applied to a local coordinate frame associated with seam 144 and to a global frame associated with workspace 130 to enable controller 152 to determine a global transformation of a gravity vector.

The one or more transformation may include or indicate, or one or more waypoints, a transformation of the part to a real world frame of reference. For example, controller 152 may transform each point of a feature (and corresponding normals) of a part into the real world frame of reference.

The joint geometry information may include or indicate a bevel angle, a root gap size, a wall thickness, a number of sides, a radius of a shaft, a shape (e.g., circular or faceted), or a combination thereof, as illustrate, non-limiting examples. In some implementations, the joint geometry information may be determined based on design 170, such as annotated information included in design 170, or based on a point cloud of the part. Additionally, or alternatively, the joint geometry information may include or correspond to point cloud 169, design 170 (e.g., a CAD model), joint model information 171, or a combination thereof. For example, the joint geometry information may include a joint template that is generated based on point cloud 169, design 170 (e.g., a CAD model), joint model information 171, or a combination thereof.

In some implementations, to enable multipass welding, controller 152 may receive or access a multipass configuration information or a table. The multipass configuration information or the table may include or correspond to information 164 or system information 168. The multipass configuration may include or indicate one or more parameters, such as a voltage offset, a contact tip to work distance (CTWD) offset, an algorithm specific parameters, or a combination thereof. Additionally, or alternatively, the multipass configuration may include or indicate a configuration file or serialized string including one or more parameters, such as one or more weld parameters, a weld bead spatial relationship to one or more weld parameters, bead model 173, a welding parameter offset, system information 168, or a combination thereof.

The table, such as a lookup table, may indicate a wire feed speed (WFS), a travel speed (TS) value, a voltage (V), or a combination thereof. In some implementations, the table may indicate the WFS, the TS, and the voltage as a function or based on an area, such as a weld bead area. In some such implementations, the table may indicate the WFS, the TS, and the voltage as a tuple—e.g., a (WFS, TS, V) tuple. In some implementations, controller 152 may perform a query operation of the table for each waypoint. To illustrate, controller 152 may access the table to determine a wire feed speed (WFS), a travel speed (TS) value, a voltage (V), or a combination thereof for each weld bead to be laid at a waypoint. It is noted that the WFS and TS can be used to control the weld bead profile and thereby make a fill "adaptive".

In some implementations, the table may be generated or constructed using a volume flow-rate equivalence assumption. To illustrate, the volume flow rate of the wire leaving a tip of a welder may be equal to a volume flow rate of the metal deposited in the joint times a fill factor which accounts for various ways in which the volume of metal could end up outside of the actual joint (e.g. splatter). In some implementations, one or more other factors may be used to as a set of limits placed on the WFS, TS, and leg lengths for a target weld. The table may be constructed for a specific wire diameter, multiple tables (for different wire diameters) may be available to or accessible by controller 152.

In some implementations, one or more constant parameters and WFS/TS limits for generation of the table includes:

$$V\text{wire}=B\_\text{eff}*V\text{weld},$$

where Vwire is a volume of a wire, B_eff is a fill efficiency that is greater than or equal to 0 and less than or equal to 1, and Vwed is a volume of a weld. Additionally, the one or more constant parameters may include

```
Ranges
travel_speed_range = [5, 30] # ipm
wire_feed_speed_range = [100, 700] # ipm
leg_length_range = [0.1, 0.5] # in
Constants
B_eff = 0.98
wire_diameter = 0.045 # in
n_steps = 100 # number of steps to use to subdivide ranges
```

The following pseudocode is configured to create a collection of potential valid rows for the table based on the ranges provided:

```
candidate_rows = [ ]
A_wire = (PI * (wire_diameter/2) ** 2) # constant wire area
for WFS in linspace(wire_feed_speed_range, n_steps):
  for leg_length in linspace(leg_length_range, n_steps):
    A_weld = (PI * leg_length ** 2)/4 # assumes 1/4 circle fill
      TS = (A_wire/A_weld) * WFS * f_co
      if TS in travel_speed_range:
        candidate_rows.append([WFS,TS,A_weld])
```

Constructing the table based on the pseudo code may result in redundant entries for a single A_weld value. For example, all entries in the table (which has been truncated for brevity) are valid solutions for A_weld=5.067.

| A_weld ($mm^2$) | WFS (ipm) | TS (ipm) |
|---|---|---|
| 5.067 | 100.00 | 19.849 |
| 5.067 | 106.06 | 21.047 |
| 5.067 | 112.12 | 22.250 |
| 5.067 | 118.18 | 20.077 |
| 5.067 | 124.24 | 24.655 |

The entry that contains a WFS value that is closest to the midpoint of the range is selected as the entry for A_weld=5.067. Since the WFS range is set between 100 and 700, an entry containing a WFS closest to [100+700]/2=400 would be selected. Most A_weld values may not appear explicitly in the table, so specific values for WFS and TS may be linearly interpolated using the entries whose A_weld is directly above and directly below the target A_weld value.

In some implementations, to enable multipass welding, controller 152 may determine, for each pass, a phase lag, a start offset, a voltage (or an arc length) offset, a contact tip-to-work distance value, or a combination thereof. The phase lag, the start offset, the voltage (or an arc length) offset, the contact tip-to-work distance value, or a combination thereof, may be constant (e.g., the same) for multiple weld points. Additionally, or alternatively, controller 152 may determine, for each pass and for each weld point, a fill area (e.g., translated into a (WFS, TS, V) tuple), a wire feed speed, a travel speed, a voltage or arch length, a wire offset (e.g., tip location), a work angle offset, a weave amplitude, a weave angle offset, or a combination thereof. The fill area, the wire feed speed, the travel speed, the voltage or arch length, the wire offset, the work angle offset, the weave amplitude, the weave angle offset, or a combination thereof, may be the same or different at two different waypoints of a plurality of waypoints associated with a seam.

In some implementations, when a joint is filled with target bead profiles, a height of the target beads may be the same for all passes made in the joint (equal layer height assumption). In some such implementations, all target weld layers in a joint will be planned to have the same height. When a weld layer is filled with beads, each bead within a layer may have approximately the same area (equal bead areas within a layer assumption). Additionally, or alternatively, a generated fill plan (also referred to as a fill plan solution) may represent a valid fill plan with a smallest number of total passes. In cases where multiple candidate fill plan solutions are generate that each have the same number of total passes (e.g., the same number of minimum passes), such as sum ([2,2,2])=6 and sum([3,3])=6, the fill plan with the smallest number of weld layers is chosen (i.e. len([3,3])<len([2,2,2]).

In some implementations, modifying wire feed speed (WFS) and travel speed (TS) at each waypoint may be sufficient to control the target bead profile, an associated target bead profile area, or a combination thereof. Additionally, or alternatively, the target bead profile, an associated target bead profile area, or a combination thereof, may be controlled based on a target wire offset or a work-angle offset. It is noted that a wire offset may be defined relative to the root along the S1 and S2 directions in which the root itself has a [0,0] offset in S1/S2 coordinates. If there is a need for the root to have a nonzero offset itself in the part frame, a user may manually adjust the offset of the root via a GUI presented via UI and display adapter 106. All work angle offsets (e.g., +/− offset directions) may be defined relative to the mean normal direction (e.g., a 0 offset is the mean normal direction). In some implementations a tolerance of a pass may be dependent on the leg lengths. The leg length may be specified on indicated in an annotation of design 170.

In some implementations, controller 152 may determine a "crop-radius" to identify the surface profile to target. For example, controller 152 may determine the crop-radius based on a leg length generated by controller 152, determined by a user, or indicated in design 170. The crop-radius is the radius about the seam of the joint in which input scan will be cropped, excluding all data outside this radius. The surface vectors describing the tangent vectors of the interfaces about the seam along with travel directions determine the plane of projection for each waypoint.

Figures 12, 13:
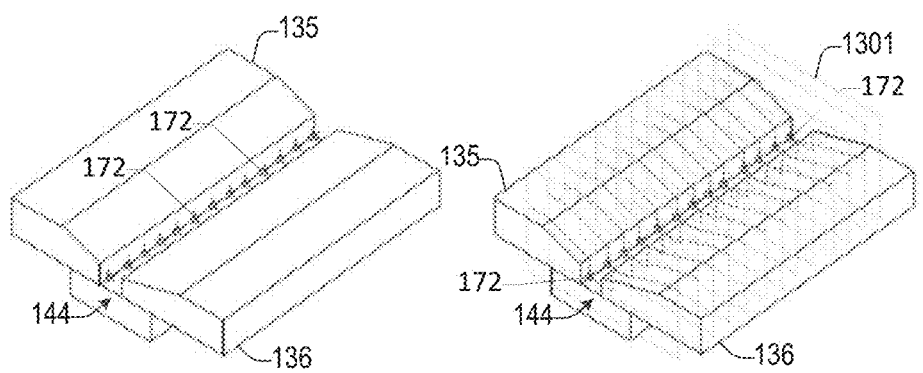
FIG. 12 is a perspective view of an example of a representation of a part to be welded according to one or more aspects.
FIG. 13 is a perspective view of another example of a representation of a part to be welded according to one or more aspects.

In some implementations, controller 152 may identify a seam, such as seam 144. Controller may generate a plurality of waypoints 172 along seam 144. To illustrate, referring to FIG. 12, FIG. 12 is a perspective view of an example of a representation of a part to be welded according to one or more aspects. The part includes first part 135 and second part 136 that define seam 144. Controller 152 has generated waypoints 172 positioned along seam 144.

Figure 14:
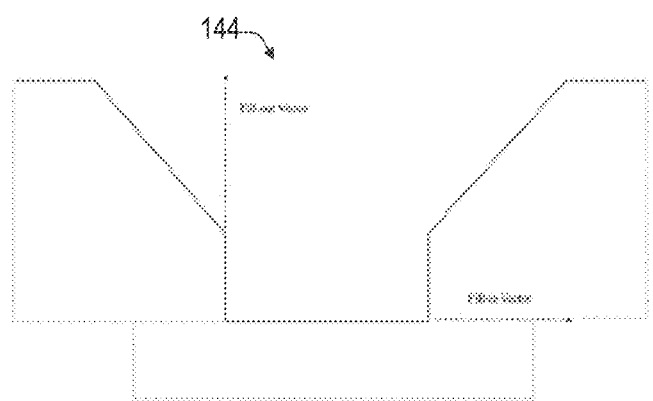
FIG. 14 is a view of an example of a cross-section projection of a seam of FIGS. 12 and 13 according to one or more aspects.

In some implementations, controller 152 may identify a cross-section surface profile which is used to generate a weld profile 174 or a joint template. Weld profile 174 or the joint template may be aligned with one or more fill vectors associated with seam 144. To illustrate, referring to FIG. 13, FIG. 13 is a perspective view of another example of a representation of a part to be welded according to one or more aspects. Controller 152 may generate a plurality of cross-section surface profiles, such as representative cross-section surface profile 1301. Each of the cross-section surface profiles may be positioned at a waypoint (e.g., 172). In some implementations, controller 152 may generate weld profile 174 based on point cloud 169, design 170, sensor data 165 or 180, joint model information 171, or a combination thereof. For example, weld profile 174 may be generated using, at least in part, an ideal weld profile associated with the joint type/weld type. The ideal weld profile may include or correspond to joint model information 171. Referring to FIG. 14, FIG. 14 is a view of an example of a cross-section projection of a seam of FIGS. 12 and 13 according to one or more aspects. In some implementations, controller 152 may determine one or more fill direction vectors of welding profile 174 or weld fill plan 175. For example, controller 152 may determine the one or more fill direction vectors by aligning a fill out direction to be collinear with gravity and a fill in vector to be a function of the fill out direction and the travel direction. The fill-out direction may be or indicate a direction in which layers of beads are stacked on top of one another. The fill-in direction may be or indicate the direction in which beads are distributed along a layer. In some implementations, controller 152 may determine, based on a local frame of reference, a fill direction based on a gravity vector, a travel direction, or a combination thereof.

In some implementations, controller 152 may generate weld fill plan 175 based on weld profile 174. Weld fill plan 174 may include or indicate an ordered sequencing of weld beads within a weld profile cross-section (e.g., 174). One or more weld beads may be positioned within a weld profile and one or more three dimensional weld properties can be mapped back to each feature point in seam 144 based on multiple weld profiles. In some implementations, a particular sequencing pattern within a cross-section is termed a fill key. The fill key may be a 1-dimensional numeric array based representation of how the welding beads are to be distributed within a joint. The positions of each entry within the array represents the layer position among a stack of layers in the fill out direction. The value at each position within the array represents the number of beads within a layer along the fill in direction.

Figures 15, 16:
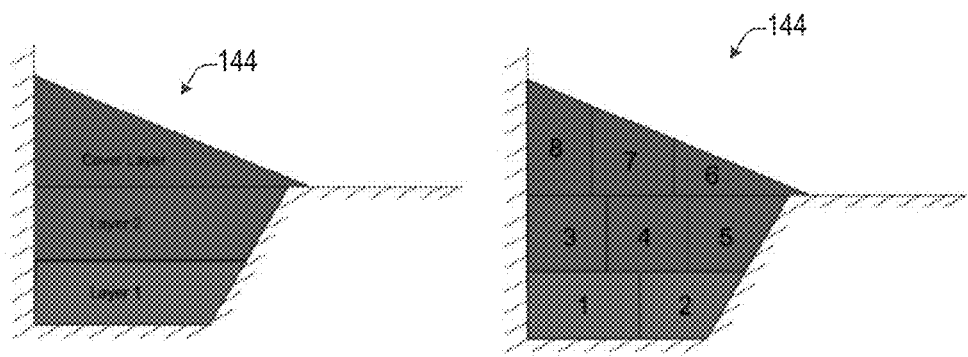
FIG. 15 is a view of an example of a cross-section projection of a seam according to one or more aspects.
FIG. 16 is a view of another example of a cross-section projection of a seam according to one or more aspects.

Referring to FIG. 15, FIG. 15 is a view of an example of a cross-section projection of a seam according to one or more aspects. As shown in FIG. 15, layers of a weld fill plan (e.g., 174) to form a joint in seam 144 are illustrated. For example, the layers include a first layer (Layer 1), a second layer (Layer 2), and a third layer (Cover Layer).

Referring to FIG. 16, FIG. 16 is a view of another example of a cross-section projection of a seam according to one or more aspects. As shown in FIG. 16, an ordered sequence of weld beads to be laid to form a joint in seam 144 are illustrated. For example, ordered bead sequence indicates an order of eight beads to be laid. To illustrate, a first bead and a second bead are to be laid as part of the first layer (Layer 1), a third bead, a fourth bead, and a fifth bead are to be laid as part of the second layer (Layer 2), and a sixth bead, a seventh bead, and an eighth bead are to be laid as part of the third layer (Cover Layer). By stacking the weld beads according to their order between each weld profile, the three dimensional weld properties can be mapped back to each feature point in a seam. As shown in FIG. 16, the bead sequencing would have a fill key of [2, 3, 3] since it has two beads on the first layer and three beads on each of the second and third layers.

In some implementations, to determine a weld fill plan (e.g., 175), controller 152 may be configured to generate one or more slices (e.g., cross sections) of a seam, such as seam 144. Controller 152 may determine a height of a target weld profile (e.g., a joint profile). For example, the height of the target weld profile may be based on a capping surface of the target weld. Controller 152 may divide the height, such as a maximum height) by a positive integer to determine a layer height. The layer height may be greater than or equal to a minimum layer height, less than or equal to a maximum layer height, or a combination thereof. In some implementations, controller 152 may compare the layer height to the minimum layer height, the maximum layer height, or a combination thereof. The minimum layer height, the maximum layer height, or a combination thereof may be determined by a user, annotated in design 170, or a combination thereof. For each layer, controller 152 may determine an area of the layer. Based on the area of the layer, controller 152 may determine, based on a bead area minimum or a bead area maximum, a number of beads per layer based on the layer area. The bead area minimum, the bead area maximum, or a combination thereof, may be determined by a user, annotated in design 170, or a combination thereof. For each bead of the weld fill plan, controller 152 may determine one or more welding parameters. The one or more welding parameters may include a phase lag, a start offset, a voltage (or an arc length) offset, a contact tip-to-work distance value, a fill area, wire feed speed (WFS), travel speed (TS), a voltage (V), a wire offset (e.g., tip location), a work angle offset, a weave amplitude, a weave angle offset, or a combination thereof. In some implementations, controller 152 may determine the one or more welding parameters by accessing the table.

In some implementations, controller 152 may implement a fill plan selection process to generate one or more candidate fill plans. The fill plan selection process may use a discrete solution space of potential fill plans. The potential fill plans may be discretized based on variations of layer heights and the various combinations in which each layer can be subdivided into a set of valid bead sizes. A set of sample cross-sections may be selected to be "filled", or may have beads pre-planned, for each fill plan in the solution space. A metric of intersection-over-union between the area produced from the combination of the beads that are filled within the cross-section and the target profile area is used to score each fill plan. The fill plan with the highest score is selected to be fully generated.

In some implementations, based on the section of a fill plan, each waypoint has its cross-section filled according to the fill-key. Starting at the origin and progressing along the fill in direction, each bead is placed successively after each other until it fills a layer. The fill then moves along the fill out direction starting a new layer. This process is repeated until the entire fill-key is generated.

In some implementations, controller 152 may use bead model 173. Bead model 173 may be modeled from a constant spline that is produced using control points determined using a user defined (or controller generated) arc length parameter and an estimated bead width given a target area and work angle. The bead may shifted along the work angle until its polygon area (as determined from the intersection of the constant spline and surface profile) is close enough to the desired bead area. Each subsequent bead uses the unioned set of previous bead profiles and the target profile to determine its shape and area. Such a process is continued until each bead is produced.

Figure 17:
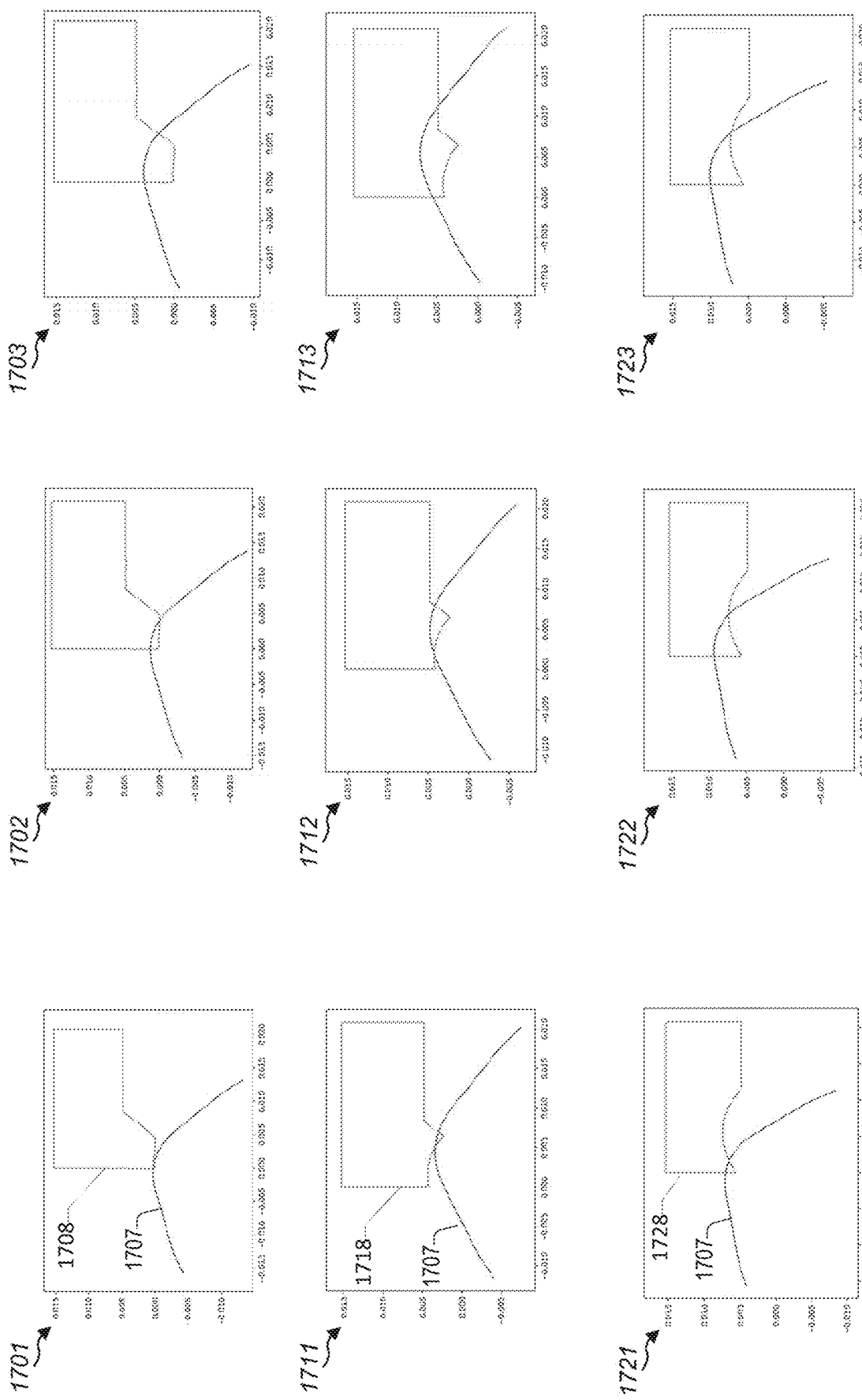
FIG. 17 includes graphs that illustrate a bead that is modeled according to one or more aspects.

Referring to FIG. 17, FIG. 17 includes graphs that illustrate a bead that is modeled according to one or more aspects. The graphs illustrate a bead 1707 that is model (based on bead model 173). In each graph, bead 1707 is modeled based on one or more weld parameters, such as an arc length parameter, a work angle, or a combination thereof. As shown in FIG. 17, a first graph 1701, a second graph 1702, and a third graph 1703 each show bead 1707 modeled based on a first work angle 1708. A fourth graph 1711, a fifth graph 1712, and a sixth graph 1713 each show bead 1707 modeled based on a second work angle 1718. A seventh graph 1721, an eighth graph 1722, and a ninth graph 1723 each show bead 1707 modeled based on a third work angle 1728. Each of the graphs 1701-1703, 1711-1713, and 1721-1723 illustrate a different arc length parameter. In some implementations, each of the graphs 1701-1703, 1711-1713, and 1721-1723 are associated with a [1,2] fill plan.

Figure 18:
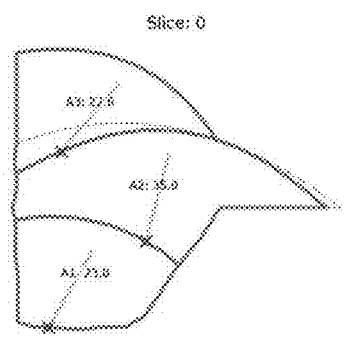
FIG. 18 is a diagraph of an example of a weld fill plan for a welding profile according to one or more aspects.
Figure 19:
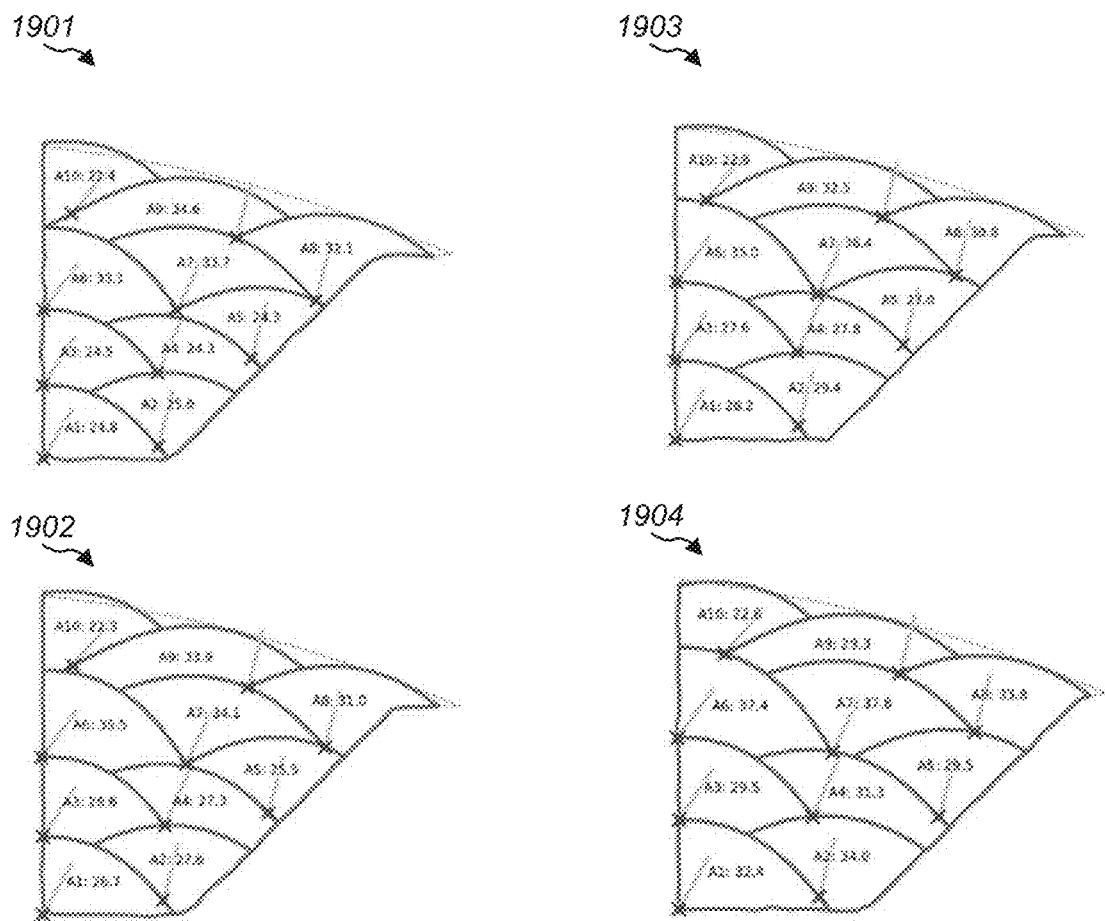
FIG. 19 is a diagraph of an example of a weld fill plan across multiple welding profiles according to one or more aspects.

It is noted that an adaptive fill aspect may be inherent in the manner in which each cross-section is filled since each cross-section is following the same fill-key. A size of each bead may be adjusted to fill a layer that includes the bead. Referring to FIG. 18, FIG. 18 is a diagraph of an example of a weld fill plan for a welding profile according to one or more aspects. As shown in FIG. 18, each bead is associated with an area, and indicates a target area and work angle associated with deposition of the bead. Referring to FIG. 19, FIG. 19 is a diagraph of an example of a weld fill plan across multiple welding profiles according to one or more aspects. For example, FIG. 19 includes a first weld profile 1901, a second weld profile 1902, a third weld profile 1903, and a fourth weld profile 1904. First weld profile 1901 is associated with a first waypoint, a second weld profile 1902 is associated with a second waypoint, third weld profile 1903 is associated with a third waypoint, and fourth weld profile 1904 is associated with a fourth waypoint. For each of the weld profiles 1901-1904, each bead is associated with an area, and indicates a target area and work angle associated with deposition of the bead.

In some implementations, controller 152 may generate weld control signals, such as weld instructions 176 or control information 182, based on weld fill plan 175. Controller 152 may send the weld control signals to robot 120. For example, controller 152 may generate or send the weld control signals based on experimental and physical conversation relationships. In some implementations, the experimental and physical conversation relationships may be stored in a database table, such as a database table stored at memory 102 or database 112. The database table may discretize the weld control signals between bounding extrema that are determined from experimentation of a selected welding wire, a welding gas, a welding mode, an application joint type, a material, or a combination thereof. The bounded welding parameters may include travel speed (TS), wire feed speed (WFS), and voltage (V). These boundaries, together with the minimum and maximum bead sizes, may be designated as the design space. The weld bead cross-sectional area may be determined based on the designated design space.

Figure 20:
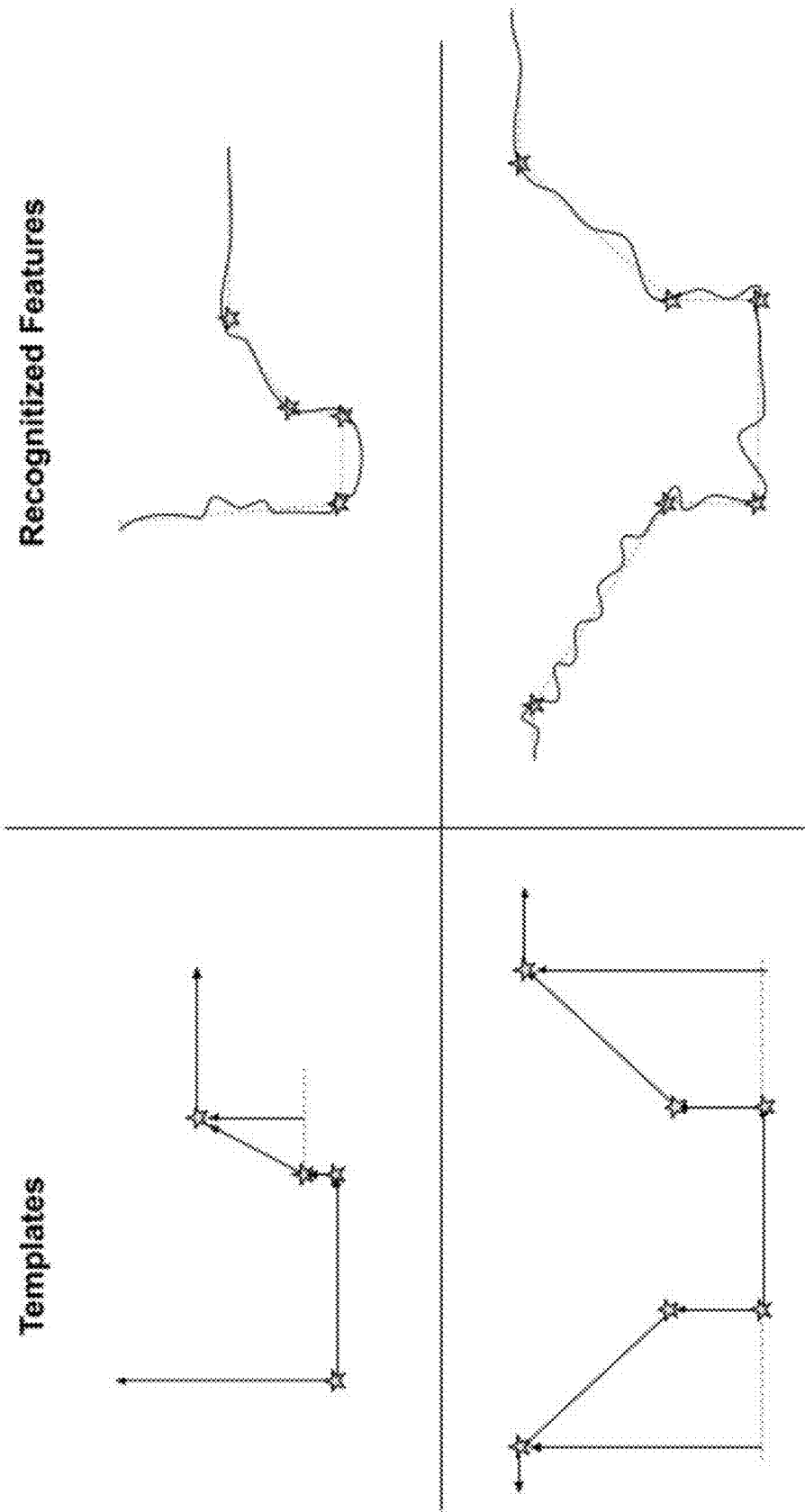
FIG. 20 includes examples of templates matched to recognized features according to one or more aspects.

In some implementations, to enable multipass welding, controller 152 may determine welding profile 174 of seam 114 based sensor data 180, seam pose information, seam feature information, one or more transformation, joint geometry information, a joint type, or a combination thereof. In some implementations, controller 152 may determine the joint type based on sensor data 180, design 170 (e.g., annotation information), user input data, point cloud 169, joint geometry information (e.g., a joint template), or a combination thereof. For example, controller 152 may determine the joint type by matching joint geometry information and sensor data 180. Referring to FIG. 20, FIG. 20 includes examples of templates matched to recognized features according to one or more aspects. As shown in FIG. 20, a first template includes a T-Joint with beveled root gap and a second template includes a v-groove with a beveled root gap. Each of the templates includes one or more features points indicated as stars. Controller 152 may match scan data (e.g., 180), point cloud data 169, or design 170 based on the one or more feature points of a template. In some implementations, controller 152 may determine one or more recognized features based on scan data (e.g., 180), point cloud data 169, or design 170 and may match the one or more recognized features to the one or more features of a template. In some implementations, controller 152 may determine the joint type and select a joint model that matches data 180, point cloud data 169, or design 170 based on the determined joint type.

In some implementations, joint model information 171 may include one or more joint templates, one or more joint template components, or a combination thereof. The one or more joint template components may be combined to form a joint template. A joint template may describe or define spatial relationships of a joint. For example, the spatial relationships may include or correspond to a spatial relationship between a pair of feature points of the template. To illustrate, a joint template may include or define a set of a set of feature vectors and bounded dimensions. The vectors and their relation to one another allow for a discrete set of feature points to be generated with one or more known constraints. The one or more constraints may be generated from the range/boundaries of the dimensions that describe each of the variables in the variable feature vectors. The type of variables that can describe a feature vector may include an angle of rotation, a magnitude, or a combination thereof. Each feature vector may be linked to a parent vector or feature points so that each feature vector can be well defined relative to a single origin point, which may allow or enable for a well-defined, but generalized, way of determining important variable dimensions and geometries.

Figure 21:
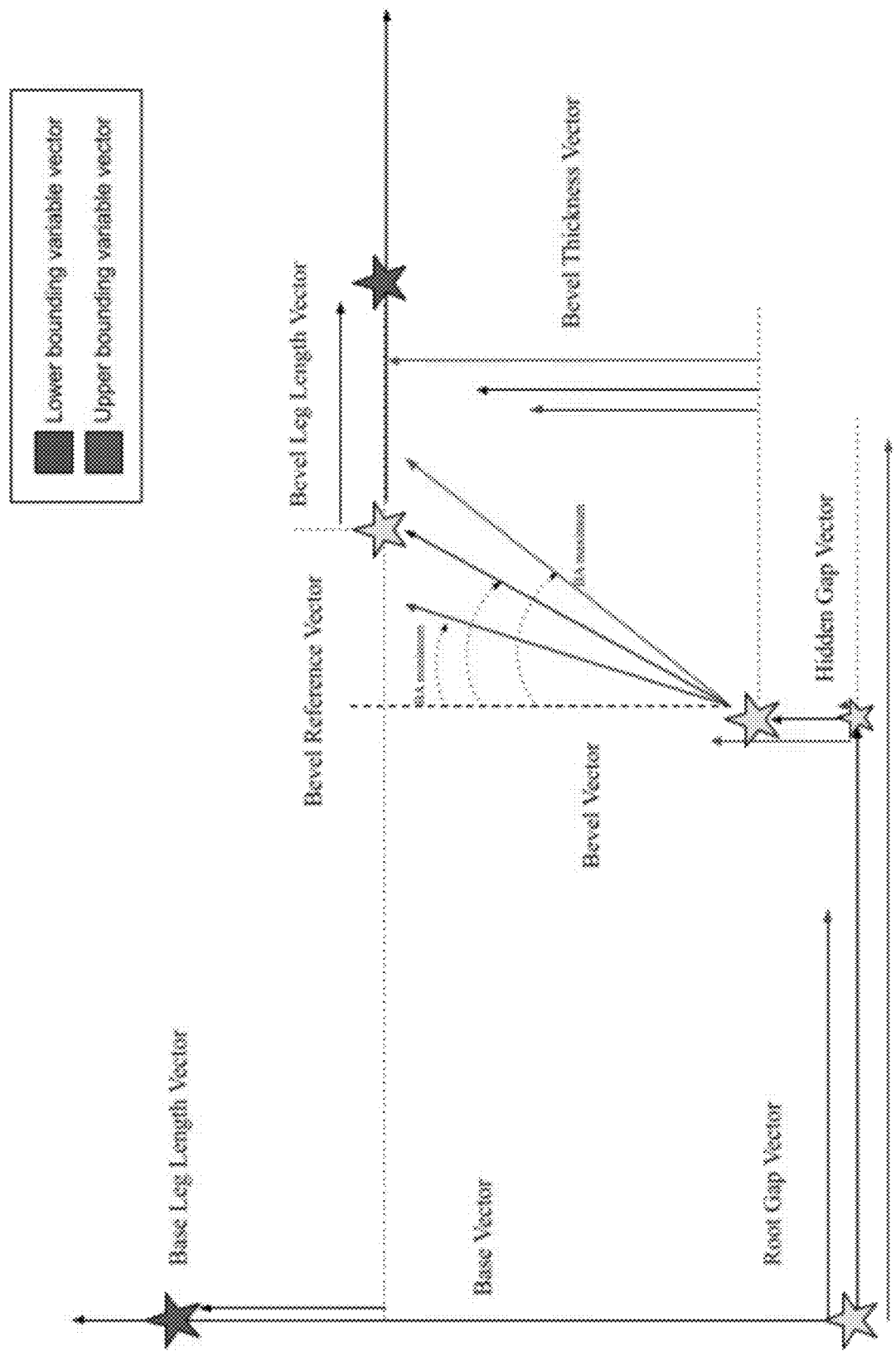
FIG. 21 is an example of a joint template diagram according to one or more aspects.

In some implementations, variables within each variable feature vector may be driving or driven variables. Referring to FIG. 21, FIG. 21 is a joint template diagram according to one or more aspects. As shown in FIG. 21, the joint template diagram is a T-joint template with a beveled root gap. The bevel vector of FIG. 21 is driving the bevel angle while its magnitude is being driven by the bevel thickness vector. In some implementations, a label may be applied to each feature vector with a physical distinction that may indicate how the joint will be filled. For example, the base vector may be a part level vector that indicates that weld beads are constrained to be within a radius of its associated contour points. In a similar manner, the hidden gap vector may represents an inferred void in the part which can then be associated with a missing area to the weld bead targeting its features and therefore inform those beads to overfill in those areas.

In some implementations, controller 152 may use one or more techniques to match a joint template to an identified seam. The one or more techniques may include a deep learning model or a shape fitting model. In some implementations, the one or more techniques may include a first deep learning model. The first deep learning model be configured to receive feature points, nominal 2D contour, real 2D contour, or a combination thereof. The first deep learning model may be configured to output real feature points, a rotation of the feature points from nominal, or a combination thereof. In some implementations, the one or more techniques may include a second deep learning model. The second deep learning model be configured to receive a real 2D contour. The second deep learning model may be configured to output real feature points, a rotation of the feature points from nominal, or a combination thereof. In some implementations, the one or more techniques may include a shape fitting technique. The shape fitting technique may include a statistical and analytical approach in which a model template contour with indexed feature point location may be fit to a real contour to identify a location of the real feature points. The shape fitting technique may include a generalized Procrustes analysis or an active contour model.

In some implementations, each joint template may include one or more bounds (or thresholds) to its variables such that a matching model (or recognition pipeline/network) may be trained. By iterating through the different combinations of values for each variable in a template, an exhaustive set of training data and labels can be generated and used in an unsupervised manner. Various levels of noise and different types of features, such as tacks and gaps, can be injected into the training data to allow a more robust pipeline. In some implementations, a user may generate a joint template or specify one or more bounds of a joint template. For example, the user may generate or specify the one or more bounds via UI and display adapter 106. After generation of the joint template, the joint template may be trained.

In some implementations, controller 152 may include or generate a label for one or more faces/points that make up a cross-section surface projection, such as a cross section surface projection of point cloud 169, sensor data 165, 180, or a joint template. Doing so may enable for interaction models to be more robust and adaptive to geometrical features such as tacks and gaps.

In some implementations, controller 152 may determine or identify a capping surface of a weld joint. For example, the capping surface may be determined or identified based on a user requirement, engineering information of a joint, design 170, or historical information. The capping surface may be determined based on the leg lengths of the weld joint, convexity which connects two main surfaces, or a combination thereof. The leg lengths may be associated with or determined based on design 170 or the scan data. Additionally, or alternatively, the leg lengths may include bounds and might be allowed for expansion of a capping surface if a solution (e.g., a weld profile or a weld fill plan) fails to be found.

Figure 22:
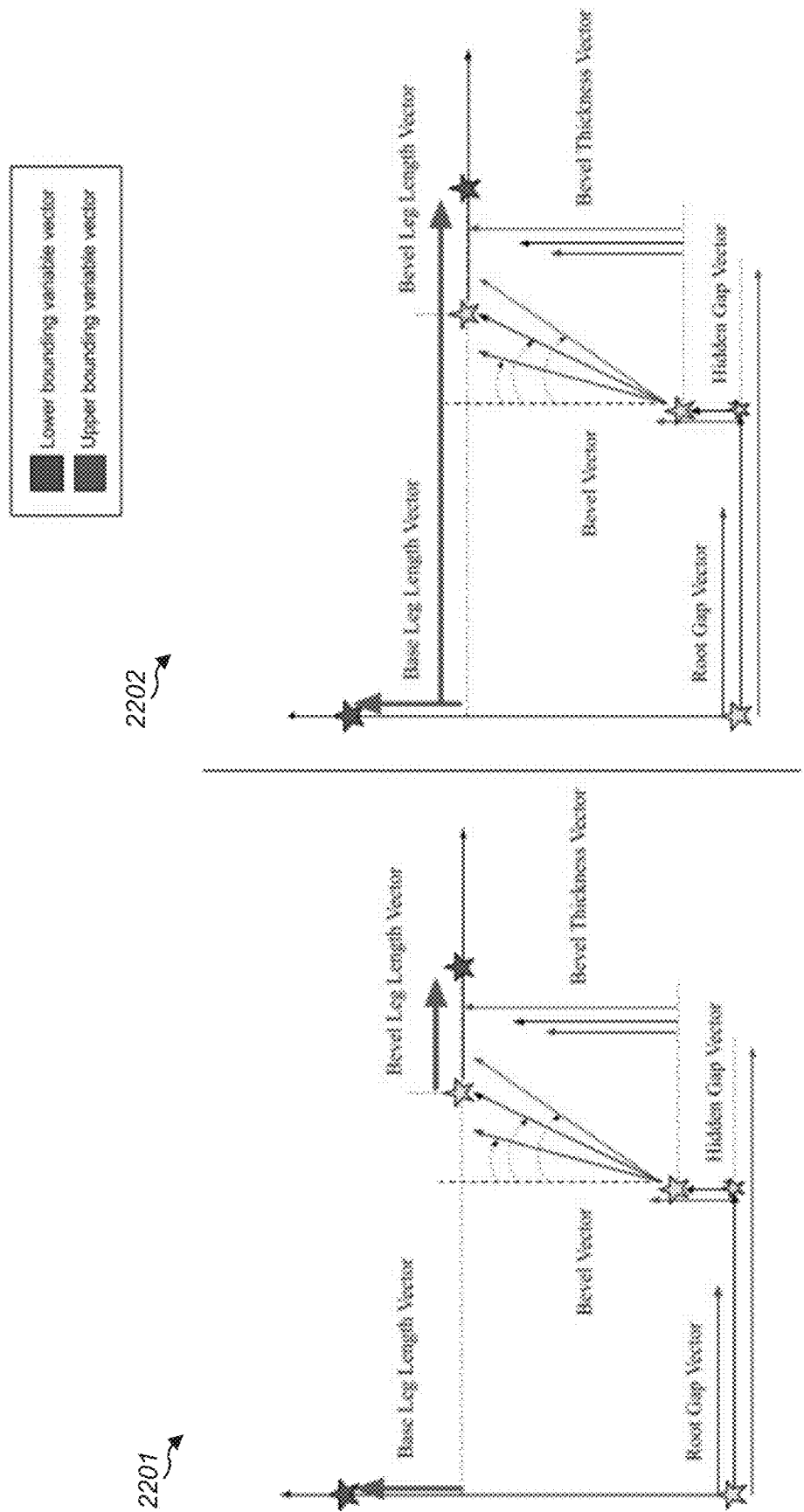
FIG. 22 includes examples of a joint template diagrams having different leg length definitions according to one or more aspects.

Referring to FIG. 22, FIG. 22 includes examples of a joint template diagrams having different leg length definitions according to one or more aspects. As shown in FIG. 22, a first joint template diagram 2201 and a second joint template diagram 2202 are each a T-joint template with a beveled root gap. In first joint template diagram 2201, a leg length definition is generalized. For example, a base leg length vector and a bevel leg length vector are the same magnitude. In second joint template diagram 2202, a leg length definition is variable. For example, a base leg length vector and a bevel leg length vector have different magnitudes.

Figure 23:
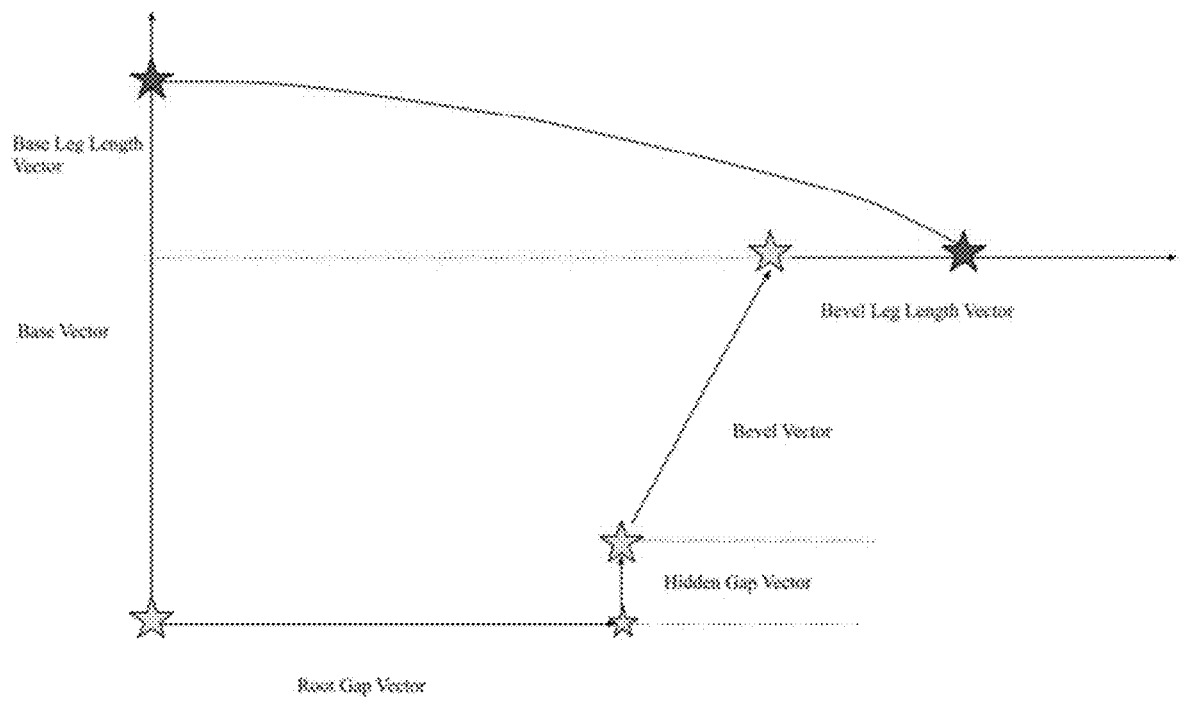
FIG. 23 is another example of a joint template diagram according to one or more aspects.
Figure 24:
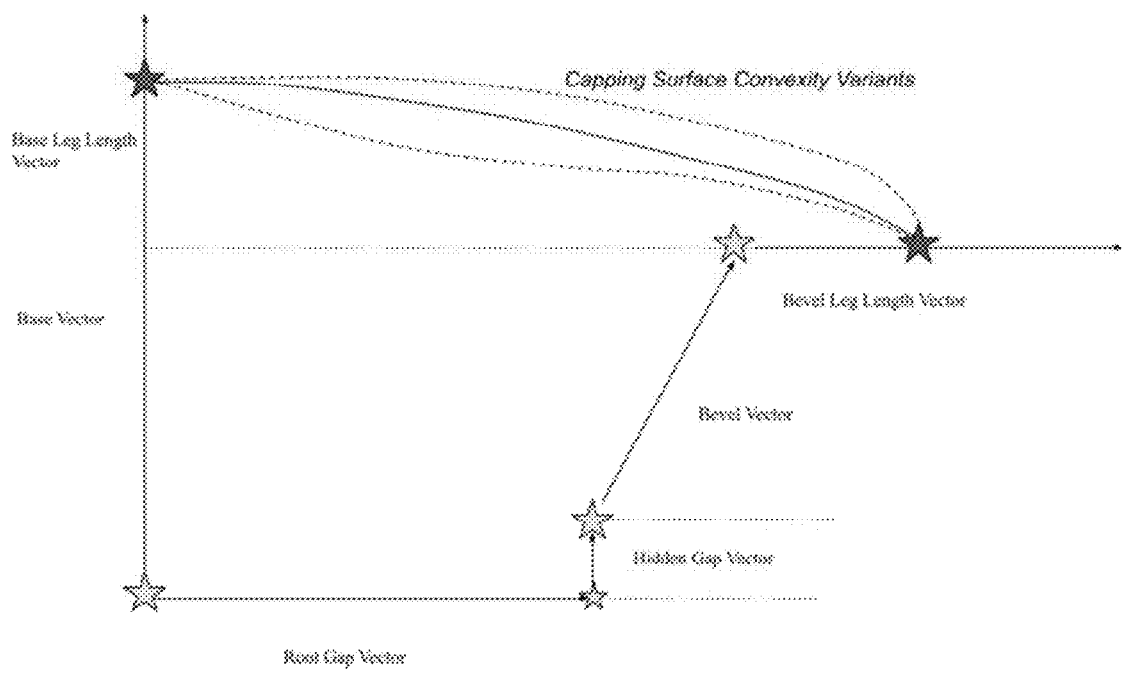
FIG. 24 is another example of a joint template diagram according to one or more aspects.

Referring to FIG. 23, FIG. 23 is another example of a joint template diagram according to one or more aspects. As shown in FIG. 23, the joint template diagram is a T-joint template with a beveled root gap in which a target profile of a joint is shown. Referring to FIG. 24, FIG. 24 is another example of a joint template diagram according to one or more aspects. As shown in FIG. 24, the joint template diagram is a T-joint template with a beveled root gap in which a capping surface variants are indicated.

Figure 25:
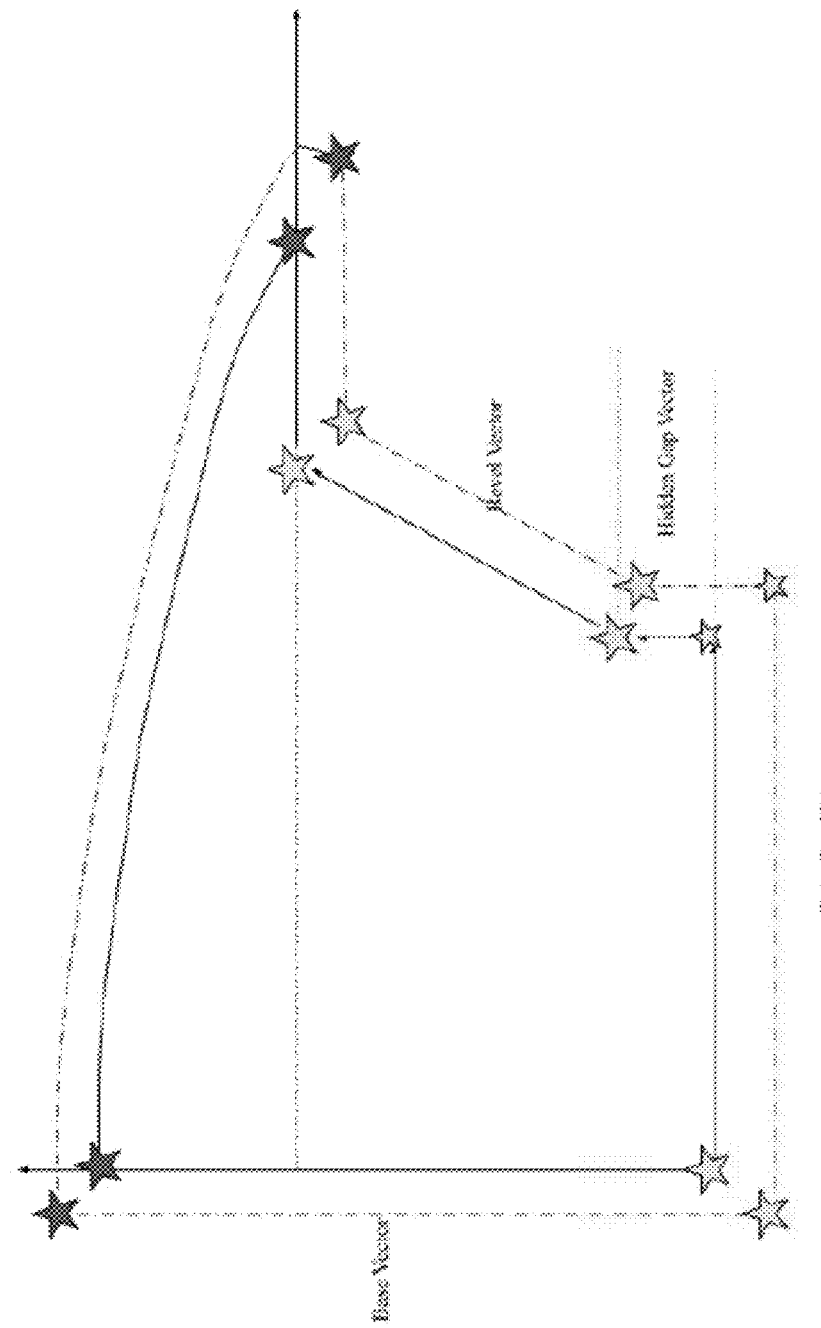
FIG. 25 is another example of a joint template diagram according to one or more aspects.

Because one or more variable vectors and one or more leg lengths can be assigned bounds, the measured value of each variable would be able to be reported as to whether or not it complies with a design specification (e.g., of design 170). Referring to FIG. 25, FIG. 25 is another example of a joint template diagram according to one or more aspects. As shown in FIG. 24, the joint template diagram is a T-joint template with a beveled root gap in which a target profile dilation is indicated by a dashed line. For example, the dashed line may include or correspond to one or more surfaces of a part, a capping surface of a joint, or a combination thereof.

Additionally, the joint template may enable generation of weld fill plan 175 and/or weld instructions 176 without the need of a table. For example, the welding profile 174, weld fill plan 175, one or more welding parameters, weld instructions 176, or a combination thereof may be determined or generated based on the joint template, which may enable fine-grain control of the weld and continuously improve its welding models without the need to restructure the software interface with planning.

In some implementations, to enable multipass welding, controller 152 may use a search space that is modeled in a continuous domain, where the cross-sections use primitive geometries to estimate the size and location of beads. Each bead may be connected to another according to its neighbors in a layer. Additionally, or alternatively, one or more beads, or all beads, may be initially generated or placed in a joint template based on an average or median bead size. For example, design 170 (e.g., annotation information of design 170) may indicate a minimum bead size, a maximum bead size, or a combination thereof. In some implementations, a fill plan may be generated by populating the joint template with a plurality of one or more candidate beads.

FIGS. 26-29 are examples of generation of a fill plan using a joint template diagram according to one or more aspects. To generate the fill plan, the joint template may be populated with a plurality of candidate beads, such as one or more beads having the same size. It is noted that although a single joint template is described, a seam (e.g., 144) may be associated with multiple waypoints that each correspond to a joint template that is populated to generate a fill plan.

Figure 26:
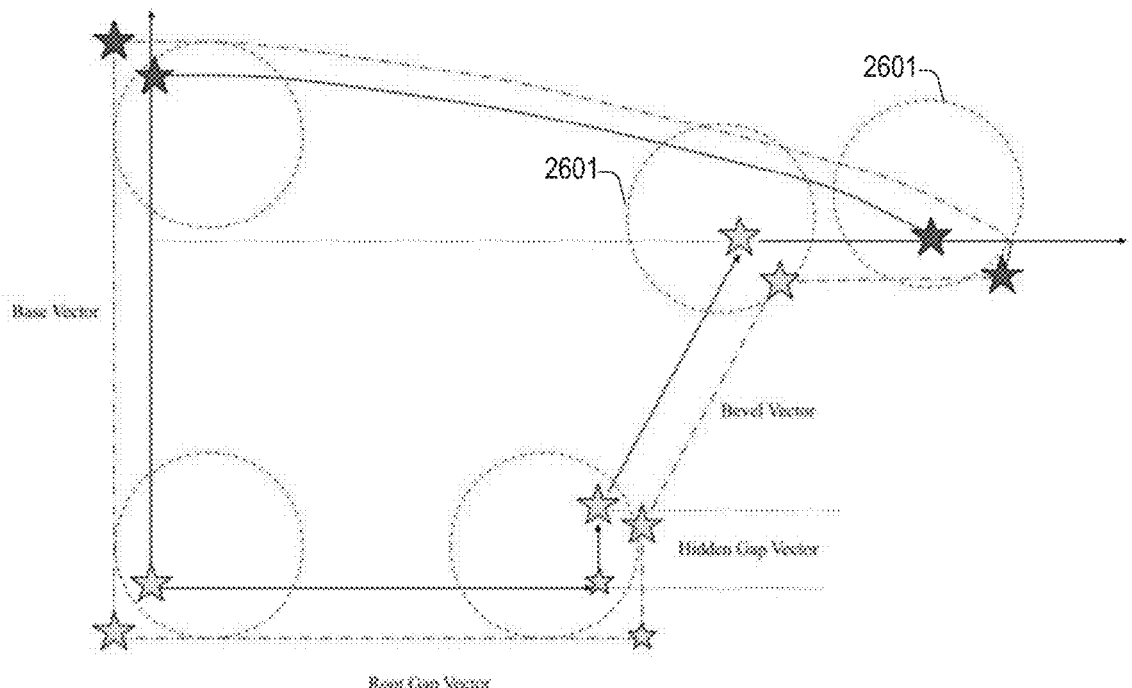
FIGS. 26-29 are examples of generation of a fill plan using a joint template diagram according to one or more aspects.
Figure 27:
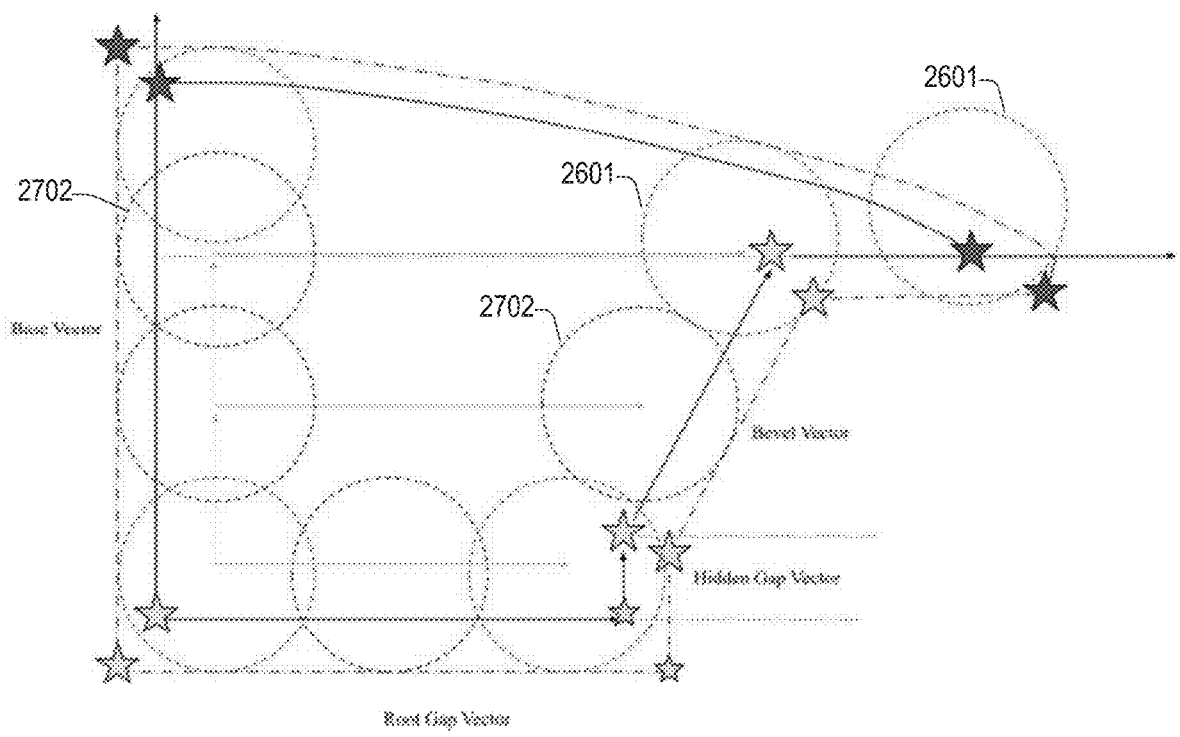
Figure 28:
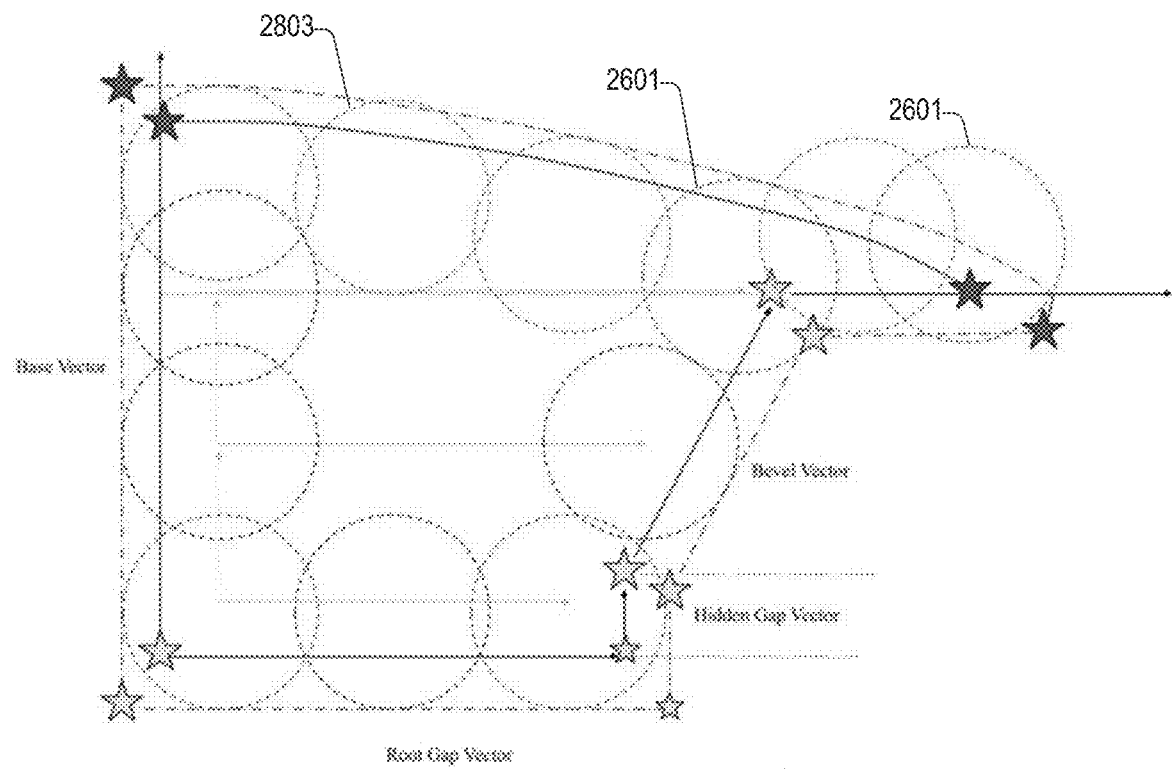
Figure 29:
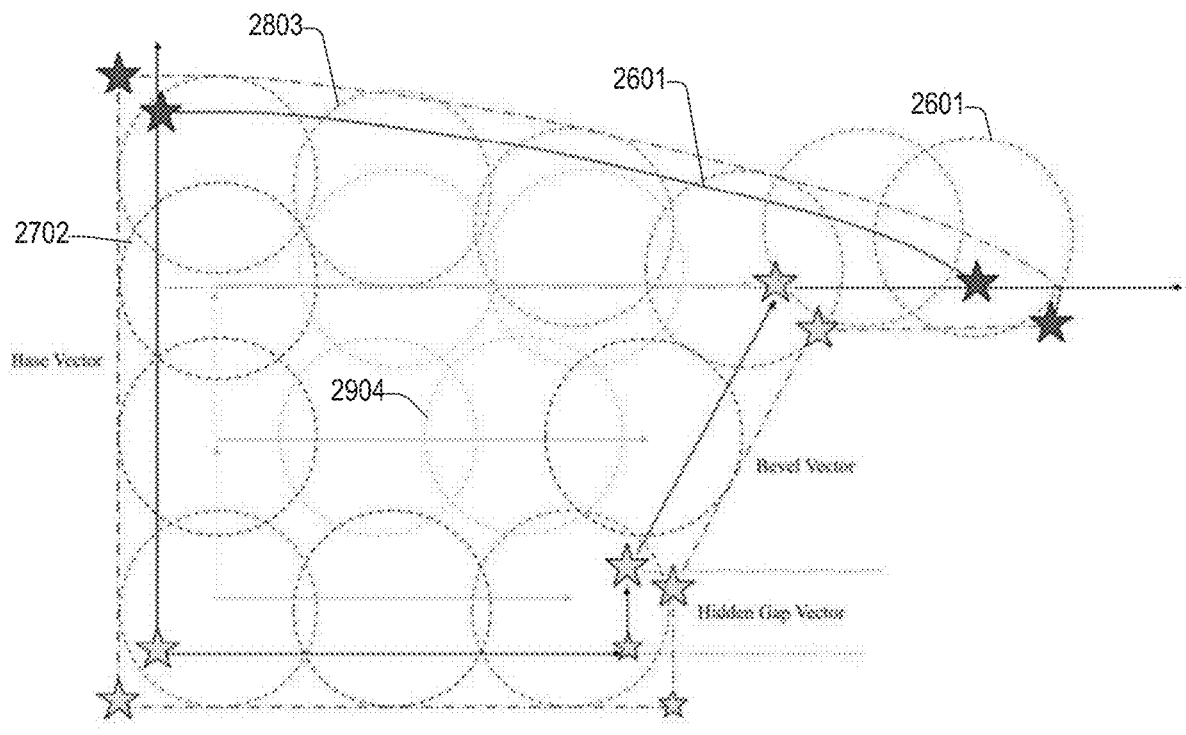

Referring to FIG. 26, a first set of beads 2601 are placed at the feature points for the given geometry of the joint template. It is noted, that when the seam has multiple waypoints that each have a corresponding joint template, each joint template (e.g., cross-section) may have the same number of beads in the first set of beads 2601. Referring to FIG. 27, a second set of beads 2702 are placed at one or more auxiliary structural points. The auxiliary structural points may include voids between beads of first set of beads 2601 (e.g., the structural beads) along the boundaries of the part, such as along surface/part locations. Placement of second set of beads 2702 may ensure the entire part surface has a weld bead sufficiently close to its surfaces to provide proper fusion. Referring to FIG. 28, a third set of beads 2803 are placed to conform to a capping surface boundary to provide a stable cover layer. Referring to FIG. 29, a fourth set of beads 2904 are placed as filler beads along the fill-in lines connecting adjacent boundary beads. It is noted that to populate the joint template, controller 152 may populate the joint template with first set of beads 2601 and, optionally, second set of beads 2702, third sets of beads 2803, fourth set of beads 2904, a combination thereof, or none of second set of beads 2702, third sets of beads 2803, fourth set of beads 2904.

Figure 30:
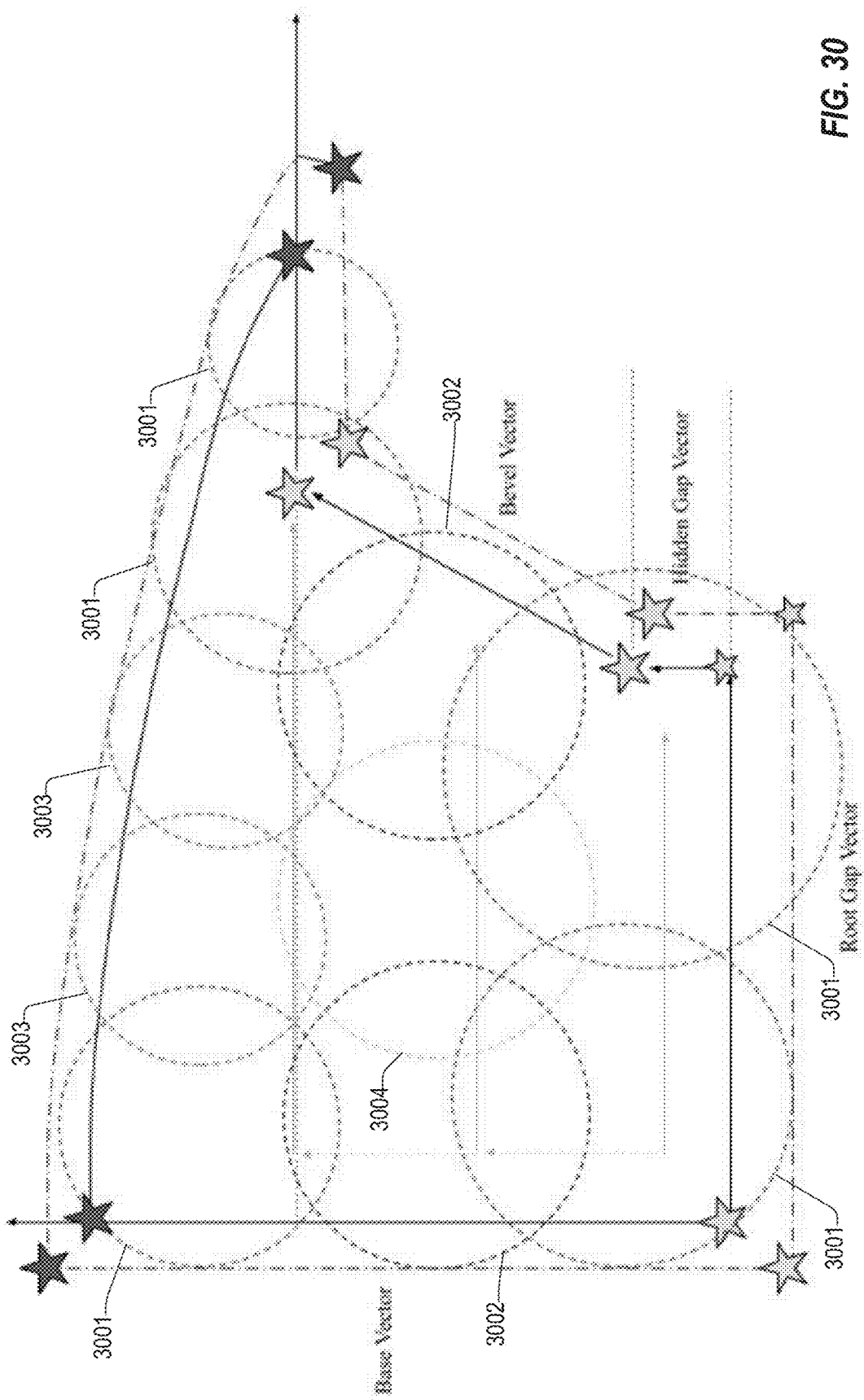
FIG. 30 is an example of a refined fill plan using a joint template diagram according to one or more aspects.

In some implementations, controller 152 may refine the placement of the plurality of candidate beads in the joint template. For example, refinement by controller 152 may include optimizing within a joint template and/or across multiple or all joint templates (e.g., cross-sections) associated with a seam (e.g., 144). To illustrate, controller 152 may determine a maximum number of beads or a minimum number of beads across one or more joint templates (e.g. one or more cross-section). The maximum number of beads and/or the minimum number of beads may provide a bounding number of beads for weld fill plan 175. In some implementations, the maximum number of beads and/or the minimum number of beads may be determined based on user input, design 170 (e.g., annotated data included in design 170), or a combination thereof. Additionally, controller 152 may refine the placement of the plurality of candidate beads such that one or more beads are merged into larger but valid beads until a joint template converges on a minimum viable bead count. Referring to FIG. 30, FIG. 30 is an example of a refined fill plan using a joint template diagram according to one or more aspects. As shown in FIG. 30, the plurality of candidate beads including first set of beads 2601, second set of beads 2702, third sets of beads 2803, and fourth set of beads 2904 have been refined. For example, the joint template of FIG. 30 includes a first set of beads 3001, a second set of beads 3002, a third set of beads 3003, and a fourth set of beads 3004. First set of beads 3001 may include or correspond to first set of beads 2601. Second set of beads 3002 may include or correspond to second set of beads 2702. Third set of beads 3003 may include or correspond to third set of beads 2803. Fourth set of beads 3004 may include or correspond to fourth set of beads 2904. In some implementations, each bead in a cross-section may be linked, e.g., in a tree-like structure, to a previous bead and/or a following bead neighboring cross-sections. Such linking may enable refinement and synchronization when a bead is updated. For example, a bead may be updated during multipass operations, such as after a first pass of the multiple passes.

In some implementations, controller 152 performs bead prediction and determines spatial relations based on the plurality of candidate beads (e.g., the first set of candidate beads), the refined fill plan, or a combination thereof. By considering the initial positions and areas of the refined fill plan, each bead may be provided a bounding search radius of where an origin of the bead can be placed, which may produce a higher likelihood that one or more structural beads retain their connection to structurally critical interfaces and features. Additionally, by considering the initial positions and areas of the refined fill plan, it may be more likely that the bead positions remain in close proximity to those in neighboring slices (different joint templates) as each bead is organized to be contained and controlled from a structural or part bead. In some implementations, controller 152 may generate a metric that can be associated with the risk of structural compromise. For instance, based on the refined fill plan, controller 152 may identify a bead that encompasses two structural features which could impose a higher risk. Controller 152 may be configured to generate a notification to a user of the condition and present the notification to the use, such as via UI and display adapter 106.

In some implementations, controller 152 determines weld control signals, such as weld instructions 176 or control information 182. The weld control signals may be determined from experimental and physical conservation relationships. Additionally, or alternatively, the control signals may be determined from an inverse model of bead model 173. To illustrate, inputs to a welding model may include a bead's spatial properties and outputs of the welding model may include the weld control signals needed to produce the desired shape of the bead. In some implementations, the welding model may be specific to a welding wire size, a welding wire type, a welding gas composition, a weld mode (Pulse/CV), or a combination thereof. Additionally, or alternatively, the welding model may receive, as an input, the welding wire size, the welding wire type, the welding gas composition, the weld mode (Pulse/CV), or a combination thereof.

In some implementations, controller 152 may use a global deformed seam to place a first bead—e.g., an initial bead of a multipass weld operation. Controller 152 may assume that the position of the global deformed seam is the root pass and all offsets may be applied according to the global deformed seam. Alternatively, the global deformed seam may be used by controller 152 to guide a search for the root feature. Once the root feature is identified, the root features may be used as an origin of the first bead. The offset between the identified root feature and the global deformed seam may then applied to the offset between the global and local deformed seam. In other words, instead of applying a rigid transform between global and local deformed seams, a composition of two rigid transforms may be applied.

In some implementations, after weld fill plan 175 is generated, controller 152 may update weld fill plan 175 based on one or more operations by robot 120. For example, controller 152 may update weld fill plan 175 after one or more passes, or after each pass of multiple passes. To illustrate, after a pass, a most recently executed bead of the weld fill plan 175 may be updated or replaced with its corresponding local scanner data (e.g., sensor data 180). Replacing the bead shape with the executed bead shape may enable controller 152 to react to and correct for the differences observed between the global scanner—or the CAD model—and the local scanner data.

In some implementations, after robot 120 lays a bead, controller 152 may receive scan data (e.g., senor data 180) of the bead. The scan data may include image data or laser data. It is noted that scanning the bead may occur during a time period in which the bead cools after being laid. Controller 152 may update one or more beads of weld fill plan 175 based on the received scan data. For example, controller 152 may update the one or more beads one at a time. Based on the scan data, controller 152 may extract geometric properties, such as one or more toe points, a bead profile, or a combination thereof. In some implementations, controller 152 may update one or more beads that were laid prior to a most recently laid bead. For example, heat from the most recently laid bead may impact one or more previously laid beads and controller 152 may update weld fill plan to reflect a change to the previously laid beads.

After updating weld fill plan 175 to reflect the beads that have been laid, controller 152 may update one or more beads of weld fill plan 175 that have not yet been laid by robot 120. For example, controller 152 may update one or more bead profiles, a capping layer profile, or a combination thereof. In some implementations, to update weld fill plan 175, controller 152 may generate a new weld fill plan using, as a starting point, the joint template and the scan data of one or more beads that have been laid. To illustrate, controller 152 may place one or more candidate beads and refine the one or more candidate beads to generate the new weld fill plan. Based on the updated or new weld fill plan, controller 152 may generate additional weld instructions (e.g., 176). For example, controller 152 may use bead model 173 to generate the additional weld instructions.

During operation of system 100, controller 152 may identify seam 144 to be welded. For example, seam 144 may be identified to perform a weld operation via multiple welding passes. In some implementations, seam 144 is defined based on one or more parts, such as first part 135 and second part 136. For example, first part 135 and second part 136 are configured to be positioned such that first part 135 and second part 136 may define seam 144 along which first part 135 and second part 136 to be welded. Controller 152 may identify seam 144 based on a computer aided design (CAD) model (e.g., design 170) of the one or more parts, scan data (e.g., sensor data 180) associated with a scan operation, or a combination thereof. To illustrate, controller 152 may receive the scan data from one or more sensors, such as sensor 109. The scan data may include information, such as image data captured by the one or more sensors.

In some implementations, controller 152 may generate a representation, such as point cloud 169, of the one or more parts. For example, controller 152 may generate a representation of each part of the one or more parts, seam 144, or a combination thereof. The representation may be generated based on design 170, the sensor data, or a combination thereof. For example, controller 152 may generate a first point cloud (e.g. 704) based on design 170, such as a CAD model, and a second point cloud (e.g., 706) based on the scan data. In some implementations, controller 152 may segment the representation to remove non-part (or non-seam) information. In some such implementations, after the segmentation of the representation to remove non-part (or non-seam) information, the representation may be referred to as a joint representation or a joint geometry representation.

In some implementations, controller 152 may identify one or more characteristics (e.g., one or more dimensions) of seam 144. For example, controller 152 may determine the one or more characteristics (e.g. the one or more dimension) based on the representation or the segmented representation. The one or more characteristics may include or indicate a depth, a width, a length, a volume, a cross-sectional area, or a combination thereof. In some implementations, controller 152 may determine a weld volume or cross-sectional area associated with the seam.

In some implementations, controller 152 may determine the one or more characteristics based on the first point cloud (e.g. 704) and the second point cloud (e.g. 706). For example, controller 152 may perform a comparison based on the first point cloud (generated based on design 170) and the second point cloud (generated based on the scan data). Based on the comparison, controller 152 may determine the one or more characteristics which include or indicate a gap width variability (e.g., a gap width deviation), a gap depth variability (e.g., a gap depth deviation, a weld volume variability (e.g. a weld volume deviation), or a combination thereof.

In some implementations, controller 152 may generate a plurality of waypoints (e.g., 172) associated with seam 144. For example, controller 152 may generate the plurality of waypoints along seam 144. To illustrate, the plurality of waypoints may be spaced along seam 144, such as equally spaced along seam 144. For example, the plurality of waypoints may be spaced based on a bead size of a weld bead, such as an average bead size or a bead size parameter indicate or annotated in design 170.

In some implementations, controller 152 may generate a welding profile 174 associated with a cross-section of seam 144 at a waypoint of the plurality of waypoints. Additionally, or alternatively, controller 152 may, for each waypoint of the plurality of waypoints, generate a welding profile 174 of the waypoint. In some implementations, controller 152 may determine an area (e.g., a weld volume) of seam 144 at the welding profile of a waypoint.

In some implementations, to determine a welding profile (e.g., 174), controller 152 may generate a model (e.g., a joint model) of seam 144. The joint model may include a 2D model or a 3D mode. The joint model may be generated based on seam 144. For example, the joint model of seam 144 may be generated based on design 170 (e.g. a CAD model) or the first point cloud, or based on the scan data or the second point cloud. To illustrate, controller 152 may determine the plurality of waypoints for identified seam 144 and may generate the joint model for at least waypoint of the plurality of waypoints.

In some implementations, to generate the joint model, controller 152 may use or access one or more feature components of a plurality of feature components. The plurality of feature components may include or correspond to joint model information 171. Each feature component of the plurality of feature components includes a set of feature geometry. As an illustrative, non-limiting example, the set of feature geometry may include a point, line, or curve and geometric constraints with tolerances and their interrelationships as modeled by a tree, graph or other generalized searchable and solvable structure, or a combination thereof. Controller 152 may generate the joint model of seam 144 based on or to include a first feature component of the plurality of feature components and a second feature component of the plurality of feature components. To illustrate, controller 152 may match a first feature component of the plurality of feature components to the cross-section (determined based design 170 or the scan data) of seam 144.

In some implementations, controller 152 may determine one or more joint parameters based on the joint model. For example, for each feature point of the joint model, controller 152 may determine or identify a vector of the feature point, another feature point related to the feature point based on the vector, or a combination thereof. Additionally, or alternatively, controller 152 may determine, based on the joint model, a fill-in direction (for multiple passes), a fill-out direction (of multiple passes), an ordered sequence of weld beads to be laid to for a weld of seam 144, a travel direction (of robot 120), or a combination thereof. In some implementations, welding profile 174 includes or indicates an ordered sequence of weld beads to be laid to for a weld of seam 144, a number of layers, a number of beads, a bead size, or a combination thereof.

In some implementations, to generate a welding profile, controller 152 determines a number of bead layers. For example, controller may determine a number of bead layers based on a bead layer height, such as a bead layer height indicated by a user, based on annotated data associated with design 170, or a combination thereof. Additionally, or alternatively, controller 152 may determine a number of weld beads to be included in a bead layer. In some implementations, controller 152 may determine or calculate a volume or area of a bead layer, of a weld bead, or a combination thereof. For example, controller 152 may determine or calculate the volume or area based on a bead layer a bead layer height, a number of bead layers, a joint model, or a combination thereof.

In some implementations, controller 152 may determine one or more welding parameters for each bead of a welding profile of a waypoint. For example, the one or more welding parameters may include or indicate a weld wire size used to form the weld bead, an area or volume of the weld bead, or a combination thereof. Additionally, or alternatively, the one or more welding parameters may include a wire feed speed, a travel speed, or a combination thereof. In some implementations, to determine at least one weld parameter of the one or more welding parameters, controller 152 may use or access a table. For example, controller 152 may access the table and may, based on the weld wire size or the area or volume of the weld bead, determine a wire feed speed, a travel speed, or a combination thereof. In some implementations, controller 152 is configured to determine weld fill plan 175 based on multiple welding profiles.

In some implementations, to generate a welding profile, controller 152 populates the joint model of the cross-section with a plurality of candidate weld beads. To populate the joint model, controller 152 may determine one or more design parameters based on design 170 (e.g., annotated data), the scan data, user input, or a combination thereof. For example, the one or more design parameters may include or indicate a number of layers, a bead size, a tolerance, or a combination thereof. In some implementations, each candidate weld bead of the plurality of candidate weld beads has a size that is within a bead size range, a position (e.g., a location, an orientation, or both), or a combination thereof. Stated in a different manner, each candidate weld bead of the plurality of candidate weld beads may have a size property, a spatial property, or a combination thereof. The bead size range may be based on design 170 (e.g., annotated data), user input, known weld quality parameters, or a combination thereof.

In some implementations, to populate the joint model of the cross-section with a plurality of candidate weld beads, controller 152 places a first set of beads of the plurality of candidate weld beads at one or more structural points of the joint model. Additionally, or alternatively controller 152 may place a second set of beads of the plurality of candidate weld beads at one or more structural points of the joint model, a third set of beads of the plurality of candidate weld beads based on a cover profile of the joint model, a fourth set of beads of the plurality of candidate weld beads at one or more unfilled spaces of the joint model, or a combination thereof.

In some implementations, controller 152 generates weld fill plan 175 for seam 144. For example, controller 152 may generate weld fill plan 175 based on one or more welding profiles 174. To illustrate, weld fill plan 175 may be generated based on, for each waypoint of the plurality of waypoints, a welding profile associated with the waypoint. Weld fill plan 175 may include or indicate, for each weld bead of weld fill plan 175, a wire feed speed, a travel speed, a voltage, or a combination thereof. In some implementations, weld fill plan 175 includes or indicates multipass welding operations. Each pass of the multiple weld passes (of the multipass welding operations) for at least a portion of a weld layer (of the weld).

In some implementations, weld fill plan 175 includes or indicates a plurality of fill plan weld beads based on the plurality of candidate weld beads. The plurality of fill plan weld beads may correspond to a single weld profile of a single way point or multiple weld profiles of multiple waypoints of the plurality of waypoints. In some implementations, the plurality of fill plan weld beads correspond to all waypoints of a plurality of waypoints. For each weld bead of the plurality of fill plan weld beads, controller 152 may determine a size of the weld bead. Additionally, or alternatively, for each weld bead of the plurality of fill plan weld beads, controller 152 determines a torch angle, a weaving or motion characteristic, or a combination thereof, to form the bead. Additionally, or alternatively, for each weld bead of the plurality of fill plan weld beads, controller 152 may determine, at each of multiple weld profiles, a bead profile based on the bead model, the torch angle, a travel speed, a travel angle, a torch speed, gravity, a surface tension, a gas mixture, a heat input, a voltage or current, a wire feed speed, a wire property (a wire diameter or a wire type—composition/material), a weave or motion parameter (e.g., a weave type, a weave amplitude characteristic, a weave frequency characteristic, or a phase lag), a contact tip to work distance (CTWD) offset, a welding mode (e.g., a waveform), a welding technique (e.g., TIG or MIG), or a combination thereof, as illustrative, non-limiting examples. In some implementations, controller 152 may use machine learning to determine the plurality of fill plan weld beads. For example, for each bead of the plurality of fill plan weld beads, controller 152 may use the machine learning and a bead model to determine the torch angle, a wire feed speed, the gas mixture, the voltage, a torch speed, or a combination thereof.

In some implementations, controller 152 may generate, based on weld fill plan 175, weld fill plan information that indicates a number of layers, a number of beads in each layer, a bead size, a weld size, a cover profile, a cost of material, an average bead size, a minimum bead size, a maximum bead size, a distance of a bead from a structural point, one or more cross-sections, or a combination thereof, as illustrative, non-limiting examples. In some implementations, weld fill plan 175 may be validated based on one or more operating characteristics of the welding robot. Additionally, or alternatively, weld fill plan 175 may be validated or approved by a user of system 100.

In some implementations, controller 152 may generate instructions, such as weld instructions 176 or control information 182, to lay a weld material in seam 144. For example, controller 152 may generate weld instructions 176 based on one or more welding profiles (e.g., 174), weld fill plan 175, or a combination thereof. The instructions (e.g., 176) may correspond to a single pass welding operation or a multipass welding operation. Controller 152 may transmit, to robot 120, control information 182 that includes or indicates weld instructions 176. Control information 182 may be provided to robot 120 to cause robot to perform one or more operations. Additionally, or alternatively, control system 110 (e.g., controller 152) may sent control information 182 as weld commands to robot 120.

In some implementations, robot 120 may receive and execute the instructions to weld the one or more parts. Additionally, or alternatively, robot 120 may execute the instructions to scan seam 144 prior to, during, or after laying weld material associated with seam 144. Scan data may be generated based on the scan of seam 144 and sent to controller 152. Based on the scan data, controller 152 may update or generate additional instructions to lay additional weld material. For example, controller 152 may receive the scan data prior to laying weld material of one or more multipass welding operations and may compare the scan data to weld fill plan 175. In some implementations, controller 152 may determine, based on the comparison, one or more characteristics, such as a gap width variability (e.g., a gap width deviation), a gap depth variability (e.g., a gap depth deviation, a weld volume variability (e.g. a weld volume deviation), a tack, or a combination thereof, as illustrate, non-limiting examples. Controller 152 may update or modify weld fill plan 175 based on a result of the comparison. In some implementations, updating or modifying weld fill plan 175 may include updating, for at least one waypoint of a plurality of waypoints associated with the seam, a welding profile of the at least one waypoint. For example, controller 152 may update a weld bead indicated by the welding profile, a wire feed speed, a travel speed, a voltage, or a combination thereof. Additionally, or alternatively, controller 152 may generate one or more additional weld instruction 176 for robot 120 based on the updated or modified weld fill plan 175.

Figure 2:
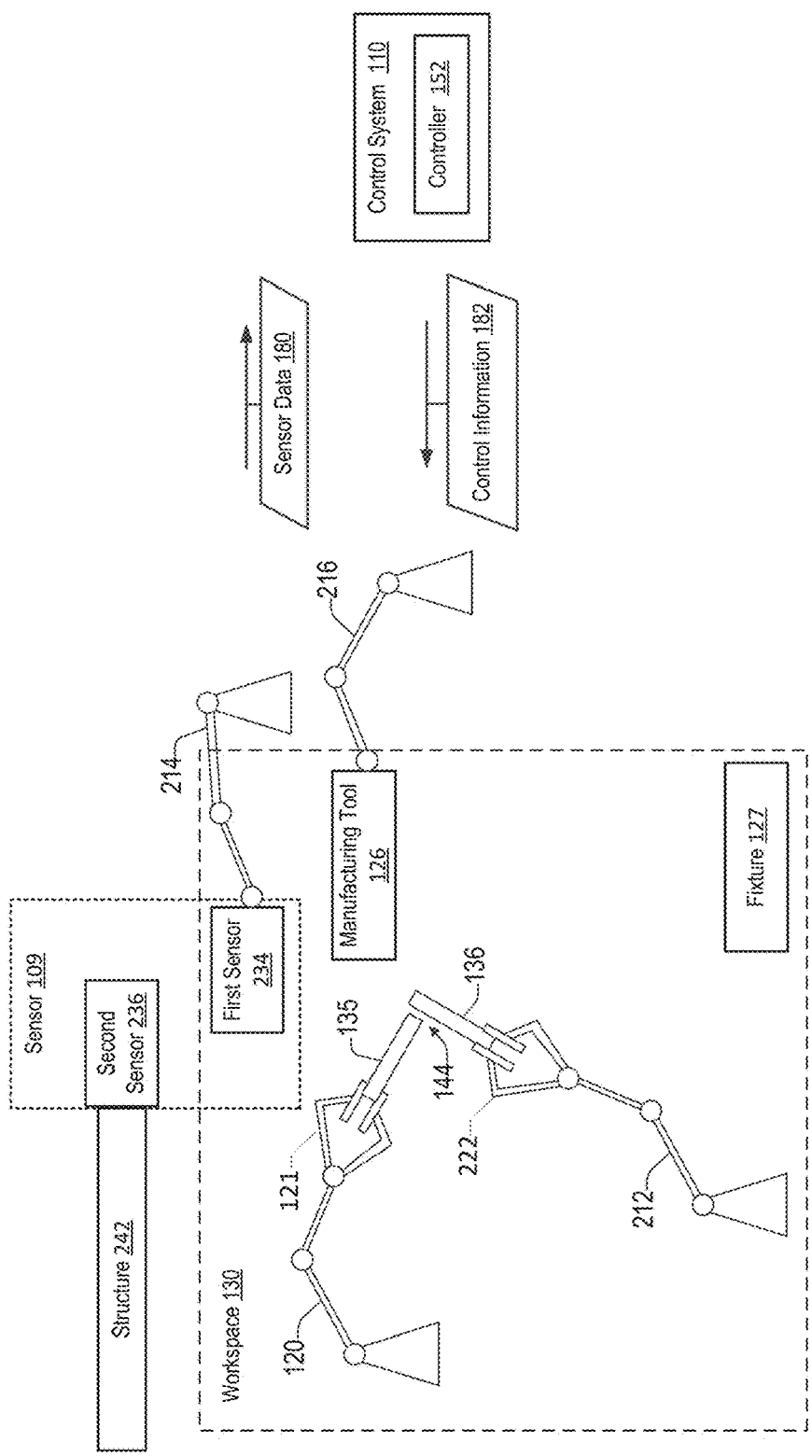
FIG. 2 is a block diagram illustrating another system configured to enable multipass welding in a robotic manufacturing environment according to one or more aspects.

Referring to FIG. 2, FIG. 2 is a block diagram illustrating another system 200 configured to implement machine learning logic in a robotic manufacturing environment according to one or more aspects. System 200 may include or correspond to system 100 of FIG. 1.

As compared to system 100 of FIG. 1, system 200 includes multiple robots. To illustrate, the multiple robot include four robots including a first robot (e.g., 120), a second robot 212, a third robot 214, and a fourth robot 216. Additionally, sensor 109 includes multiple sensors, such as a first sensor 234 and a second sensor 236. System 200 also includes a structure 242, and a second tool 222 in addition to a first tool (e.g., 121).

Workspace 130 of system 200 may include one or more devices or components of system 200. As shown, workspace 130 includes first robot 120, first tool 121, second robot 212, second tool 222, first sensor 234, and manufacturing tool 126. In other implementations, workspace 130 may include fewer or more components or devices than shown in FIG. 2. For example, workspace 130 may include third robot 214, fourth robot 216, second sensor 236, structure 242, control system 110, or a combination thereof.

In some implementations, the multiple robot devices may include or correspond to robot 120. For example, at least one of the multiple robot devices (e.g., 120, 212, 214, 216) may include a robotic arm providing—as a non-limiting example—six-degrees of freedom. In implementations, the robotic arm may be manufactured by YASKAWA®, ABB® IRB, KUKA®, Universal Robots®. Additionally, or alternatively, the robotic arm may be configured to be coupled to one or more tools.

Second robot 212 may include a second robotic arm. Second tool 222 may be coupled to an end of the second robotic arm. In some implementations, second tool 222 may include or correspond to first tool 121. For example, second tool 222 may be configured to be selectively coupled to a second set of one or more objects that include second part 136. The second set of one or more objects may be the same as or different from the first set of objects first tool 121 is configured to be coupled to.

Third robot 214 may include a third robotic arm. First sensor 234 may be coupled to an end of the third robotic arm. In some implementations, first sensor 234 is configured to generate first sensor data (e.g., 180). For example, first sensor 234 is configured to capture one or more images of first part 135, the second par 136, or a combination there.

Fourth robot 216 includes a fourth robotic arm. Manufacturing tool 126 (e.g., a welding tool) is coupled to an end of the fourth robotic arm.

Second sensor 236 is configured to generate second sensor data (e.g., 180). For example, second sensor 236 is configured to capture one or more images of first part 135, second part 136, or a combination there. In some implementations, second sensor 236 is positioned on or coupled to structure 242. Structure 242, such as a frame or weldment, may be dynamic or static. In either dynamic or static configuration of structure 242, second sensor 236 may be configured to be dynamic or static with respect to structure 242—e.g., if second sensor 236 is dynamic, the second sensor may be configured to rotate (e.g., pan) or tilt.

Figure 8:
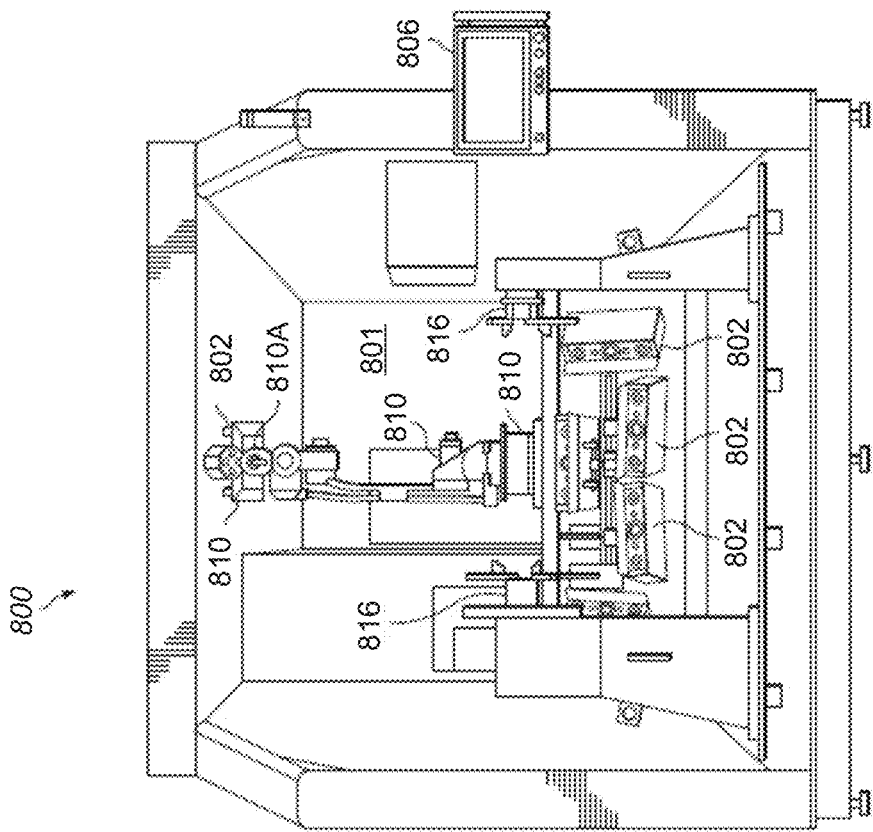
FIG. 8 is a schematic diagram of an autonomous robotic welding system according to one or more aspects.

Referring now to FIG. 8, FIG. 8 is a schematic diagram of an autonomous robotic welding system 800 according to one or more aspects. System 800 may include or correspond to system 100 or system 200.

System 800 includes a workspace 801. Workspace 801 may include or correspond to workspace 130. In some implementations, workspace 801 includes one or more sensors 802, a robot 810, and one or more fixtures 816. The one or more sensors 802 may include or correspond to sensor 109, first sensor 234, or second sensor 236. In some implementations, one or more sensors 802 may include a movable sensor. For example, at least one sensor of one or more sensors 802 may be coupled to or included in robot 810. Robot 810 may include or correspond to robot 120, 212, 214, or 216. The one or more figures 816 may include or correspond to fixture 127. System 800 may also include a UI 806 coupled to workspace 801. UI 806 may include or correspond to UI and display adapter 106. Although workspace 801 is described as including one or more sensors 802, robot 810, and one or more fixtures 816, in other implementations, workspace 801 may optionally include or not include one or more of sensors 802, robot 810, or fixtures 816. Additionally, or alternatively, system 800 may include one or more additional components, such as a control system 110 or components thereof.

Robot 810 may include multiple joints and members (e.g., shoulder, arm, elbow, etc.) that enable robot 810 to move in any suitable number of degrees of freedom. Additionally, or alternatively, robot 810 includes a weld head 810A that performs welding operations on a part. For example, the part (e.g., 135, 136, 502, 504, 602, or 604) may be supported by fixture 816, such as a clamps.

During operation of system 800, the one or more sensors 802 capture one or more images of workspace 801. In some implementations, the one or more images include image data. One or more sensors 802 may provide the one or more images a controller (not shown in FIG. 8). For example, the controller may include or correspond to controller 152. The controller may generate one or more 3D representations (e.g., one or more point clouds) of workspace 801. For example, the one or more point clouds may include or correspond to one or more fixtures 816, a part supported by one or more fixtures 816, and/or other structures within workspace 801. The controller may identify, based on the 3D representations, to identify a seam, such as seam 144. For example, the seam may include or correspond to a part (e.g., 135 or 136) the is supported by one or more fixtures 816. Additionally, or alternatively, the controller may plan, based on the 3D representation, a path for welding the seam without robot 810 colliding with structures within workspace 801, and to control robot 810 to weld the seam.

Figure 9:
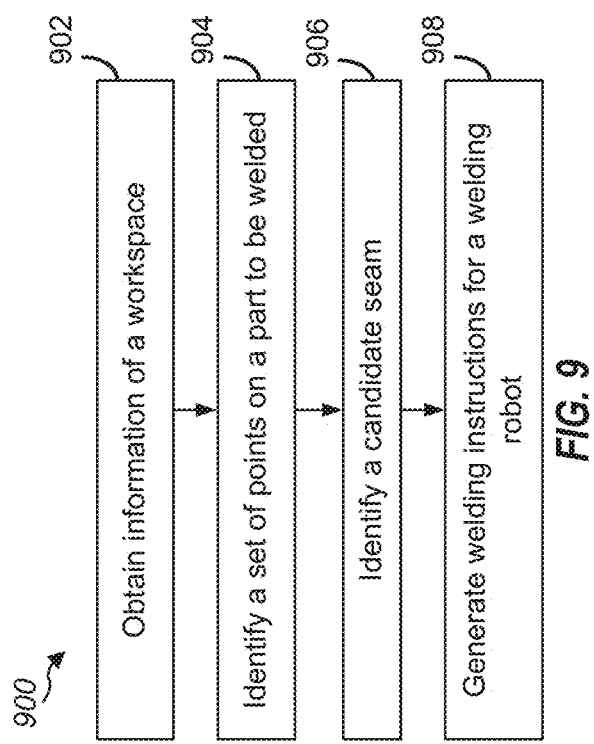
FIG. 9 is a flow diagram illustrating an example process of generating welding instructions for a welding robot according to one or more aspects.

Referring now to FIG. 9, FIG. 9 is a flow diagram illustrating an example process 900 of generating welding instructions for a welding robot according to one or more aspects. Operations of process 900 may be performed by a control system or a controller (referred to collectively as "the controller" with reference to FIG. 9), such as control system 110, controller 152, or processor 101. For example, example operations (also referred to as "blocks") of process 900 may enable a controller to generate welding instructions for a welding robot. The welding instructions may include or correspond to control information 182. The welding robot may include or correspond to robot 120, 212, 214, 216, or 810.

In block 902, the controller obtains information of a workspace. For example, the workspace may include or correspond to workspace 130 or 801. The information may include or correspond to sensor data 180. The information may be received by the controller from one or more sensors, such as sensor 109, 234, 236, or 802. In some implementations, the information includes image data, such as images of the workspace. Additionally, or alternatively, the workspace may include, or have positioned therein, one or more parts (e.g., 135, 136, 502, 504, 602, or 604), one or more fixtures (e.g., 127, 816), or a combination thereof. The one or more fixtures, such as a clamp, may be configured to hold the one or more parts in a secure manner.

In some implementations, the controller may be configured to generate a point cloud based on the information. For example, the point cloud may include or correspond to point cloud 169, 500, 600, or 706. To illustrate, image data (or multiple images) can be overlapped with one another to reconstruct and generate three-dimensional image data. The three-dimensional image data can be collated together to generate the point cloud.

In block 904, the controller identifies a set of points on a part to be welded. For example, the controller may identify the set of points based on the information. In some implementations, the set of points can represent the possibility of a seam that is to be welded. For example, the seam may include or correspond to seam 144, 506, or 606. In some implementations, the controller may use a neural network to perform pixel-wise segmentation on the image data to identify the set of points. Additionally, or alternatively, one or more fixtures or one or more clamps can be classified, based on the image data, by the neural network, such as by using one or more image classification techniques. The portions of the image data associated with the one or more fixtures and/or the one or more clamps can be segmented out such that those portions of the image data are not used to identify the set of points. Segmenting out one or more portions of the image data can reduce computational resources required to identify a set of points to be welded by decreasing the search space. In some examples, the set of points can be identified from other portions of the image data (e.g., portions of the image data that are not segmented out).

In block 906, the controller identifies a candidate seam. For example, the candidate seam may be identified based on the set of points. The candidate seam may include or correspond to seam 144, 506, or 606. For example, a subset of points within the set of points can be identified as a candidate seam. In some implementations, the controller may use a neural network to perform image classification and/or depth classification to identify the candidate seam. In some examples, the candidate seam can be localized relative to the part. To illustrate, a position and an orientation for the candidate seam can be determined relative to the part in order to localize the candidate seam.

In some implementations, process 900 may include verifying whether the candidate seam is an actual seam. For example, the controller may be configured to verify whether or not the candidate seam is an actual seam. For example, the information, such as image data from one or more sensors, may be based on multiple angles (e.g., fields of view) of the workspace. For each image captured from a different angle, the controller may determine a confidence value that represents whether the candidate seam determined from that angle is an actual seam. The seam may be verified as an actual seam based on a confidence value being greater than or equal to a threshold. In some examples, after the candidate seam has been identified and verified, the subset of points can be clustered together to form a contiguous and continuous seam.

Additionally, or alternatively, process 900 may include classifying the candidate seam (or a determined actual seam) as a type of seam. For example, the controller may be configured to classify the candidate seam or the actual seam as a type of seam of multiple types of seams. To illustrate, the controller may use a neural network to determine if the candidate seam or the actual seam is a butt joint, a corner joint, an edge joint, a lap joint, a tee joint, another type of seam, or a combination thereof. In some implementations, the controller classifies a seam (e.g., an actual seam) after a determination that a candidate seam is the actual seam.

In block 908, the controller generates welding instructions for a welding robot. For example, the controller may generate the welding instructions by tracing a path from one end of the subset of points to the other end of the subset of points. Tracing the path from one of the subset of points to the other end of the subset of points can generate a path for the seam. Stated in a different manner, the path identified by the controller may correspond to a path of a welding head to for a weld at the seam. Additionally, path planning can be performed based on the identified and localized candidate seam. For example, path planning can be performed based on the path for the seam that can be generated from clustering the subset of points. In some implementations, the controller may execute path planning logic 105 to perform the path planning.

In some implementations, the welding instructions can be based on the type of seam (e.g., butt joint, corner joint, edge joint, lap joint, tee joint, and/or the like). Additionally, or alternatively, the welding instructions can be updated based on input from a user via a user interface (e.g., user interface and adapter 106 or UI 806). For example, the user can select a candidate seam to be welded from all the available candidate seams via the user interface. In some implementations, the user can select a seam from identified actual seams. The path planning can be performed for the selected candidate seam and welding instructions can be generated for the selected candidate seam. In some examples, the user can update welding parameters via a user interface. The welding instructions can be updated based on the updated welding parameters.

Based on process 900, a welding robot can be operated and controlled by implementing without a priori information of one or more parts to be welded. For example, the a priori information may include or correspond to a CAD model, such as design 170. Since the one or more parts may be scanned in order to generate the welding instructions, a representation of the scanned image(s) of the one or more parts can be annotated with one or more candidate seams (e.g., via a user interface). The annotated representation can be used to define a 3D model of a part. The 3D model of the part can be saved in a database for subsequent welding of additional instances of the part. For example, the database may include or correspond to database 112.

Figure 10:
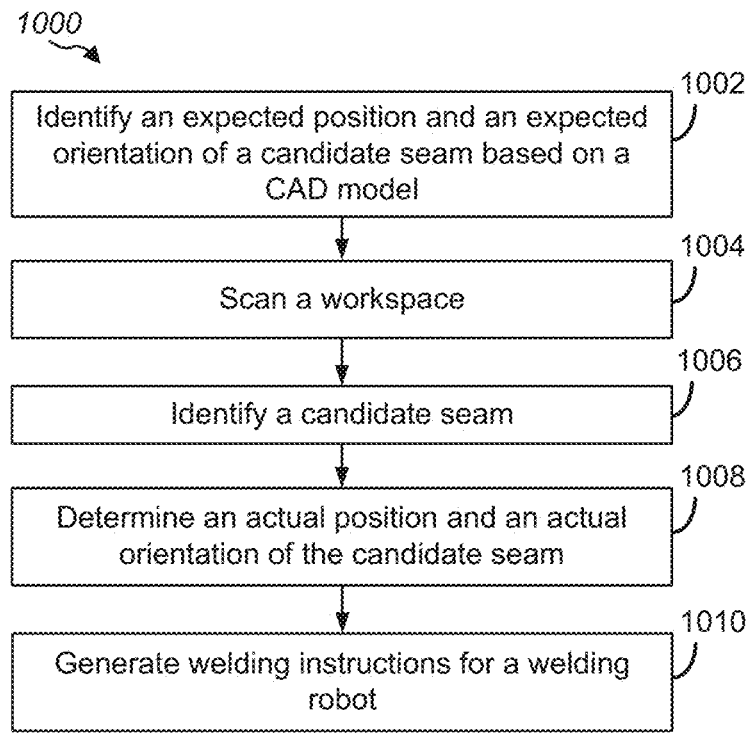
FIG. 10 is a flow diagram illustrating an example process of generating welding instructions for a welding robot according to one or more aspects.

Referring now to FIG. 10, FIG. 10 is a flow diagram illustrating an example process 1000 of generating welding instructions for a welding robot according to one or more aspects. Operations of process 1000 may be performed by a control system or a controller (referred to collectively as "the controller" with reference to FIG. 10), such as control system 110, controller 152, or processor 101. For example, example operations (also referred to as "blocks") of process 1000 may enable a controller to generate welding instructions for a welding robot. The welding instructions may include or correspond to control information 182. The welding robot may include or correspond to robot 120, 212, 214, 216, or 810.

In block 1002, the controller identifies an expected portion and an expected orientation of a candidate seam based on a CAD model. For example, the candidate seam may include or correspond to seam 144, 506, or 606. The CAD model may include or correspond to design 170. The CAD model may include or represent a part, such as one or more parts 135, 136, 502, 504, 602, or 604. The expected orientation and expected position may be determined using the annotations included in the CAD model. For example, the annotations may be provided by a user/operator/designer of the CAD model or a robotic system, such as system 100, 200, or 800. In some implementations, the controller identifies one or more candidate seams based on the model geometry. For example, the controller may perform object matching to match components or features on a part to components or features included in or indicated by the CAD model. Stated in a different manner, the expected position and orientation of a candidate seam can be identified based on the object matching.

In block 1004, the controller scans a workspace. To illustrate, the controller may instruct or initiate one or more sensors to scan a portion or an entirety of the workspace. For example, the workspace may include or correspond to workspace 130 or 801. The scan of the workspace may generate information, such as sensor data 180, that is received by the controller. The information may include or correspond to sensor data 180. The information may be received by the controller from one or more sensors, such as 109, 234, 236, or 802. In some implementations, the information includes image data, such as images of the workspace. Additionally, or alternatively, the workspace may include, or have positioned therein, one or more parts (e.g., 135, 136, 502, 504, 602, or 604), one or more fixtures (e.g., 127, 816), or a combination thereof. The one or more fixtures, such as a clamp, may be configured to hold the one or more parts in a secure manner.

In some implementations, the controller may be configured to generate a point cloud based on the information. For example, the point cloud may include or correspond to point cloud 169, 500, 600, or 706. To illustrate, image data (or multiple images) can be overlapped with one another to reconstruct and generate three-dimensional image data. The three-dimensional image data can be collated together to generate the point cloud.

In some implementations, in order to reduce the processing time to generate welding instructions, the scan performed by the sensors may be a partial scan of the workspace. Stated in a different manner, instead of scanning the workspace from every angle, sensor scan a portion of the workspace such that the information (e.g., the image data) is collected from a one or more angles, such as one or more angles from which a candidate seam is expected to be visible. In such examples, the point cloud generated from the image data is a partial point cloud. Generating a partial point cloud that, for example, does not include portions of the part that the model indicates do not contain seams to be welded, can reduce scanning and/or processing time.

In block 1006, the controller identifies a candidate seam. For example, the controller may identify the candidate seam based on the information received from the sensor, the image data, the point cloud, and/or the partial point cloud. For example, the seam may include or correspond to seam 144, 506, or 606. To illustrate, the candidate seam may be identified as described herein at least with reference to FIGS. 1 and 9.

In block 1008, the controller determines an actual position and an actual orientation of the candidate seam. For example, the controller may identify a first subset of points and a second subset of points. To illustrate, the controller may identify, in block 1002 the first subset of points a modeled seam. The controller may identify, in block 1006, the second set of points as the candidate seam. In some implementations, the first subset of points and the second subset of points can be compared. To illustrate, the controller may compare the first subset of points and the second subset of points as described with reference to at least FIG. 7. For example, the first subset of points and the second subset of points may include or correspond to the CAD model point cloud 704 and the scan point cloud 706, respectively. In some implementations, the first subset of points can be allowed to deform to determine the actual position and orientation of the candidate seam.

In some implementations, the comparison between the first subset of points and the second subset of points can be used to determine a tolerance for the first subset of points (e.g., the expected location and the expected orientation of the candidate seam). In some such implementations, the first subset of points can be allowed to deform based on the tolerance to determine the actual position and orientation of the candidate seam. Stated in a different manner, the expected position and the expected orientation of the candidate seam can be refined (in some examples, based on the tolerance) to determine the actual position and the actual orientation of the candidate seam. This deforming/refining technique can account for the topography of the surfaces on the part that are not accurately represented in the CAD model of the part.

In block 1010, the controller generates welding instructions for a welding robot. For example, the welding instructions may be generated based on the actual position and the actual orientation of the candidate seam. In some implementations, the controller may perform path planning based on the actual position and the actual orientation of the candidate seam to determine the welding instructions.

In some implementations, similar to one or more operations as described at least with reference to process 900, once the actual position and the actual orientation of the candidate seam is identified, process 1000 can include the controller verifying the candidate seam. However, in some other implementations, in contrast to process 900, process 1000 may not include user interaction. To illustrate, user interaction may be needed because one or more seams to be welded may already be annotated in the CAD model. Accordingly, in some instances, welding robots can be operated and controlled by implementing process 1000 without any user interaction.

In some implementations, the controller, such as controller 152, may initiate a scan of the workspace, such that one or more sensors (e.g., a sensor coupled to the welding robot), scans at least a portion of the workspace. The portion of the workspace may include a part to be welded and the controller may generate, based on the scan, a representation (e.g., point cloud representation) of the part. In some implementations, the controller is provided with or accesses an annotated CAD model of the part. The controller may determine an expected position and expected orientation of a candidate seam on the part in accordance with (or based on) the CAD model of the part and the representation of the part. For example, the controller may identify the candidate seams based on the model geometry—e.g., the controller may perform object matching to match components or features (e.g., topographical features) on the representation of part to the components or features in the CAD model). The controller may use a result of the object matching to determine the expected position and expected orientation of the candidate seam on the part. After the expected position and orientation is determined, the controller may then determine an actual position and actual orientation of the candidate seam based at least in part on the representation of the part.

Figure 11:
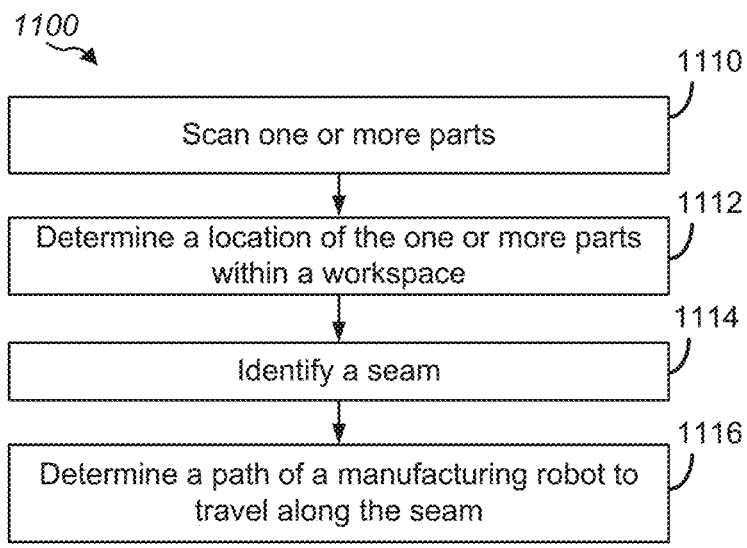
FIG. 11 is a flow diagram illustrating an example process of operating a welding robot according to one or more aspects.

Referring now to FIG. 11, FIG. 11 is a flow diagram illustrating an example process 1100 of operating a welding robot according to one or more aspects. Operations of process 1100 may be performed by a control system or a controller (referred to collectively as "the controller" with reference to FIG. 11), such as control system 110, controller 152, or processor 101. For example, example operations (also referred to as "blocks") of process 1100 may enable a controller enable to generate welding instructions for a welding robot. The welding instructions may include or correspond to control information 182. The welding robot may include or correspond to robot 120, 212, 214, 216, or 810.

In some implementations, the welding robot may be configured to perform a manufacturing task (e.g., welding) on one or more parts positioned in a workspace. For example, the workspace may include or correspond to workspace 130 or 801. The workspace may include, or have positioned therein, one or more parts (e.g., 135, 136, 502, 504, 602, or 604), one or more fixtures (e.g., 127, 816), or a combination thereof. The one or more fixtures, such as a clamp, may be configured to hold the one or more parts in a secure manner.

In block 1110, the controller scans a part (of the one or more parts). In some implementations, the controller may instruct or initiate one or more sensors to scan the part or a portion or an entirety of the workspace. For example, the scan of the part (or the workspace) may generate information, such as sensor data 180, that is received by the controller. The information may include or correspond to sensor data 180. The information may be received by the controller from one or more sensors, such as 109, 234, 236, or 802. In some implementations, the information includes image data, such as images of the part or the workspace. In some implementations, the one or more scanners may be coupled to or included in the robot.

In block 1112, the controller determines a location of the one or more parts in the workspace. The controller may determine the location based on the information.

In block 1114, the controller identifies a seam, such as a candidate seam or an actual seam. For example, the controller may identify one or more seams on the part using image data acquired from the sensors and/or a point cloud derived from the images or sensor data. The point cloud may include or correspond to point cloud 169, 500, 600, or 706.

In block 1116, the controller determines a path of the manufacturing robot to travel along the seam. For example, once the part and a seam location is determined, the controller may plot a path for the manufacturing robot along the identified seam. In some implementations, the controller may plot the path using path planning logic 105. The path plotted may include optimized motion parameters of the manufacturing robot to complete a weld without colliding with itself or anything else in the workspace. In some implementations, no human input is required in the generation of optimized motion parameters of the robot to complete a weld.

Although aspects of the present application and their advantages have been described in detail, it should be understood that various changes, substitutions and alterations can be made herein without departing from the spirit and scope of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding implementations described herein may be utilized. Accordingly, the appended claims are intended to include within their scope such processes, machines, manufacture, compositions of matter, means, methods, or steps.

The above specification provides a complete description of the structure and use of illustrative configurations. Although certain configurations have been described above with a certain degree of particularity, or with reference to one or more individual configurations, those skilled in the art could make numerous alterations to the disclosed configurations without departing from the scope of this disclosure. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described above to form further examples having comparable or different properties and/or functions, and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure.

While various implementations have been described above, it should be understood that they have been presented by way of example only, and not limitation. Although various implementations have been described as having particular features and/or combinations of components, other implementations are possible having a combination of any features and/or components from any of the examples where appropriate as well as additional features and/or components.

Certain features that are described in this specification in the context of separate implementations also can be implemented in combination in a single implementation. Conversely, various features that are described in the context of a single implementation also can be implemented in multiple implementations separately or in any suitable subcombination. Where methods described above indicate certain events occurring in certain order, the ordering of certain events may be modified. Additionally, certain of the events may be performed concurrently in a parallel process when possible, as well as performed sequentially as described above.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

Those of skill in the art would understand that information, message, and signals may be represented using any of a variety of different technologies and techniques. For example, data, instructions, commands, information, and signals that may be referenced throughout the above description may be represented by voltages, currents, electromagnetic waves, magnetic fields or particles, optical fields or particles, or any combination thereof.

Components, the functional blocks, and the modules described herein with the figures include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. The various illustrative logics, logical blocks, modules, circuits and algorithm processes described in connection with the implementations disclosed herein may be implemented as electronic hardware, computer software, or combinations of both. In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Additionally, the operations of a method or algorithm may reside as one or any combination or set of codes and instructions on a machine readable medium and computer-readable medium, which may be incorporated into a computer program product.

Some implementations described herein relate to methods or processing events. It should be understood that such methods or processing events can be computer-implemented. That is, where a method or other events are described herein, it should be understood that they may be performed by a compute device having a processor and a memory. Methods described herein can be performed locally, for example, at a compute device physically co-located with a robot or local computer/controller associated with the robot and/or remotely, such as on a server and/or in the "cloud."

Memory of a compute device is also referred to as a non-transitory computer-readable medium, which can include instructions or computer code for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules, Read-Only Memory (ROM), Random-Access Memory (RAM) and/or the like. One or more processors can be communicatively coupled to the memory and operable to execute the code stored on the non-transitory processor-readable medium. Examples of processors include general purpose processors (e.g., CPUs), Graphical Processing Units, Field Programmable Gate Arrays (FPGAs), Application Specific Integrated Circuits (ASICs), Digital Signal Processor (DSPs), Programmable Logic Devices (PLDs), and the like. Examples of computer code include, but are not limited to, micro-code or micro-instructions, machine instructions, such as produced by a compiler, code used to produce a web service, and files containing higher-level instructions that are executed by a computer using an interpreter. To illustrate, examples may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, 5, or 10 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. Unless stated otherwise, the word or as used herein is an inclusive or and is interchangeable with "and/or," such that when "or" is used in a list of two or more items, means that any one of the listed items can be employed by itself, or any combination of two or more of the listed items can be employed. To illustrate, A, B, and/or C includes: A alone, B alone, C alone, a combination of A and B, a combination of A and C, a combination of B and C, or a combination of A, B, and C. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing"). As a result, an apparatus that "comprises," "has," "includes," or "contains" one or more elements possesses those one or more elements, but is not limited to possessing only those one or more elements. Likewise, a method that "comprises," "has," "includes," or "contains" one or more steps possesses those one or more steps, but is not limited to possessing only those one or more steps.

Any implementation of any of the systems, methods, and article of manufacture can consist of or consist essentially of—rather than comprise/have/include—any of the described steps, elements, or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

The claims are not intended to include, and should not be interpreted to include, means-plus- or step-plus-function limitations, unless such a limitation is explicitly recited in a given claim using the phrase(s) "means for" or "step for," respectively.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure and following claims are not intended to be limited to the examples and designs described herein but is to be accorded the widest scope consistent with the principles and novel features disclosed herein.

The invention claimed is:

1. A computer-implemented method of generating instructions for a welding robot, the computer-implemented method comprising:
   receiving, by a robot controller of the welding robot, a computer aided design (CAD) model of a first part and a second part;
   identifying, by the robot controller, a seam to be welded, the seam defined based on the first part and the second part of the CAD model;
   discretizing, by the robot controller, a representation of the seam into a discrete waypoint set comprising a plurality of waypoints along a length of the seam, at least one waypoint of the plurality of waypoints constraining an orientation of a welding tool coupled to the welding robot in at least one degree of freedom;
   for the plurality of waypoints along the length of the seam, determining, by the robot controller, a plurality of cross sections of a joint to weld the seam;
   generating, with the robot controller, a welding fill plan for the seam, the welding fill plan generated based on at least the plurality of cross sections, a number of layers of the joint, a number of weld beads of the joint, and a bead model, wherein generating the welding fill plan includes:
      determining a plurality of fill plan weld beads using machine learning logic, wherein for each weld bead of the plurality of fill plan weld beads, a target area and a torch angle of the welding tool is determined and the target area of the fill plan weld bead is adjusted between the plurality of cross sections along the length of the seam;
   generating instructions, with the robot controller and based on the welding fill plan, for the welding robot to perform one or more weld passes;
   transmitting, with the robot controller, the instructions to the welding robot; and
   performing, by the welding robot, a welding operation including the one or more weld passes based on the instructions.

2. The computer-implemented method of claim 1, wherein for each weld bead of the plurality of fill plan weld beads, the torch angle of the welding tool is adjusted by the robot controller between the plurality of cross sections along the length of the seam.

3. The computer-implemented method of claim 1, further comprising:
   generating, based on a plurality of feature components, a joint model of the plurality of cross sections; and
   populating the joint model of the plurality of cross sections with a plurality of candidate weld beads, each candidate weld bead of the plurality of candidate weld beads having:
      a size that is within a bead size range,
      a position, or
      a combination thereof,
   wherein the plurality of fill plan weld beads is based on the plurality of candidate weld beads.

4. The computer-implemented method of claim 3, wherein populating the joint model with the plurality of candidate weld beads includes:
   placing a first set of beads of the plurality of candidate weld beads, each bead of the first set of beads placed at a corresponding structural point at one or more structural points of the joint model.

5. The computer-implemented method of claim 4, wherein populating the joint model with the plurality of candidate weld beads includes placing:
   after the first set of beads is placed, a second set of beads of the plurality of candidate weld beads at one or more auxiliary structural points of the joint model;
   after the second set of beads is placed, a third set of beads of the plurality of candidate weld beads based on a cover profile of the joint model; and
   after the third set of beads is placed, a fourth set of beads of the plurality of candidate weld beads at one or more unfilled spaces of the joint model.

6. The computer-implemented method of claim 3, wherein a number of beads of the plurality of candidate weld beads is different from a number of beads of the plurality of fill plan weld beads.

7. The computer-implemented method of claim 1, wherein the target area of each of the plurality of weld beads is adjusted between the plurality of cross sections along the length of the seam based upon dimension variability information of the seam.

8. The computer-implemented method of claim 1, further comprising:
receiving, with the robot controller, sensor data based on a weld bead physically deposited and formed by the one or more weld passes, the sensor data including data associated with formation of the weld bead, data associated with the formed weld bead, or a combination thereof.

9. The computer-implemented method of claim 8, further comprising:
updating the bead model using machine learning logic based upon the sensor data.

10. The computer-implemented method of claim 1, further comprising:
outputting, for display, welding fill plan information based on the welding fill plan, wherein the welding fill plan information indicates at least one of the number of layers, a number of beads in each layer, a bead size, a weld size, a cover profile, a cost of material, an average bead size, a minimum bead size, a maximum bead size, a distance of a bead from a structural point, or one or more cross-sections.

11. A robotic welding system, comprising:
a welding robot; and
a robot controller comprising a processor and a non-transitory computer-readable medium storing code configured to be executed by the processor to cause the robot controller to:
receive a computer aided design (CAD) model of a first part and a second part;
identify a seam to be welded, including at least one dimensional variance along the seam, the seam defined based on the first part and the second part;
discretize a representation of the seam into a discrete waypoint set comprising a plurality of waypoints along a length of the seam, at least one waypoint of the plurality of waypoints constraining an orientation of a welding tool coupled to the welding robot in at least one degree of freedom;
determine a plurality of cross sectional weld profiles that differ based on the at least one dimensional variance;
generate a welding fill plan for the seam, the welding fill plan generated based on at least the plurality of cross sectional weld profiles and a bead model, wherein generating the welding fill plan includes:
determining a plurality of fill plan weld beads using machine learning logic, wherein for each weld bead of the plurality of fill plan weld beads, a target area and a torch angle of the welding tool is determined and the target area of the fill plan weld bead is adjusted between the plurality of cross sections along the length of the seam;
generate instructions, based on the welding fill plan, for the welding robot to perform a plurality of weld passes; and
perform, by the welding robot, a welding operation including the plurality of weld passes.

12. The robotic welding system of claim 11, wherein for each weld bead of the plurality of fill plan weld beads, the torch angle of the welding tool is adjusted by the robot controller between the plurality of cross sections along the length of the seam.

13. The robotic welding system of claim 11, wherein the plurality of weld passes deposit a weld having volumetric variation along the plurality of waypoints.

* * * * *